(12) United States Patent
Asami

(10) Patent No.: US 6,973,628 B2
(45) Date of Patent: Dec. 6, 2005

(54) IMAGE DISPLAYING APPARATUS AND IMAGE DISPLAYING METHOD AND PROGRAM MEDIUM

(75) Inventor: Akiko Asami, Shizuoka (JP)

(73) Assignee: Sony Corporation, Tokyo (JP)

( * ) Notice: Subject to any disclaimer, the term of this patent is extended or adjusted under 35 U.S.C. 154(b) by 648 days.

(21) Appl. No.: 09/942,165

(22) Filed: Aug. 29, 2001

(65) Prior Publication Data

US 2002/0054158 A1 May 9, 2002

(30) Foreign Application Priority Data

Aug. 31, 2000 (JP) ............................. P2000-264173

(51) Int. Cl.$^7$ .............................. G06F 3/00; G06F 9/00; G06F 17/00
(52) U.S. Cl. ...................... 715/838; 715/782; 715/866; 715/850; 715/854; 715/839
(58) Field of Search ................................. 345/156, 592, 345/639, 764, 768, 779, 838, 839, 848, 853, 345/854, 863, 866; 715/514, 526, 782, 850

(56) References Cited

U.S. PATENT DOCUMENTS

| | | | | |
|---|---|---|---|---|
| 5,499,330 A | * | 3/1996 | Lucas et al. ................. | 715/514 |
| 5,977,974 A | * | 11/1999 | Hatori et al. ................ | 345/839 |
| 6,163,317 A | * | 12/2000 | de Judicibus ............... | 345/853 |
| 6,333,753 B1 | * | 12/2001 | Hinckley ..................... | 345/768 |
| 6,466,237 B1 | * | 10/2002 | Miyao et al. ................ | 345/838 |

* cited by examiner

Primary Examiner—Steven P Sax
Assistant Examiner—Boris Pesin
(74) Attorney, Agent, or Firm—Jay H. Maioli

(57) ABSTRACT

An information-processing apparatus, an information-processing method and a data recording medium which allow a display to be presented to the user. The apparatus, method, and medium allow the display of a cyclical time concept which includes nature, creatures and integration of pictures and comments and is based on a predetermined cycle typically including a sequence of transitions among the four seasons of spring, summer, autumn and winter, or of a day consisting of morning, afternoon, and night, or a cycle can also be a temperature or humidity cycle.

16 Claims, 49 Drawing Sheets

FIG. 15
| THUMBNAIL | AFFILIATED INFORMATION |
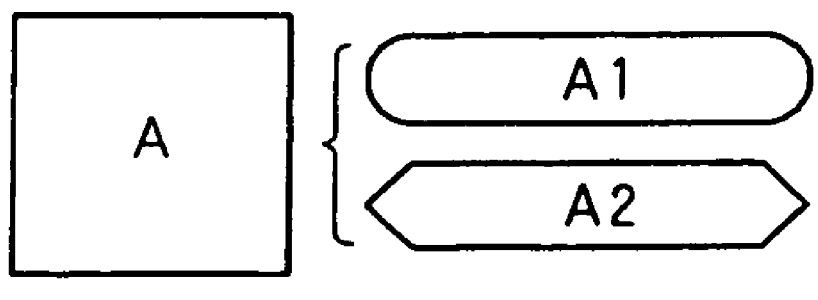
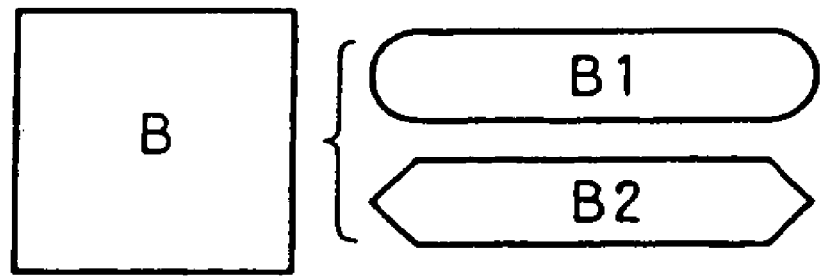
(PRIOR ART)

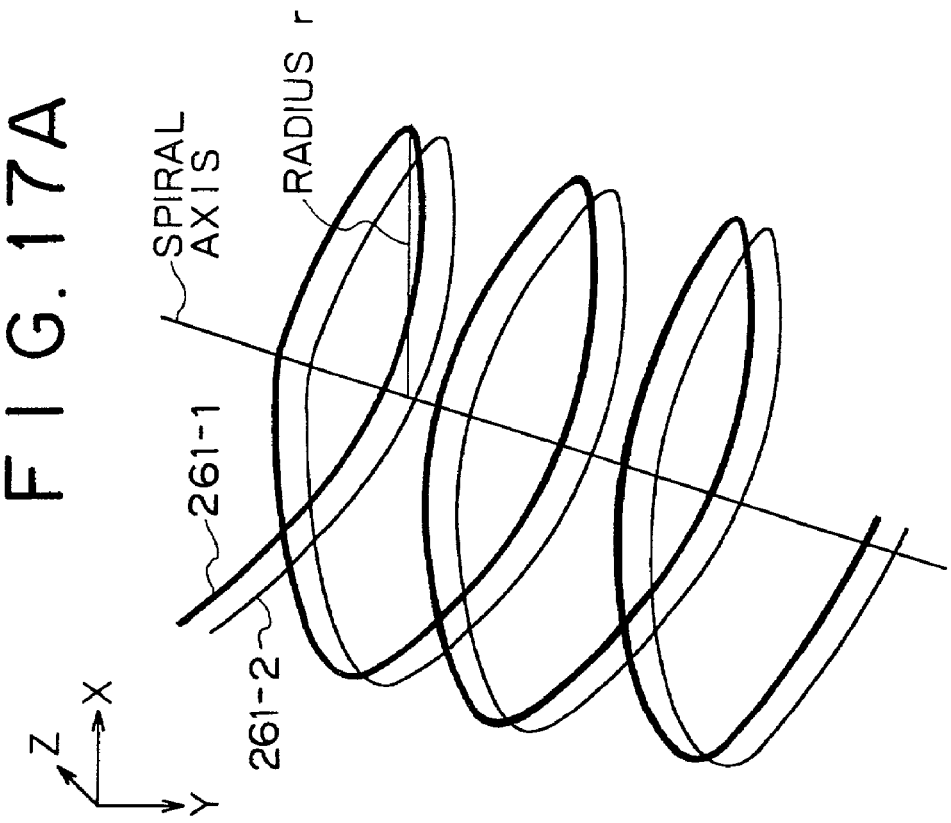
F I G. 17A
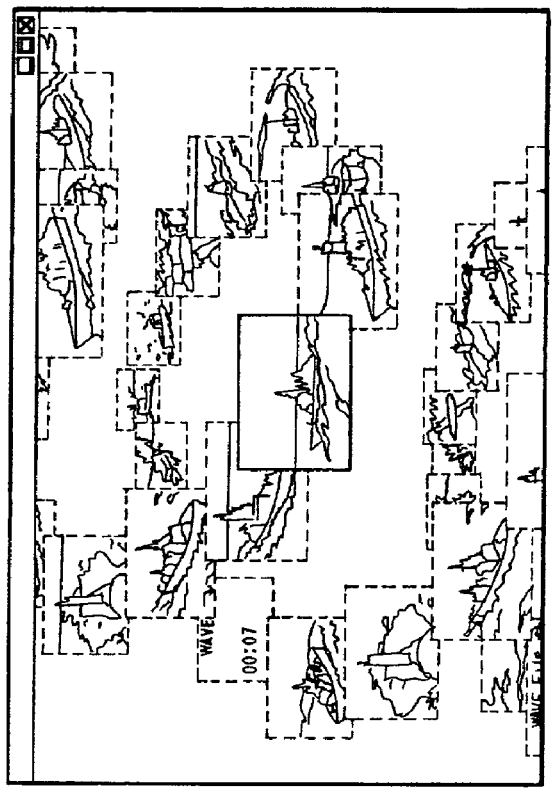
F I G. 17B

FIG. 20
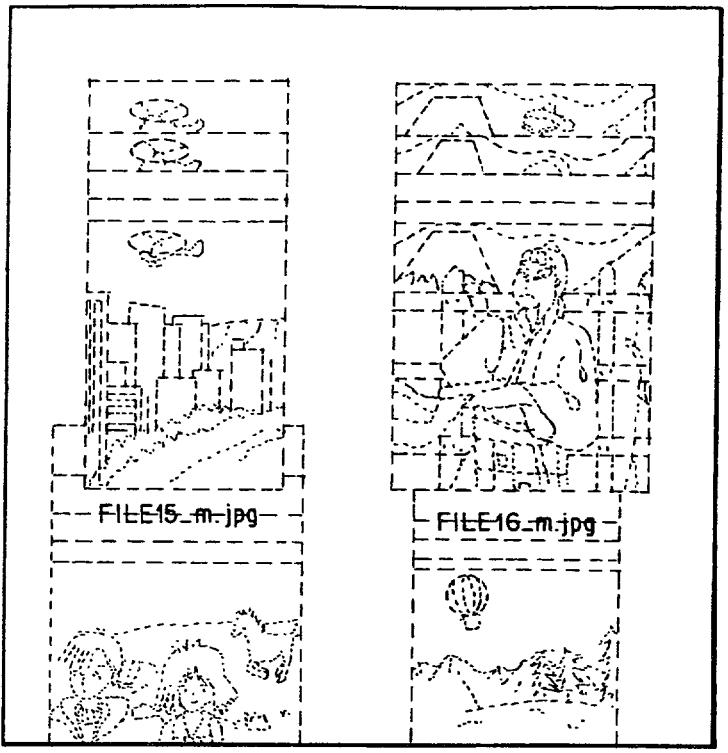
BRIGHTNESS OF ENTIRE SCREEN IS REDUCED TO 80%
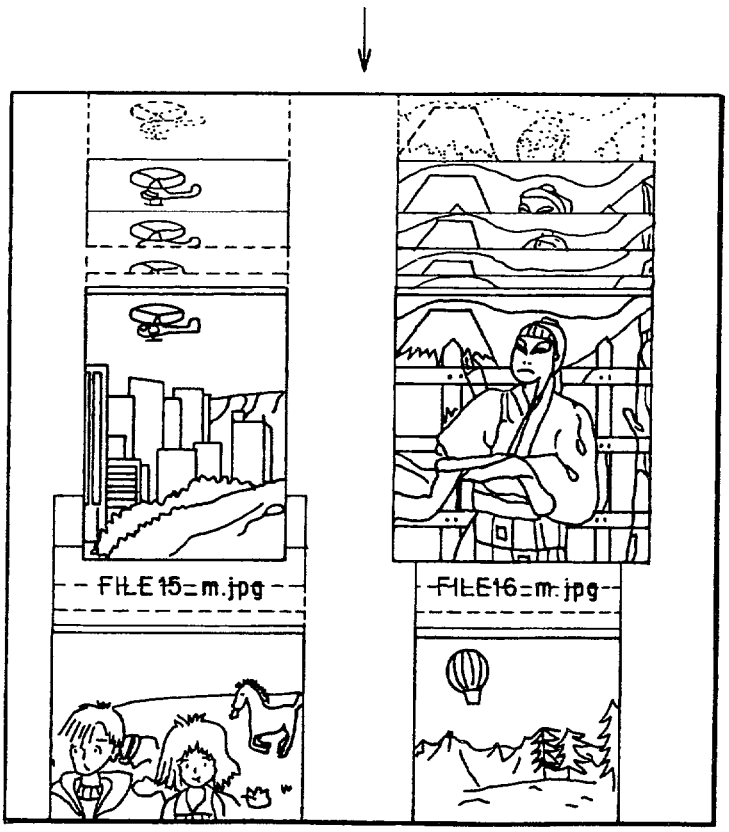
EACH THUMBNAIL ICON IS OVERWRITTEN

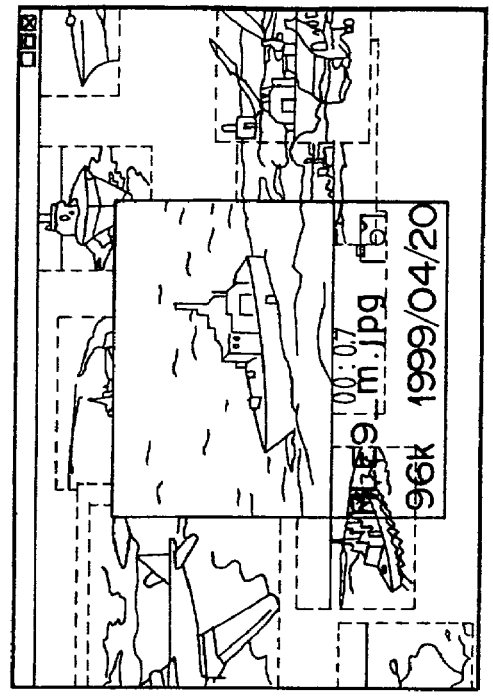
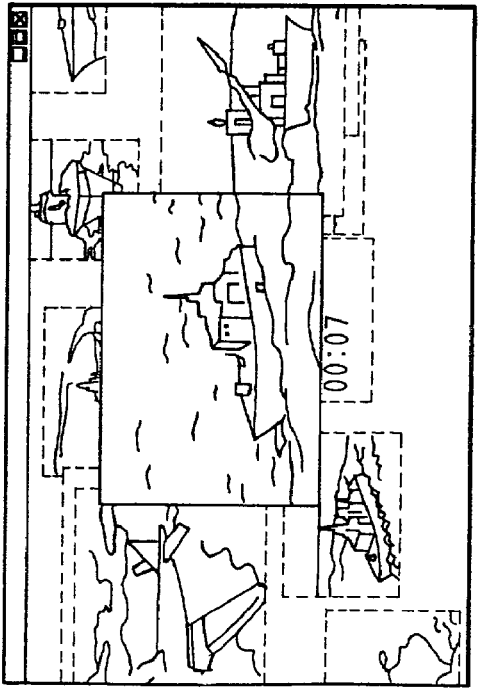
FIG. 28

FIG. 43

DATA CARD LIST

| DATA-CARD ID | THUMB NAIL | DATE | TITLE | COMMENTS | DISPLAY PRIORITY |
|---|---|---|---|---|---|
| 01 | | 01.01.1995 | NEW-YEAR DAY | SHRINE | 1 |
| 02 | | 01.15.1995 | CEREMONY FOR LAWFUL AGE | SHRINE | 2 |
| | | | | | |
| | | | | | |
| | | | | | |
| | | | | | |

UNIT TIME OF 1 CYCLE

1 YEAR
1 MONTH
1 WEEK
1 DAY
1 HOUR

THE NUMBER OF THUMBNAIL DISPLAYS PER 1/4 CYCLES (MAXIMUM OF 6)

CONFIRM
CANCEL

VISUAL-POINT SETTING NEMU

IMAGE DISPLAYING APPARATUS AND IMAGE DISPLAYING METHOD AND PROGRAM MEDIUM

BACKGROUND OF THE INVENTION

The present invention relates to an information-processing apparatus and a computer-graphic display program that are capable of carrying out the so-called cyclical operation having a periodical property to display a thumbnail icon on a virtual spiral.

In recent years, there has been known a technique whereby thumbnail icons each representing a still or moving picture are displayed in a personal computer or the like to allow the user or the watcher/listener to manipulate data of a still or moving picture selected by specifying a thumbnail icon. A thumbnail icon is a shrunk display picture provided for showing picture data to the user or the watcher/listener.

In addition, a time-axis display is also known as a general technique for displaying data of a number of digital pictures by adoption of a variety of methods using picture management software for managing picture data.

In a time-axis display, there are generally known effective arrangements of pictures in a slanting direction from the top right to the bottom left and a vertical direction along a spiral. Such arrangements are each a one-dimensional expression of a time-axis property or a picture representing an expression of the lapse of time from the past to the future as a straight line.

In the one-dimensional time-axis display according to the conventional technology described above, however, the lapse of time from the past to the future is expressed by a display picture as a straight line. Nature and environments surrounding creatures are repeated cycles each comprising the four seasons of Japan, namely, the spring, the summer, the autumn and the winter or even repeated smaller cycles called days which each consist of a morning, a day time and a night. While there exists a cyclical-time sense or a cyclical-natural sense, that is, a sense of a predetermined unit time in the lapse of time or a sense of cycles such as a spring, a summer, an autumn and a winter or a morning, a day time and a night, the conventional technology is not a technology expressing the concept of the repetition of the cyclical states described above. That is to say, the conventional technology is capable of displaying only a time axis as a straight line. The conventional technology is not capable of displaying a sequence of seasonal transitions of a spring, a summer, an autumn and a winter as a cycle, displaying a morning, a day time and a night as a cycle of the lapse of time on a day and displaying a cycle based on changes in temperature or humidity.

SUMMARY OF THE INVENTION

It is an object of the present invention to provide an information-processing apparatus and a computer-graphic display program that are capable of displaying abundant expressions and cyclical time concepts based on predetermined regularities including nature and creatures along with integrated pictures and integrated comments wherein 1 cycle typically comprises a sequence of transitions among the four seasons, namely, the spring, the summer, the autumn and the winter, the lapse of time on a day from a morning through a day time to a night or temperature or humidity repetitions.

It is another object of the present invention to provide an information-processing apparatus and a computer-graphic display program that allow a plurality of thumbnail icons displayed on a spiral representing the time axis to be specified on the basis of a predetermined regularity such as appearance of a season such as a spring, summer, autumn or winter picture, appearance of a day's predetermined time zone like a morning, a day time or a night or detection of a temperature or a humidity within a predetermined range like detection of a temperature or a humidity higher or lower than a predetermined value and are capable of displaying collected data represented by the specified thumbnail icons.

It is a further object of the present invention to provide an information-processing apparatus and a computer-graphic display program that are capable of synthesizing a plurality of displayed spirals and, by displaying the synthesized spirals by superposition of the spirals on each other, capable of displaying thumbnail icons represented by a plurality of different spiral layers by superposition of the icons on each other.

To achieve the above object, according to a first aspect of the present invention, there is provided an information-processing apparatus, including: storage means for storing raw data and time-axis data which is related to the raw data and stored in the storage means by being associated with the raw data; thumbnail-icon-generating means for generating a thumbnail icon representing the raw data read out from the storage means, spiral-period-setting means for setting a spiral period of a virtual spiral on the basis of a predetermined unit time, spiral-axis-setting means for setting a spiral axis of the virtual spiral on the basis of the predetermined unit time, and thumbnail-icon-array-displaying means for displaying the thumbnail icon in an array on the virtual spiral on the basis of the time-axis data associated with the raw data represented by the thumbnail icon.

Further, according to a second aspect of the present invention, there is provided a computer-graphic-display program, including: storage step for storing raw data and time-axis data which is related to the raw data and stored in the storage means by being associated with the raw data, thumbnail-icon-generating step for generating a thumbnail icon representing the raw data read out at the storage step, a spiral-period-setting step of setting a spiral period of a virtual spiral on the basis of a predetermined unit time, a spiral-axis-setting step of setting a spiral axis of the virtual spiral on the basis of the predetermined unit time; and a thumbnail-icon-array-displaying step of displaying the thumbnail icon in an array on the virtual spiral on the basis of the time-axis data associated with the raw data represented by the thumbnail icon.

In accordance with the present invention, a time-axis property can be designed as two elements. To be more specific, the period of a spiral and the axis of the spiral each represent a unit time. A plurality of thumbnail icons are displayed on the spiral on the basis of time-axis data. Thus, a time-axis display of the spiral and the thumbnail icons can be expressed 2 dimensionally. In this way, in accordance with the present invention, it is possible to provide a display based on a predetermined condition or to display a cyclical time concept which includes nature, creatures as well as integration of pictures and comments wherein a cycle typically comprises a sequence of transitions among the four seasons, namely, the spring, the summer, the autumn and the winter, or a day consisting of a morning, a day time and a night, or a cycle can also be a temperature or humidity cycle.

In an information-processing apparatus, preferably, the information-processing apparatus includes representative-thumbnail-selecting means for selecting a specific one of a plurality of thumbnail icons displayed as the array on the virtual spiral as a representative thumbnail icon and representative-thumbnail-icon-array-displaying means for displaying the representative thumbnail icon selected by the representative-thumbnail-selecting means in an array on the virtual spiral. Preferably, a computer-graphic display program includes a representative-thumbnail-icon-selecting step of selecting a specific one of a plurality of thumbnail icons displayed as the array on the virtual spiral as a representative thumbnail icon, and a representative-thumbnail-icon-array-displaying step of displaying the representative thumbnail icon selected at the representative-thumbnail-icon-selecting step in an array on the virtual spiral. With this configuration, the position of each selected representative thumbnail icon becomes obvious and, at the same time, a positional relation between the period of a spiral and the axis of the spiral can be verified so as to provide simple operatability which can be understood intuitively.

Preferably, the information-processing apparatus includes spiral-layer-synthesizing means for synthesizing a plurality of spiral layers each comprising the virtual spiral, the spiral axis and the thumbnail icons, and synthesized-layer-displaying means for displaying a synthesized layer produced by the spiral-layer-synthesizing means. Preferably, a computer-graphic display program includes a spiral-layer-synthesizing step of synthesizing a plurality of spiral layers each comprising the virtual spiral, the spiral axis and the thumbnail icons, and a synthesized-layer-displaying step of displaying a synthesized layer produced at the spiral-layer-synthesizing step. With this configuration, a plurality of spiral layers each showing a virtual spiral, the axis of the spiral and thumbnail icons can be synthesized and superposed on each other to be displayed as a synthesized layer. In a configuration allowing a plurality of layers to be superposed on each other as such, assume that layers of a new bridegroom and a new bride are superposed on each other in a wedding party as an example. The newly-married couple's loci from the first day of acquaintance up to the wedding party are created on spiral layers separated from each other along spirals with axes different from each other. The synthesized layer obtained as a result of the synthesis can be displayed in such a way that the time axis of the bridegroom's spiral coincides with the time axis of the bride's spiral. The user is thus capable of enjoying a data display that is abundant in performance effects and of much interest to the user.

In an information-processing apparatus, preferably, an information-processing apparatus includes thumbnail-icon-extracting means for extracting a specific thumbnail icon from a plurality of thumbnail icons displayed as the array based on the time-axis data on the basis of a predetermined regularity, and data-outputting means for outputting raw data represented by the specific thumbnail icon extracted by the thumbnail-icon-extracting means. Preferably, a computer-graphic-display program includes a thumbnail-icon-extracting step of extracting a specific thumbnail icon from a plurality of thumbnail icons displayed as the array based on the time-axis data on the basis of a predetermined regularity, and a data-outputting step of outputting raw data represented by the specific thumbnail icon selected at the thumbnail-icon-extracting step. With this configuration, a plurality of thumbnail icons can be specified from a greater plurality of thumbnail icons on the basis of a predetermined regularity, and data serving as a base for generation of each of the specified thumbnail icons can be output. That is to say, a plurality of thumbnail icons displayed along a time axis in a spiral are specified on the basis of the predetermined regularity such as appearance of a season such as a spring, summer, autumn or winter picture, appearance of a day's predetermined time zone like a morning, a day time or a night or detection of a temperature or a humidity within a predetermined range like detection of a temperature or a humidity higher or lower than a predetermined value, making it possible to display collected data represented by the specified thumbnail icons.

In addition, in an information-processing apparatus, preferably, the spiral period's unit time set by the spiral-period-setting means is a one-year unit including a spring, a summer, an autumn and a winter, or a month unit. With this configuration, a unit time can be selected properly. For instance, a unit time can be a 1-year unit including a spring, a summer, an autumn and a winter or a 1-month unit. As an example, data only for a predetermined season such as spring can be collected. The data can then be displayed by superposing data of the spring of a year on pieces of data of the springs of other years. As an alternative, only data representing high-temperature conditions can be displayed so that the user is capable of enjoying only displays of much interest to the user.

Furthermore, in an information-processing apparatus, preferably, the predetermined regularity (e.g., a pattern) includes at least a regularity based on a time axis representing at least hours, days, months or years, a regularity based on temperatures or a regularity based on humidity data, and preferably, in a computer-graphic-display program, the predetermined regularity includes at least a regularity based on a time axis representing at least hours, days, months or years, a regularity based on temperatures or a regularity based on humidity data. With this configuration, a predetermined regularity can be designed to comprise at least a regularity based on a time axis including at least a time, a day, a month or a year, a regularity based on temperatures or a regularity based on humidity. Assume a regularity (e.g., a pattern) based on a temperature as an example. With such a regularity, when data for a temperature exceeding typically 30° C. is displayed, the user is capable of viewing people-related data for a pool, a sea or light dress. In the case of data of low temperatures such as temperatures below 0° C., on the other hand, data that is difficult to express by using only time units can be displayed. An example of such data is data for a cold region such as a snow area. In addition, the regularity based on a time axis including at least a time, a day, a month or a year, the regularity based on temperatures or the regularity based on humidity can be applied by itself as the predetermined regularity or, as an alternative, those regularities can be superposed on each other to form the predetermined regularity. Thus, it is possible to widen the range of data-display selections and to express data of much interest to the user.

Moreover, in an information-processing apparatus, the representative-thumbnail-icon-array-displaying means displays the thumbnail icon as a semitransparent display. Preferably, in a computer-graphic display program, at the representative-thumbnail-icon-array-displaying step, the thumbnail icon is displayed as a semitransparent display. With this configuration, by displaying thumbnail icons and representative thumbnail icons semitransparently, data behind the thumbnail icons and the representative thumbnail icons is not concealed completely but visible instead. Thus, the data can be displayed by showing the period and the axis of the spiral as they are. As a result, it is possible to provide simple operatability which can be understood intuitively.

In addition, in an information-processing apparatus, preferably, an information-processing apparatus further includes visual-point-moving means for arbitrarily moving a visual point of the spiral layer displaying the virtual spiral, the spiral axis and the thumbnail icons. Preferably, the visualpoint-moving means automatically moves the visual point of the spiral layer along a time axis. Preferably, the visual-point-moving means moves the visual point of the spiral layer or changes the direction of a visual line of the spiral layer in respectively visual-point parallel-movement processing or visual-line-direction modification processing which is performed in accordance with an operation carried out manually on an operation key set in advance for the visual-point parallel-movement processing or the visual-line-direction modification processing respectively. Preferably, the visual-point-moving means moves the visual point in the visual-point parallel-movement processing in at least the direction of an X, Y or Z axis in a displayed virtual space. Preferably, the visual-point-moving means moves the visual point in at least one of yaw, pitch and roll directions in a displayed virtual space. Preferably, the visual-point-moving means automatically resets the visual point to an origin's position set in advance after the lapse of a predetermined time since a manual operation to start the visual-point parallel-movement processing or the visual-line-direction modification processing. Preferably, the visual-point-moving means automatically moves the visual point or automatically switches the position of the visual point to another location after the lapse of a predetermined time since a manual operation to start the visual-point parallel-movement processing or the visual-line-direction modification processing. Further, in a computer-graphic-display program, preferably, the information-processing program includes a visual-point-moving step of arbitrarily moving a visual point of the spiral layer displaying the virtual spiral, the spiral axis and the thumbnail icons, and the visual-point-moving step automatically moves the visual point or automatically switches the position of the visual point to another location after the lapse of a predetermined time since a manual operation to start the visual-point parallel-movement processing or the visual-line-direction modification processing. With this configuration, the visual point of a spiral layer displaying a virtual spiral, the axis of the spiral and representative thumbnail icons can be moved automatically or manually. In addition, the visual point can be moved in a parallel motion in the X, Y or Z direction, and the orientation of a visual line can be changed in a yaw, pitch or roll direction. By moving the visual point and changing the orientation of the visual line in this way in conjunction with the application of the regularities described above individually or as a regularity of superposition, performance based on a visual point in complex motion can be displayed in a variety of ways and it is also possible to widen the range of data-display selections and to express data of much interest to the user.

It should be noted that the visual point moved manually so far is automatically reset to an origin's position set in advance, and the movement is switched to an automatic movement after a predetermined period of time lapses since the start of a manual operation to move the visual point.

BRIEF DESCRIPTION OF THE DRAWINGS

FIG. 15 is an explanatory diagram showing a conventional layout of thumbnail icons;

FIGS. 17A and 17B are explanatory diagrams used for describing another spiral view;

FIG. 20 is another explanatory diagram used for describing the afterimage processing;

FIG. 28 is a diagram showing a typical display of additional attributes;

FIG. 43 is a diagram showing a list of data cards used in the operations to set a spiral in the display shown in FIG. 42;

PREFERRED EMBODIMENTS OF THE INVENTION

Preferred embodiments of the present invention are explained by referring to diagrams as follows. It should be noted that processing steps and an information-processing apparatus, which are described below, are not intended to limit the scope of the present invention. Instead, it is possible to make a variety of changes and modifications within a range of essentials of the present invention to the processing steps and the information-processing apparatus. A technical term "thumbnail icon" used in this specification is a shrunk picture for displaying information or data, which is specified by the user, in a simple manner. It should be noted that, in this specification, data represented by a displayed thumbnail icon includes picture information such as still and moving pictures and other information such as a sound and a smell as well as other visible information.

Figure 1:
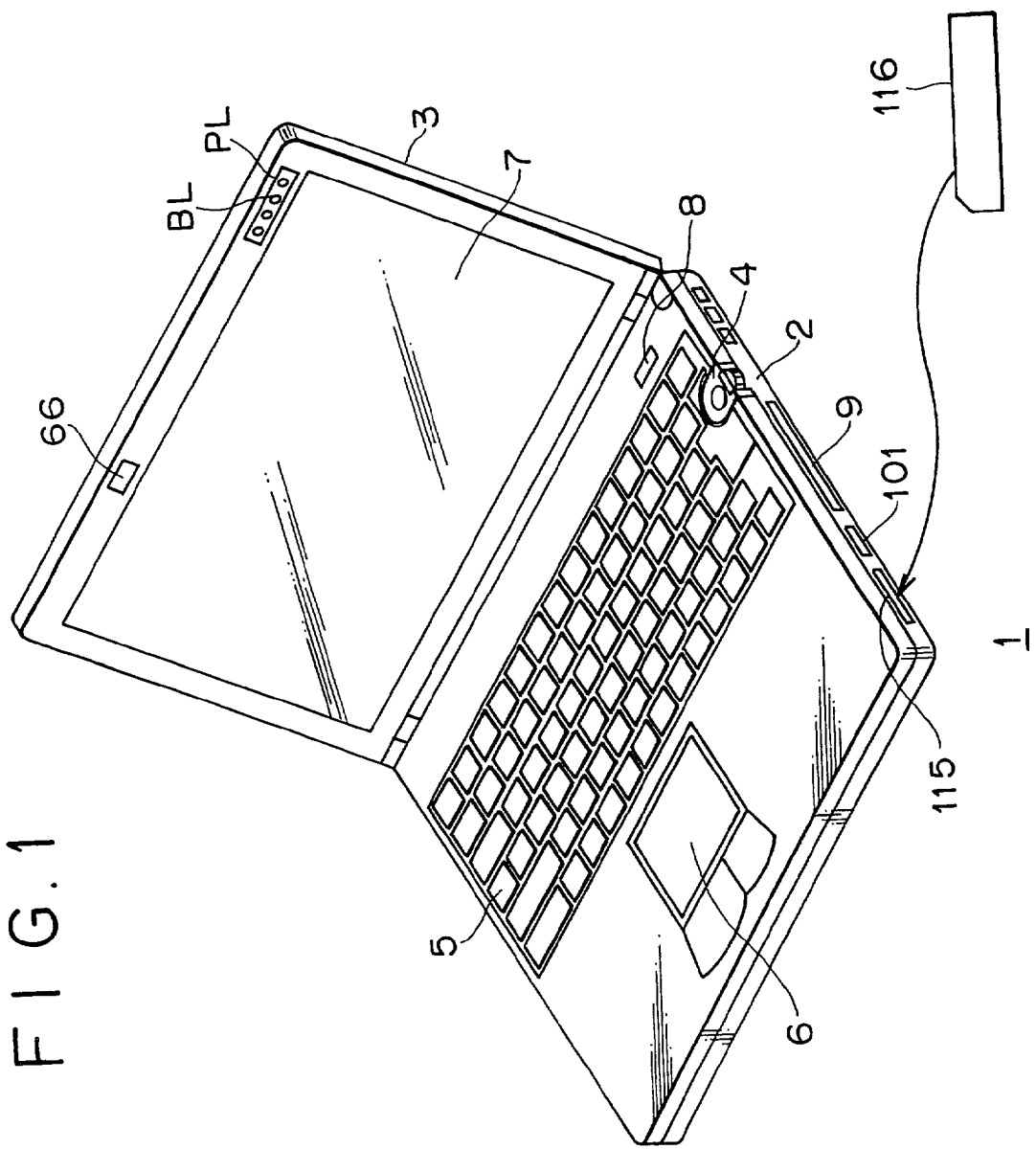
FIG. 1 is a diagram showing a perspective view of a personal computer.
Figure 2:
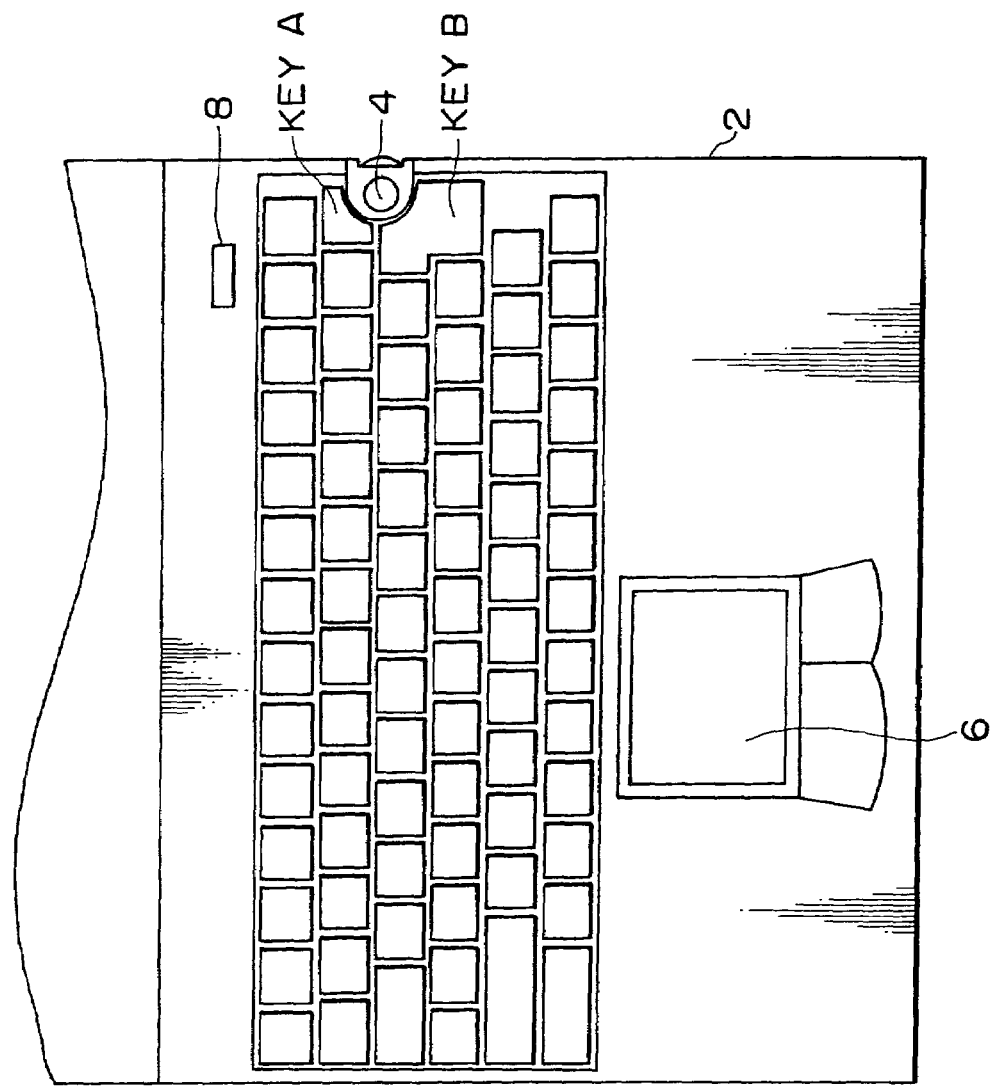
FIG. 2 is a diagram showing a top view of a main unit of the personal computer shown in FIG. 1.
Figure 3:
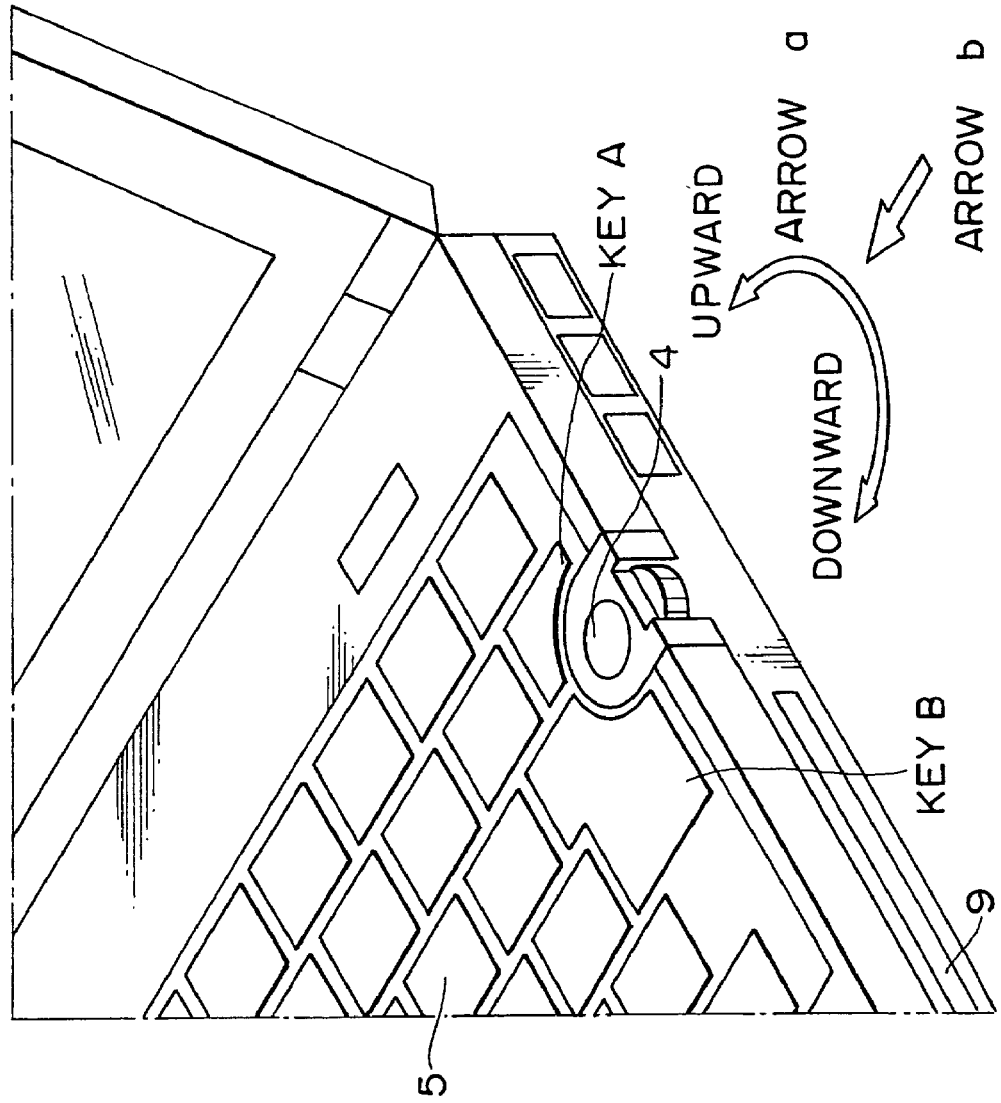
FIG. 3 is an diagram showing an enlarged vicinity of a jog dial of the personal computer shown in FIG. 1.
Figure 4:
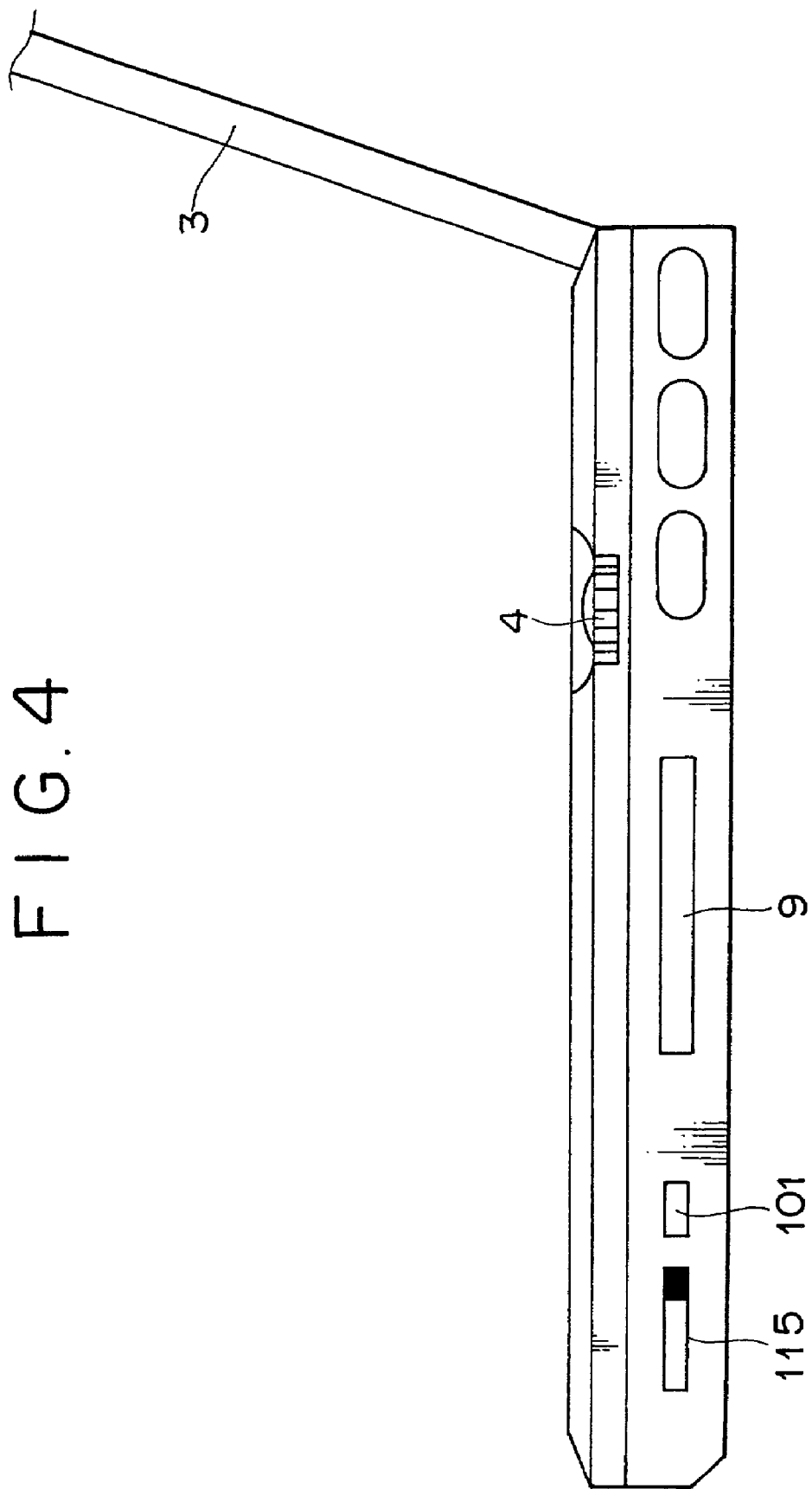
FIG. 4 is a diagram showing a right side view of the jog dial of the personal computer shown in FIG. 1.
Figure 5:
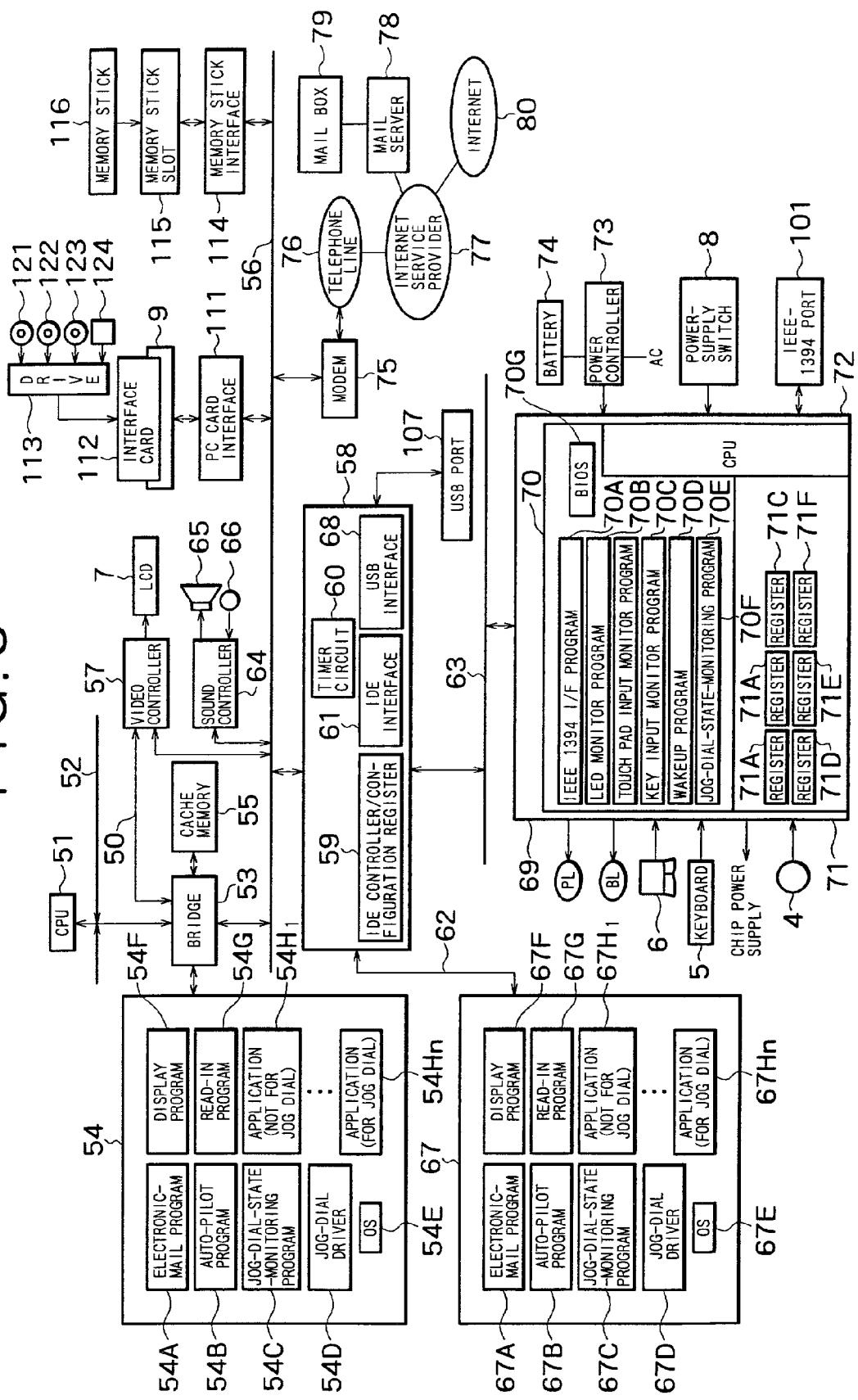
FIG. 5 is a block diagram showing an electrical configuration of the personal computer shown in FIG. 1.

FIGS. 1 to 4 are diagrams each showing an external view of a notebook personal computer 1 serving as a typical computer implementing an information-processing apparatus provided by the present invention and executing a computer-graphic display program of the invention. As shown in the figures, the personal computer 1 basically comprises a main unit 2 and a display unit 3 which can be put in a state of closing or disclosing the main unit 2 with a high degree of freedom. FIG. 1 is a diagram showing an external squint view of a state of the display unit 3 disclosing the main unit 2. FIG. 2 is a diagram showing a top view of the main unit 2. FIG. 3 is a diagram showing an enlarged vicinity of a jog dial 4 provided on the main unit 2 and described later. FIG. 4 is a diagram showing a side view of the jog dial 4 provided on the main unit 2. FIG. 5 is a block diagram showing an electrical configuration of the personal computer 1.

As shown in FIGS. 1 to 5, a keyboard 5, a touch pad 6 and a power-supply switch 8 are provided on the top surface of the main unit 2. The keyboard 5 is operated to enter a variety of characters and symbols. The touch pad 6 serves as a pointing device operated to move a pointer also referred to as a mouse cursor appearing on an LCD (Liquid-Crystal Display) unit 7. On the other hand, members such as the jog dial 4, an IEEE-1394 port 101 and a slot 9 are provided on a side surface of the main unit 2. It should be noted that, in place of the touch pad 6, a stick-type pointing device can also be typically used.

The LCD unit 7 for displaying a picture is provided on the front surface of the display unit 3. On the right-top portion of the display unit 3, there are provided a power-supply lamp PL, a battery lamp BL, a message lamp ML not shown in the figure and provided only if necessary, and LEDs (Light-Emitting Devices) serving as other lamps. In addition, a microphone 104 is provided on the top-center portion of the display unit 3.

It should be noted that the power-supply lamp PL, the battery lamp BL, the message lamp ML and the other lamps can also be provided on the lower portion of the display unit 3.

As shown in FIG. 2, the jog dial 4 is provided typically between keys A and B located on the right side of the keyboard 5 provided on the main unit 2, and the jog dial 4 is installed in such a way that the height of the jog dial 4 is typically at the same level as the heights of the keys A and B. The personal computer 1 carries out predetermined processing according to an operation to rotate the jog dial 4 in a direction shown by an arrow a in FIG. 3. An example of the predetermined processing is processing to scroll the display screen. By the same token, the personal computer 1 carries out other predetermined processing according to an operation to move the jog dial 4 in a direction shown by an arrow b in FIG. 3. An example of the other predetermined processing is processing to select an icon.

It should be noted that the jog dial 4 can also be provided on the left-side surface of the main unit 2, the left-side or right-side surface of the display unit 3 including the LCD unit 7 or at a location between G and H keys of the keyboard 5 in the vertical direction so that the jog dial 4 can be rotated in a direction of an Y or B key.

In addition, the jog dial 4 can also be located at the center of the front surface of the main unit 2 so that the user is capable of rotating the jog dial 4 by using the thumb while operating the touch pad 6 by using a forefinger. The jog dial 4 can also be provided in a horizontal direction along the upper or lower edge of the touch pad 6 or at a location between right and left buttons of the touch pad 6 in the vertical direction. Moreover, the jog dial 4 can also be provided in a slanting direction forming a predetermined angle with a reference direction instead of the vertical or horizontal direction so that the jog dial 4 can be operated by any finger with ease. The jog dial 4 can also be provided at such a location on a side surface of the mouse serving as pointing device that the jog dial 4 can be operated by using the thumb. As the jog dial 4, a rotary electronic component having a switch can also be used.

A slot 9 is used for mounting a PC card serving as an extension card based on a standard prescribed by the PCMCIA (Personal Computer Memory Card International Association).

The IEEE (Institute of Electrical and Electronics Engineers)-1394 port 101 has a structure conforming to IEEE-1394 specifications. The IEEE-1394 port 101 is connected to a cable also conforming to the IEEE-1394 specifications.

A memory-stick slot 115 is used for mounting a memory stick (a trademark) 116 which is a memory card employing an embedded semiconductor memory such as a flash memory for storing data such as a still picture, a moving picture, a sound or a text.

As shown in FIG. 5, a CPU (Central Processing Unit) 51 is typically the Pentium (trademark) processor made by Intel or another manufacturer's processor such as AMD's processor compatible with Pentium. The CPU 51 is connected to a host bus 52 which is connected to a north bridge 53. The north bridge 53 has an AGP (Accelerated Graphics Port) 50 and is connected to a PCI (Personal Component Interconnect/Interface) 56.

Used for controlling transfers of data between the CPU 51 and the RAM 54, the north bridge 53 comprises components such as the 400BX made by Intel. The north bridge 53 is also used for controlling exchanges of data with a video controller 57 through the AGP 50. It should be noted that the north bridge 53 and a south bridge 58 form a so-called chip set.

The north bridge 53 is also connected to a cache memory 55. The cache memory 55 is a memory allowing operations of writing and reading out data to be carried out at a high speed in comparison with a RAM (Random Access Memory) 54 such as an SRAM (Static Random Access Memory). The cache memory 55 is used for caching (that is, temporarily storing) a program being executed by the CPU 51 and data used in the execution of the program. It should be noted that the CPU 51 also includes an embedded temporary cache memory not shown in the figure. The embedded cache memory is controlled by the CPU 51 itself and capable of operating at a high speed in comparison with the cache memory 55.

The RAM 54 can also be implemented by a DRAM (Dynamic Random Access Memory) for storing a program being executed by the CPU 51 and data used in the execution of the program. To put it concretely, at the end of activation of the personal computer 1, an operation to load a variety of programs from an HDD (Hard-Disk Driver) 67 to the RAM 54 is completed. Examples of the programs transferred from the HDD 67 to the RAM 54 are an electronic-mail program 54A, an auto-pilot program 54B, a jog-dial-state-monitoring program 54C, a jog-dial driver 54D, an OS (Operating System) 54E, a display program 54F, a read-in program 54G and application programs 54H1 to 54Hn.

It should be noted that the display program 54F and the read-in program 54G can be invoked when the memory stick 116 is mounted on the memory-stick slot 115.

The electronic-mail program 54A is a program for sending and receiving email through a modem 75 to and from a communication line such as a telephone line 76 through a network. The electronic-mail program 54A has an incoming-electronic-mail-acquiring function as a special function. The incoming-electronic-mail-acquiring function is executed to communicate with a mail server 78 employed in an Internet service provider 77, making an inquiry about whether or not there are mails destined for the user of the personal computer 1 in a mail box 79 assigned to the user. If there is such an email, processing is carried out to obtain the email.

The auto-pilot program 54B is a program for carrying out a plurality of processes or programs set in advance by sequentially invoking the processes one after another in an order determined in advance.

The OS (Operation System) 57E is a program serving as basic software for controlling representative basic operations of the personal computer 1. Examples of the OS 54E are Windows 95 (trademark) developed by Microsoft, Windows 98 (trademark) also developed by Microsoft, Windows 2000 (trademark) also developed by Microsoft, Mac OS (trademark) developed by Macintosh and personal-computer Unix or its compatible OS such as Linux.

The jog-dial-state-monitoring program 54C receives a notice as to whether a jog-dial operation corresponds to one of the application programs 54H1 to 54Hn from the application programs 54H1 to 54Hn. If a specific one of the application programs 54H1 to 54Hn corresponds to a jog-dial operation, the jog-dial-state-monitoring program 54C shows the user an operation executable by operating the jog dial 4 by using a user interface function of the specific application program 54Hj. Normally, the jog-dial-state-monitoring program 54C is waiting for an event such as an operation to rotate the jog dial 4 in a direction indicated by the arrow a in FIG. 3 or an operation to press the jog dial 4 in a direction indicated by the arrow b in FIG. 3. The jog-dial-state-monitoring program 54C has a list of notices received from the application programs 54H1 to 54Hn.

The jog-dial driver 54D executes a variety of functions for operations carried out on the jog dial 4.

The display program 54F displays thumbnail icons representing files stored in the memory stick 116 mounted on the memory-stick slot 115 on the LCD unit 7. A file contains data such as moving pictures, still pictures, sounds and texts. The display program 54F carrying out file-manipulating operations such as copying, transferring and deletion of files stored in the memory stick 116 in accordance with their respective thumbnail icons displayed on the LCD unit 7.

The read-in program 54G reads out a file from the memory stick 116 mounted on the memory-stick slot 115 and supplies data stored in the file read out from the memory stick 116 to the display program 54F.

The video controller 57 is connected to the north bridge 53 through the AGP 50, and receives data of an image, a text or the like supplied by the CPU 51 by way of the AGP 50 or the north bridge 53. The video controller 57 generates an image from the received data and stores the image in a video memory embedded in the video controller 57, or stores the data as it is in the video memory. The video controller 57 displays a picture corresponding to image data stored in the video memory on the LCD unit 7 of the display unit 3.

Connected to a sound controller 64, the PCI bus 56 fetches a signal representing a sound from the microphone 66, and generates data representing the sound. The PCI bus 56 stores the data into the RAM 54. The sound controller 64 drives the speaker 65, outputting the sound to the speaker 65.

A modem 75 is connected to the PCI bus 56. The modem 75 connects the personal computer 1 to a communication network 80 such as the Internet or a packet communication network or to a mail server 78 by way of a public telephone line 76 and the Internet service provider 77, and exchanging predetermined data with a communication network 80 and the mail sever 78. The communication network 80 can be a wire or wireless network.

Connected to the PCI bus 56, a PC-card slot interface unit 111 is used for transferring data from an interface card 112 mounted on the slot 9 to the CPU 51 or the RAM 54. On the other hand, the PC-card slot interface unit 111 passes on data received from the CPU 51 to an interface card 112. A drive 113 is connected to the PCI bus 56 by the PC-card slot interface unit 111 and the interface card 112.

The drive 113 reads out data from a magnetic disc 121, an optical disc 122, a magneto-optical disc 123 or a semiconductor memory 124 mounted on the drive 113, and supplies the data read out from the optical disc 122, the magneto-optical disc 123 or the semiconductor memory 124 to the RAM 54 by way of the PC-card slot interface unit 111, the interface card 112 and the PCI bus 56.

Connected to the PCI bus 56, a memory-stick interface unit 114 supplies data received from the memory stick 116 mounted on the memory-stick slot 115 to the CPU 51 or the RAM 54. On the other hand, the memory-stick interface unit 114 passes on data received from the CPU 51 to the memory stick 116.

In addition, the south bridge 58 is also connected to the PCI bus 56. Implemented typically by a PIIX4E made by Intel, the south bridge 58 controls a variety of inputs and outputs. The south bridge 58 comprises an IDE (Integrated Drive Electronics)-controller/configuration register 59, a timer circuit 60, an IDE interface unit 61 and a USB (Universal Serial Bus) interface unit 68. The south bridge 58 controls a variety of inputs and outputs from and to a device connected to an IDE bus 62 or a device connected to an ISA/EIO (Industry Standard Architecture/Extended Input Output) bus 63 by an I/O interface 69.

The IDE-controller/configuration register 59 comprises components such as a configuration register and 2 IDE controllers, namely, the so-called primary IDE controller and the so-called secondary IDE controller.

The primary IDE controller is connected to a connector not shown in the figure by an IDE bus 62. The connector is connected to the HDD 67. On the other hand, the secondary IDE controller is connected to an external apparatus such as a CD-ROM by another IDE bus not shown in the figure.

It should be noted that a hard disk embedded in the HDD 67 is used for storing an electronic-mail program 67A, an auto-pilot program 67B, a jog-dial-state-monitoring program 67C, a jog-dial driver 67D, an OS (Operating System) 67E, a display program 67F, a read-in program 67G and application programs 67H1 to 67Hn as well as data used in execution of these programs. The programs 67A to 67Hn stored in the hard disk embedded in the HDD 67 are sequentially transferred to the RAM 54 one program after another to be stored in the RAM 54 in a process called boot-up processing.

The USB interface unit 68 transfers and receives data to and from a connected device by way of the USB port 107.

A timer circuit 60 supplies data representing the present time to the CPU 51 by way of the PCI bus 56 at a request made by the display program 67F. The display program 67F is capable of obtaining information such as the lapse of time from the present-time data received from the timer circuit 60.

An I/O interface unit 69 is connected to the ISA/EIO bus 63. The I/O interface unit 69 comprises an embedded controller 68 including a ROM 70, a RAM 71 and a CPU 72 which are connected to each other.

The ROM 70 is used for storing an IEEE-1394 I/F (Interface) program 70A, an LED control program 70B, a touch-pad-input-monitoring program 70C, a key-input-monitoring program 70D, a wake-up program 70E and a jog-dial-state-monitoring program 70F in advance.

The I/F program 70A is a program for inputting and outputting data conforming to the IEEE-1394 standard from and to the IEEE-1394 input/output port 101. The LED control program 70B is a program for controlling the on and off states of the power-supply lamp PL, the battery lamp BL, the message lamp ML if any and LEDs serving as other lamps. The touch-pad-input-monitoring program 70C is a program for monitoring inputs entered by the user by using the touch pad 6.

The key-input-monitoring 70D is a program for monitoring inputs entered by the user by using the keyboard 5. The wake-up program 70E is a program for managing powers supplied to chips. To put it in detail, the wake-up program 70E checks whether or not a set time has been reached by comparing the set time with present-time data received from the timer circuit 60 employed in the south bridge 58. If the set time has been reached, the predetermined processing or a predetermined program is activated. The 70F is a jog-dial-state-monitoring program for monitoring the rotation or the pressed state of a rotary encoder unit of the jog dial 4.

The ROM 70 is used for further storing a BIOS (Basic Input/Output System) 70G. The BIOS 70G is a software program for controlling operations carried out by the OS and an application program to input and output data from and to peripheral devices such as the display unit 3, the touch pad 6, the keyboard 5 and the HDD 67.

The RAM 71 serves as registers 71A to 71F which are used as an LED control register, a register for storing touch-pad input status, a register for storing key-input status, registers each used for storing a set time, an I/O register for monitoring the state of the jog dial 4, an IEEE-1394 register and registers for other purposes. For example, the LED control register controls an operation to turn on the message lamp ML indicating an instantaneous build-up state of an electronic mail when the jog dial 4 is pressed. The keyboard-input-status register is used for storing an operation key flag when the jog dial 4 is pressed. A time can be set in a set-time register.

The I/O interface unit 69 is connected to the jog dial 4, the touch pad 6, the keyboard 5 and the IEEE-1394 input/output port 101 by connectors not shown in the figure. When the user operates the jog dial 4, the touch pad 6 or the keyboard 5, the I/O interface unit 69 inputs a signal representing the operation from the jog dial 4, the touch pad 6 or the keyboard 5 respectively and passes on the signal to the ISA/EIO bus 63.

In addition, the I/O interface unit 69 also exchanges data with the external world through the IEEE-1394 input/output port 101. Furthermore, the I/O interface unit 69 is connected to the power-supply lamp PL, the battery lamp BL, the message lamp ML, LEDs serving as other lamps and a power-supply control circuit 73.

Connected to an embedded battery 74 or an AC power supply, the power-supply control circuit 73 supplies required powers to the blocks. The power-supply control circuit 73 controls an operation to charge the battery 74 and a second battery of peripheral devices. The I/O interface unit 69 also monitors the status of the switch 8 to turn on and off the power supply 8.

When the power supply 8 is turned off, the I/O interface unit 69 is always driven by an internal power supply to execute programs ranging from the I/F program 70A to the jog-dial-state-monitoring program 70F. Thus, the programs ranging from the I/F program 70A to the jog-dial-state-monitoring program 70F are always executed even if no window is opened on the LCD unit 7 of the display unit 3.

Therefore, when the power supply 8 is turned off, the I/O interface unit 69 executes the jog-dial-state-monitoring program 70F even if the CPU 51 does not activate the OS 54E. As a result, the personal computer 1 has a PPK (Programmable Power Key) function even if no special key is provided. Even in a state of saving power or an off-power state, for example, the user is capable of invoking desired software or a script file by merely pressing the jog dial 4.

Figure 6:
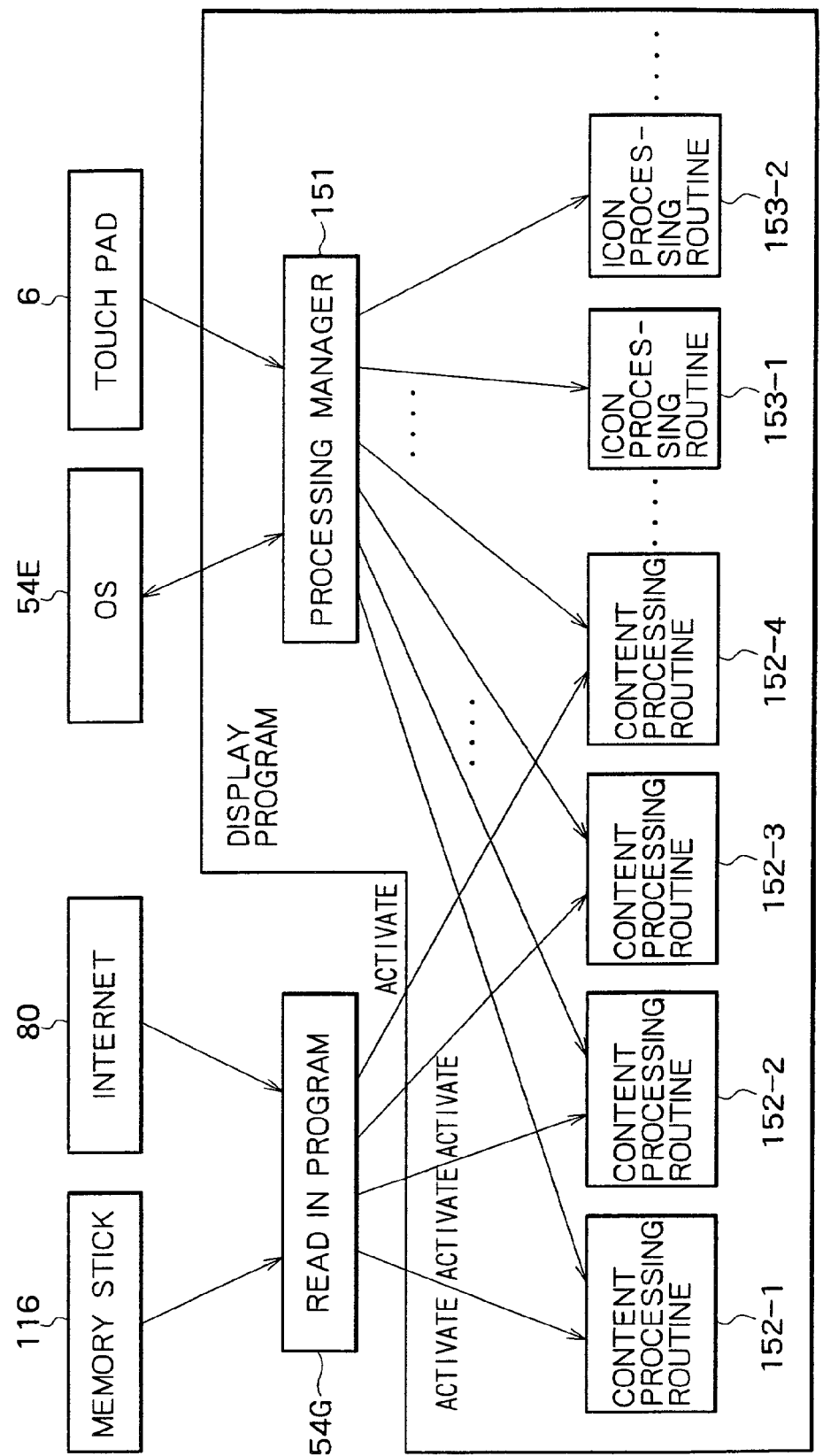
FIG. 6 is a block diagram showing functions of the personal computer shown in FIG. 1.

FIG. 6 is an explanatory diagram showing the structure of the display program 54F and the read-in program 54G which are executed by the personal computer 1. As shown in the figure, the display program 54F comprises a processing manager 151, content-processing routines 152-1 to 152-N and icon-processing routines 153-1 to 153-N.

The processing manager 151 computes, among other quantities, positions for displaying thumbnail icons representing pictures, other files and time-axis data associated with the pictures and the other files, which are read in from the memory stick 116, at timings coinciding with input events supplied by the touch pad 6 or the OS 54E, and supplies the positions to the content-processing routines 152-1 to 152-N. The thumbnail icons' display positions supplied by the processing manager 151 to the content-processing routines 152-1 to 152-N include left, right, top and bottom positions on the LCD unit 7 as well as a deep position. A deep position represents a virtual distance from the surface of the LCD unit 7. The deep position is used for determining which of thumbnail icons superposed on each other is to be displayed, and used for determining the size of a displayed thumbnail icon.

The processing manager 151 also controls periods of the content-processing routines 152-1 to 152-N to display thumbnail icons.

The processing manager 151 computes, among other quantities, positions for displaying icons on the basis of input events supplied by the touch pad 6 or the OS 54E, and supplies the positions to the icon-processing routines 153-1 to 153-N. The processing manager 151 also controls periods of the icon-processing routines 153-1 to 153-N to display icons.

The processing manager 151 informs the content-processing routines 152-1 to 152-N of display information on the basis of input events supplied by the touch pad 6 or the OS 54E. The display information includes display positions of thumbnail icons, display cycles and picture colors.

The processing manager 151 requests the OS 54E to copy, delete or transfer a file represented by a thumbnail icon displayed by any one of the content-processing routines 152-1 to 152-N in accordance with an input event supplied by the touch pad 6.

As many content-processing routines 152-1 to 152-N as files read in from the memory stick 116 are activated at a request made by the read-in program 54G.

When the read-in program 54G completes an operation to read in 4 files from the memory stick 116, for example, the read-in program 54G requests that 4 content-processing routines, namely, the content-processing routines 152-1 to 152-4 be activated. As another example, when the read-in program 54G completes an operation to read in 8 files from the memory stick 116, the read-in program 54G requests that 8 content-processing routines, namely, the content-processing routines 152-1 to 152-8 be activated.

As described above, as many content-processing routines 152-1 to 152-N as files read in from the memory stick 116 by the read-in program 54G are activated. In actuality, the display program 54F executes the same content-processing routine 152 repeatedly as many times as files read in from the memory stick 116 to produce results as if the required content-processing routines 152-1 to 152-N were operating.

The content-processing routine 152-1 displays a thumbnail icon representing a file read in from the memory stick 116 on the LCD unit 7 on the basis of a command issued by the processing manager 151. By the same token, the content-processing routine 152-2 displays a thumbnail icon representing a file read in from the memory stick 116 on the LCD unit 7 on the basis of a command issued by the processing manager 151. In the same way, the content-processing routines 152-3 to 152-N each display a thumbnail icon representing a file read in from the memory stick 116 on the LCD unit 7 on the basis of a command issued by the processing manager 151.

In this way, the content-processing routines 152-1 to 152-N each display a thumbnail icon on the LCD unit 7 on the basis of a command issued by the processing manager 151.

As many icon-processing routines 153-1 to 153-N as icons to be described later are activated.

The icon-processing routine 153-1 displays an icon on the LCD unit 7 on the basis of a command issued by the processing manager 151. By the same token, the icon-processing routine 153-2 displays another icon on the LCD unit 7 on the basis of a command issued by the processing manager 151. In the same way, the icon-processing routines 153-3 to 153-N each display a different icon on the LCD unit 7 on the basis of a command issued by the processing manager 151.

As described above, the icon-processing routines 153-1 to 153-N each display an icon on the LCD unit 7 on the basis of a command issued by the processing manager 151.

When the read-in program 54G completes an operation to read in a file from the memory stick 116, the read-in program 54G requests that one of the content-processing routines 152-1 to 152-N be activated, and supplies the file to the activated one of the content-processing routines 152-1 to 152-N.

In addition, when the read-in program 54G completes an operation to read in a file from the memory stick 116 through the 80 such as the Internet, the read-in program 54G requests that one of the content-processing routines 152-1 to 152-N be activated, and supplies the file to the activated one of the content-processing routines 152-1 to 152-N.

In the following description, if it is not necessary to distinguish the content-processing routines 152-1 to 152-N from each other, a generic reference numeral 152 is used for denoting any of the content-processing routines 152-1 to 152-N. It should be noted that the content-processing routines 152-1 to 152-N are executed concurrently. By the same token, if it is not necessary to distinguish the icon-processing routines 153-1 to 153-N from each other, a generic reference numeral 153 is used for denoting any of the content-processing routines 153-1 to 153-N.

Next, screens displayed by the display program 54F on the LCD unit 7 are explained sequentially in accordance with operations carried out on the personal computer 1 assumed to operate normally.

Figure 7:
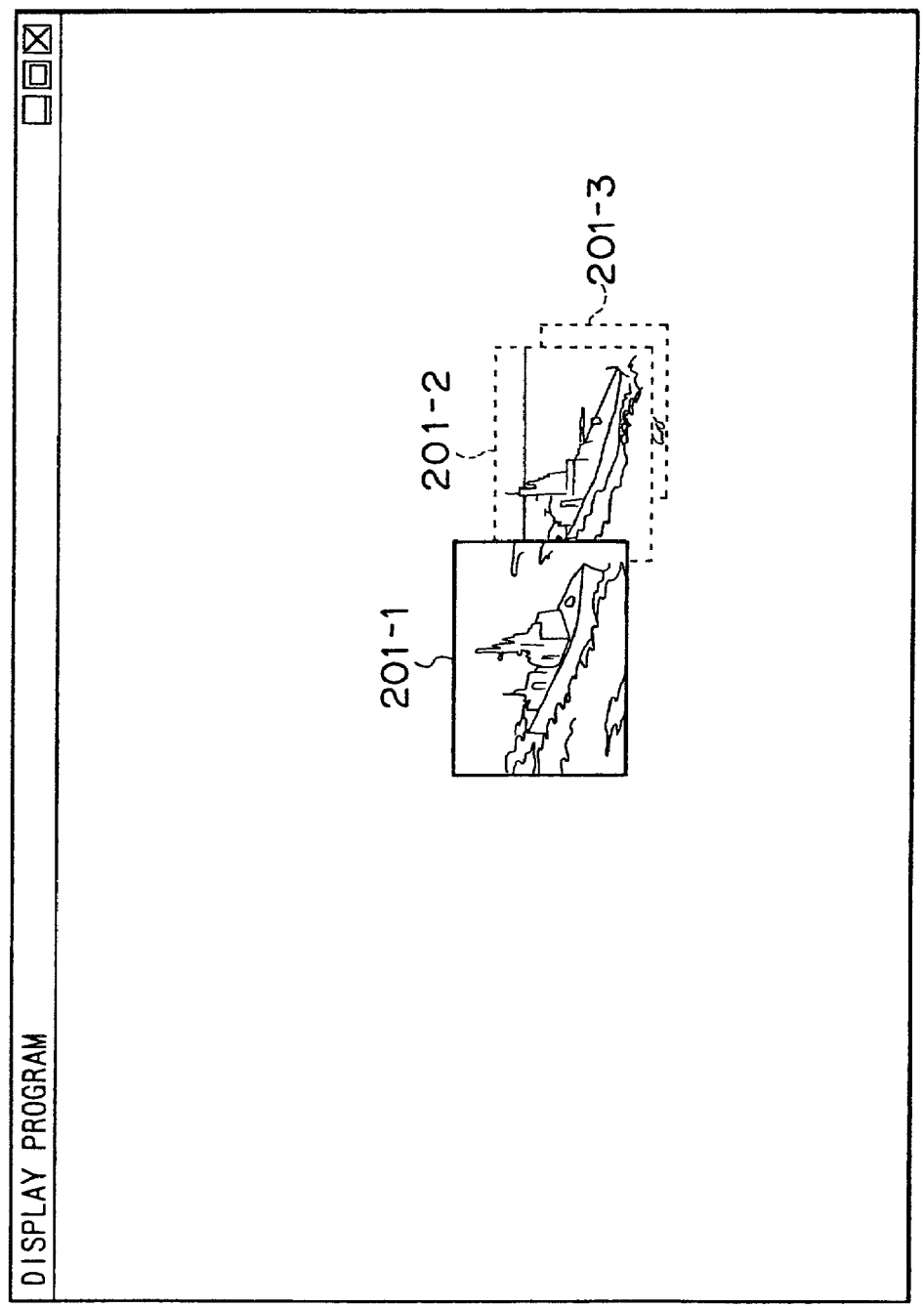
FIG. 7 is an explanatory diagram showing a screen displayed on an LCD unit.
Figure 8:
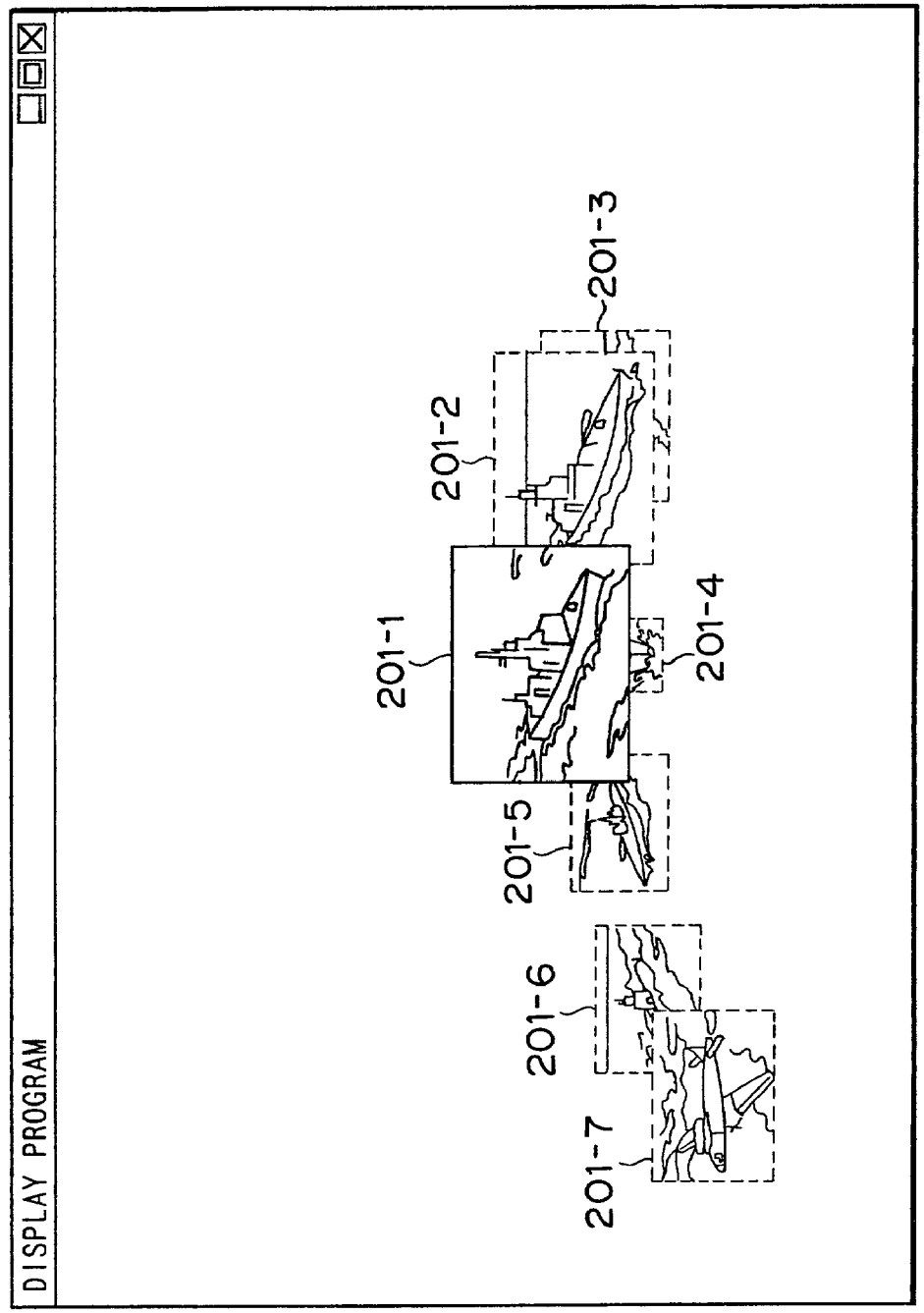
FIG. 8 is an explanatory diagram showing another screen displayed on the LCD unit.
Figure 9:
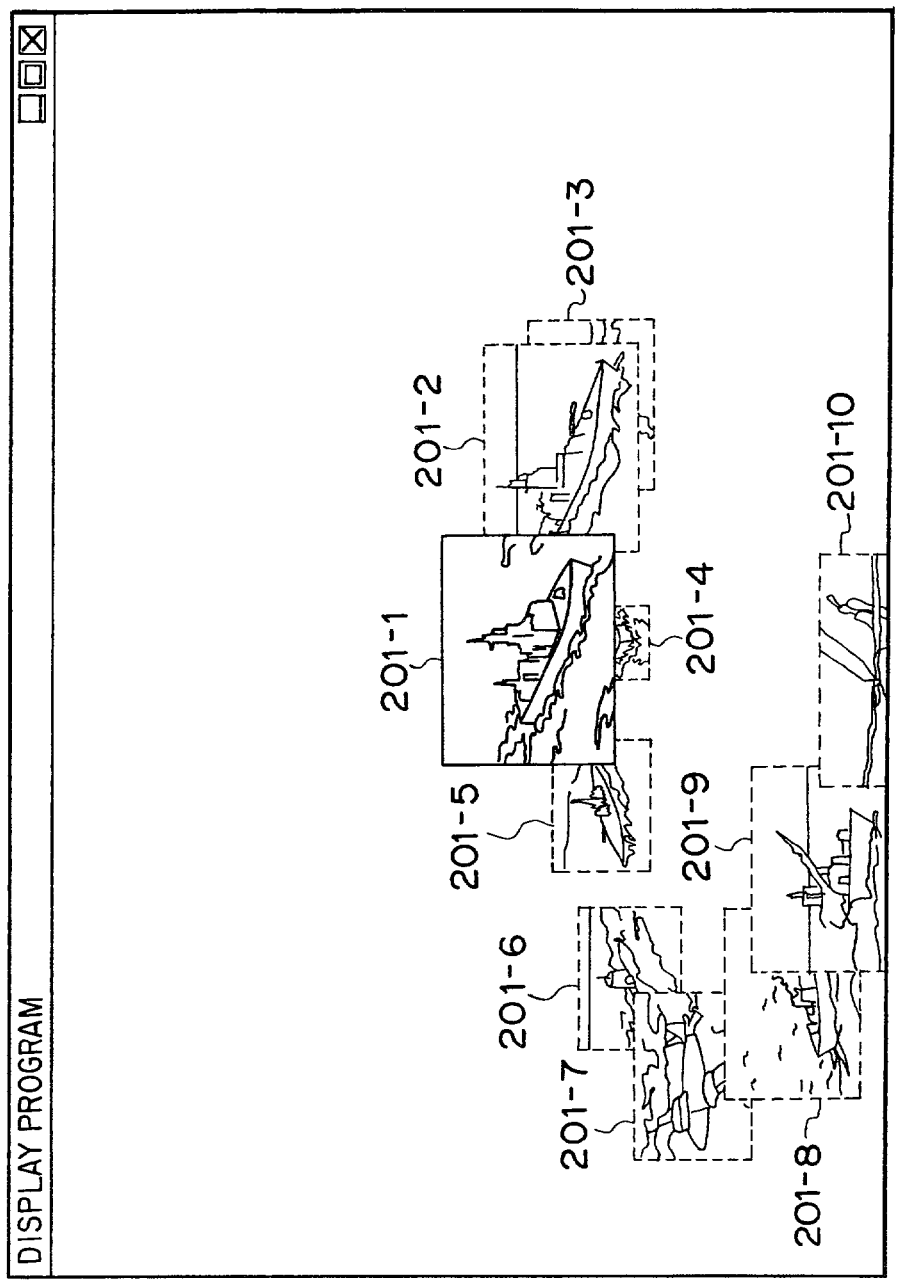
FIG. 9 is an explanatory diagram showing a further screen displayed on the LCD unit.

FIGS. 7 to 9 are each an explanatory diagram showing a screen which is displayed on the LCD unit 7 upon activation of the display program 54F when the memory stick 116 used for storing 10 files is mounted on the memory-stick slot 115. It should be noted that, in FIGS. 7 to 9, FIGS. 17A and 17B, FIG. 20, FIGS. 22 to 25 and FIGS. 28 to 32 which are referred to in the following description, the line of a spiral itself and the axis of the spiral are not shown in order to make the drawings simple. The line of a spiral is a virtual line representing the locus of the spiral. On the other hand, the axis of a spiral is a line approximately representing centers along the spiral.

When the read-in program 54G reads in 1 file from the memory stick 116, the read-in program 54G activates a content-processing routine 152 and requests the display program 54F to display a thumbnail icon representing data stored in the file read in from the memory stick 116.

FIG. 7 is a diagram showing a screen which is displayed by the display program 54F on the LCD unit 7 after the read-in program 54G completes an operation to read in 3 of the 10 files from the memory stick 116 upon activation of the display program 54F.

A thumbnail icon 201-1 is displayed by the content-processing routine 152-1. The thumbnail icon 201-1 is generated from a file read in first by the read-in program 54G from the memory stick 116. By the same token, a thumbnail icon 201-2 is displayed by the content-processing routine 152-2. The thumbnail icon 201-2 is generated from a second file read in first by the read-in program 54G from the memory stick 116. In the same way, a thumbnail icon 201-3 is displayed by the content-processing routine 152-3. The thumbnail icon 201-3 is generated from a third file read in first by the read-in program 54G from the memory stick 116.

As will be described later, the thumbnail icons 201-1 to 20-3 are laid out on a virtual spiral. In the following description, if it is not necessary to distinguish the thumbnail icons 201-1 to 201-N from each other, a generic reference numeral 201 is used for denoting any of the thumbnail icons 201-1 to 201-N.

The content-processing routine 152 generates a thumbnail icon 201 according to the type of data supplied by the read-in program 54G.

When a picture file containing a moving picture is received from the read-in program 54G, for example, the content-processing routine 152 generates a thumbnail icon 201 based on data of a first frame picture of the moving picture.

The content-processing routine 152 generates a thumbnail icon 201 from data of a still picture when receiving a picture file containing the still picture conforming to the TIFF (Tag Image File Format) or GIF (Graphic Interchange Format) system. The content-processing routine 152 utilizes data of a thumbnail icon stored in the header of data of a still picture conforming to the JPEG (Joint Photographic Experts Group) system when receiving the data.

The content-processing routine 152 generates a special thumbnail picture based on data representing a sound or data representing a text when receiving a file containing the sound or the text from the read-in program 54G, and uses the picture for displaying a thumbnail icon 201. The processing carried out by the content-processing routine 152 to generate a picture as the thumbnail icon 201 in accordance with data of a sound or data of a text will be described later.

When processing of files represented by the thumbnail icons 201-1 to 201-3 is requested by operating the jog dial 4, the keyboard 5 or the touch pad 6, the display program 54F carries out the processing of files represented by the thumbnail icons 201-1 to 201-3. Examples of the processing are enlarged displaying, reproduction, displaying of attribute information, copying, deletion and transferring. For instance, the processing manager 151 requests the OS 54E to copy, delete or transfer a file represented by any one of the thumbnail icons 201-1 to 201-3 in accordance with an input entered via the touch pad 6 or the like.

FIG. 8 is a diagram showing a typical screen which is displayed by the display program 54F on the LCD unit 7 after the read-in program 54G completes an operation to read in 7 of the 10 files from the memory stick 116 upon activation of the display program 54F.

The thumbnail icon 201-4 is a picture displayed by the content-processing routine 152-4 to represent data stored in the fourth file read in by the read-in program 54G from the memory stick 116. By the same token, the thumbnail icon 201-5 is a picture displayed by the content-processing routine 152-5 to represent data stored in the fifth file read in by the read-in program 54G from the memory stick 116.

Likewise, the thumbnail icon 201-6 is a picture displayed by the content-processing routine 152-6 to represent data stored in the sixth file read in by the read-in program 54G from the memory stick 116. Similarly, the thumbnail icon 201-7 is a picture displayed by the content-processing routine 152-7 to represent data stored in the seventh file read in by the read-in program 54G from the memory stick 116.

The thumbnail icons 201-1 to 201-7 are located on the line of a virtual spiral. The line of a spiral itself is a virtual line representing the locus of the spiral. On the other hand, the axis of a spiral is a line approximately representing centers along the spiral. Both the virtual line and the spiral axis are not shown in the figure.

When processing of files represented by the thumbnail icons 201-1 to 201-7 is requested by operating the jog dial 4, the keyboard 5 or the touch pad 6, the display program 54F carries out the processing of files represented by the thumbnail icons 201-1 to 201-7. Examples of the processing are enlarged displaying, reproduction, displaying of attribute information, copying, deletion and transferring. For instance, the processing manager 151 requests the OS 54E to copy, delete or transfer a file represented by any one of the thumbnail icons 201-1 to 201-7 in accordance with an input entered via the touch pad 6 or the like.

FIG. 9 is a diagram showing a typical screen which is displayed by the display program 54F on the LCD unit 7 after the read-in program 54G completes an operation to read in all the files from the memory stick 116 upon activation of the display program 54F.

The thumbnail icon 201-8 is a picture displayed by the content-processing routine 152-8 to represent data stored in the eighth file read in by the read-in program 54G from the memory stick 116. By the same token, the thumbnail icon 201-9 is a picture displayed by the content-processing routine 152-9 to represent data stored in the ninth file read in by the read-in program 54G from the memory stick 116. Likewise, the thumbnail icon 201-10 is a picture displayed by the content-processing routine 152-10 to represent data stored in the tenth file read in by the read-in program 54G from the memory stick 116.

The thumbnail icons 201-1 to 201-10 are located on the line of a virtual spiral. The line of a spiral itself is a virtual line representing the locus of the spiral. On the other hand, the axis of a spiral is a line approximately representing centers along the spiral. Both the virtual line and the spiral axis are not shown in the figure.

When processing of files represented by the thumbnail icons 201-1 to 201-10 is requested by operating the jog dial 4, the keyboard 5 or the touch pad 6, the display program 54F carries out the processing of files represented by the thumbnail icons 201-1 to 201-10. Examples of the processing are enlarged displaying, reproduction, displaying of attribute information, copying, deletion and transferring. For instance, the processing manager 151 requests the OS 54E to copy, delete or transfer a file represented by any one of the thumbnail icons 201-1 to 201-10 in accordance with an input entered via the touch pad 6 or the like.

As described above, when the read-in program 54G reads in picture files or the like from the memory stick 116, the display program 54F sequentially displays thumbnail icons 201 representing data stored in the files read in from the memory stick 116 one thumbnail icon after another. Thus, the user of the personal computer 1 is capable of obtaining information on data contained in picture files or the like stored in the memory stick 116 and current read-in status of picture files or the like.

When the read-in program 54G reads in a file from the memory stick 116, the display program 54F carries out processing requested for the file read in from the memory stick 116 at that point of time in accordance with the request for the processing.

Since the display program 54F sequentially displays thumbnail icons 201 representing data stored in files read in from the memory stick 116 one thumbnail icon after another even if the files are read in at late timings, the user is capable of determining an operation to be carried out next on the basis of the displayed thumbnail icons 201.

Processing executable on files represented by the thumbnail icons 201-1 to 201-3 in a state shown in FIG. 7 is the same as processing executable on files represented by the thumbnail icons 201-1 to 201-7 in a state shown in FIG. 8 and processing executable on files represented by the thumbnail icons 201-1 to 201-10 in a state shown in FIG. 9.

Figure 10:
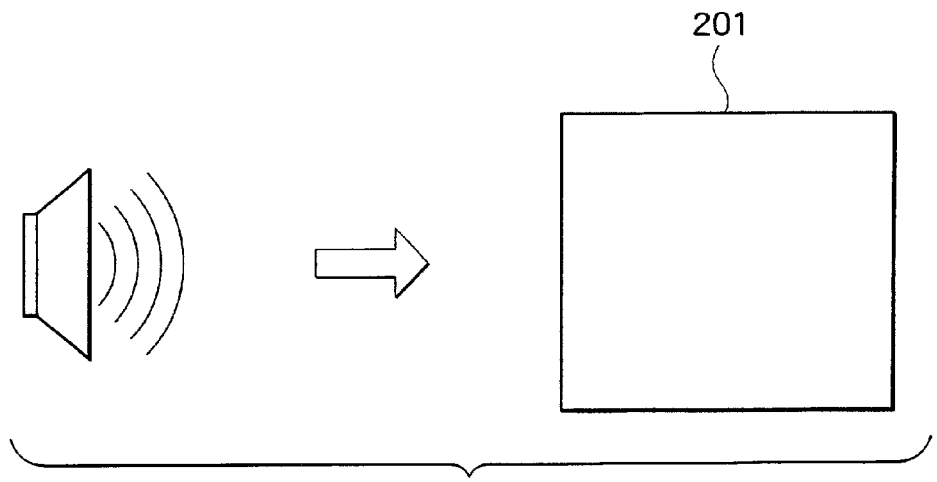
FIG. 10 is an explanatory diagram showing a thumbnail icon representing audio data.

The following description explains the thumbnail icon 201 showing a picture accompanying data of a sound or a text. As shown on the right side of FIG. 10, the display program 54F generates data of a sound or a text and a picture to be attached to the data, and displays the data and the picture as the thumbnail icon 201.

Figure 11:
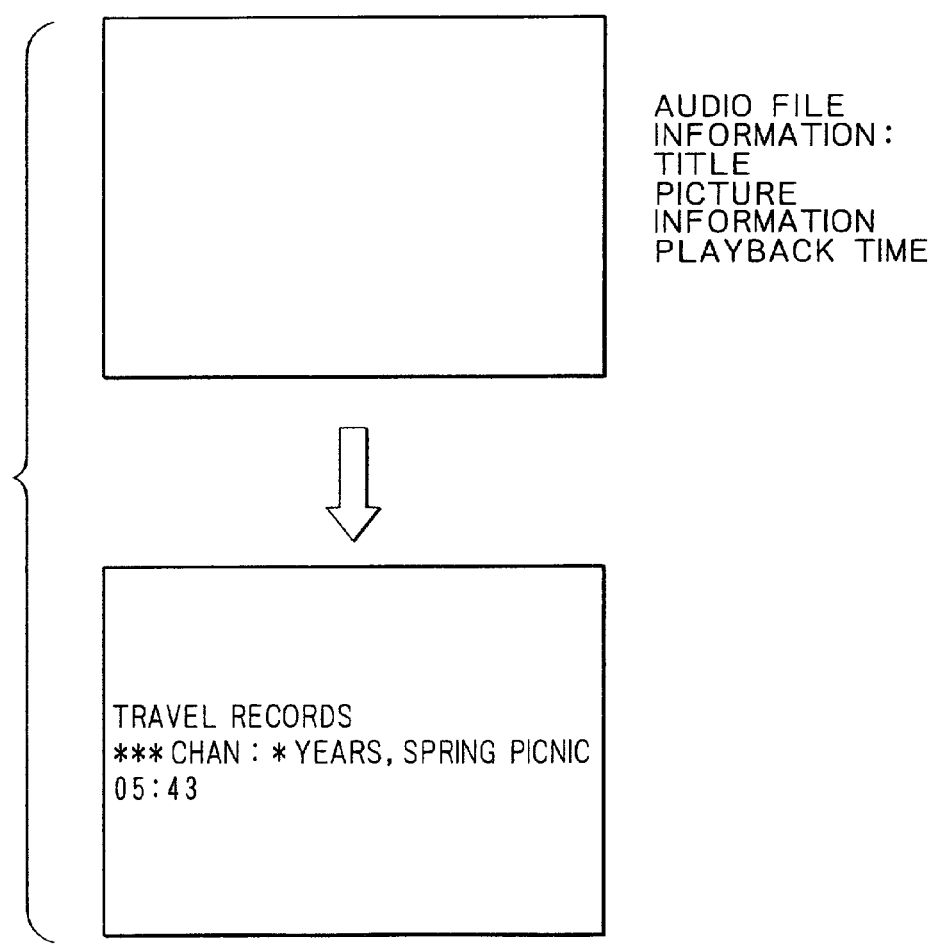
FIG. 11 is an explanatory diagram showing a thumbnail icon expressing a picture representing audio data.

FIG. 11 is an explanatory diagram showing a procedure executed by the content-processing routine 152 to generate a thumbnail icon 201 showing audio data and a picture for the audio data.

First of all, the content-processing routine 152 sets an area for displaying the thumbnail icon 201 in accordance with the size of the thumbnail icon 201 to be displayed. The content-processing routine 152 associates the size of the area for displaying the thumbnail icon 201 with audio data (or an audio file). Then, the volume (the output) of the audio data is increased to a level corresponding to the size of the display area.

In addition, the content-processing routine 152 writes a title, picture information, playback attribute data and the like, which are included in the audio file, over predetermined locations on the thumbnail icon 201 as a text. An example of the title is Travel Record. An example of the picture information is "XΔ: O years, spring picnic." It should be noted that the attribute data may include weather information such as a temperature and a humidity at creation of data serving as a base of the thumbnail icon 201. These pieces of information can be obtained by using an automatic recording apparatus, input operations or the like at the creation of the data.

Since the content-processing routine 152 writes a title such as Travel Record, picture information such as "XΔ: O years, spring picnic," playback attribute data and the like, which are included in the audio file, over predetermined locations on the thumbnail icon 201 as a text, the user or the watcher/listener is capable of obtaining more detailed information on the thumbnail icon 201 representing audio data by merely looking at the thumbnail icon 201.

As described above, audio data directly relevant to a displayed thumbnail icon 201 is displayed by associating the audio data with the thumbnail icon 201. Contemporary music, contemporary audio data and colors, which are not directly related to a displayed thumbnail icon 201, may also be displayed in front of or behind the thumbnail icon 201. The following description explains a typical thumbnail icon showing a relation between audio data and a color by referring to FIG. 12.

The content-processing routine 152 extracts any arbitrary portion from audio data and generates pixel values based on the extracted portion. In the case of a data train, typically, a portion in the middle of the data train is extracted. For example, the content-processing routine 152 cuts out a portion in 8-bit units from audio data and treats the portion as RGB data.

Figure 12:
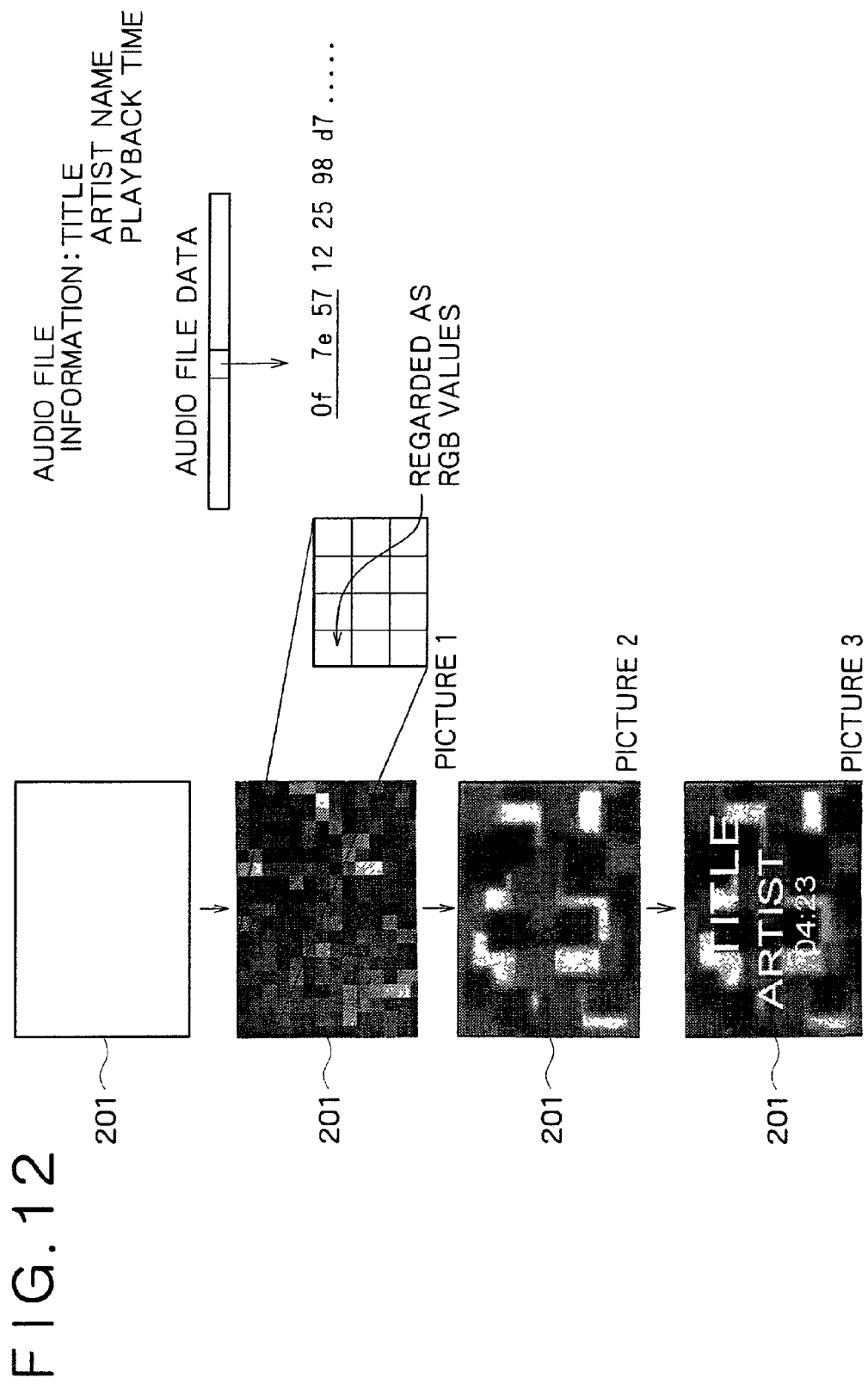
FIG. 12 is an explanatory diagram showing a procedure for generating a thumbnail icon expressing a picture representing audio data.

In the example shown in FIG. 12, a unit 0fh is treated as R data, a unit 7h is treated as G data and a unit 57h is treated as B data. In the following description, a suffix "h" appended after a number indicates that the number is expressed in the hexadecimal format. The units 0fh, 7eh and 57h are followed by units 12h, 25h and 98h which are treated as R, G and B data respectively.

In the case of encrypted or encoded data, the content-processing routine 152 generates RGB data from the encrypted or encoded audio data without carrying out processing such as a synthesis.

By doing this, the content-processing routine 152 generates as many pixel values such as RGB data as split regions of the thumbnail icon 201.

The content-processing routine 152 divides the area of the thumbnail icon 201 into rectangular regions each consisting of a predetermined number of pixels. The content-processing routine 152 then sets RGB data for each of the rectangular regions. At this point of time, the thumbnail icon 201 is a picture with a color varying from rectangular region to rectangular region like picture 1 shown in FIG. 12.

The content-processing routine 152 then applies the so-called shading-off processing to the thumbnail icon 201 in which RGB data has been set. By shading off the thumbnail icon 201 in which RGB data has been set, there is resulted in an effect that the displayed thumbnail icon 201 becomes easy to see like picture 2 shown in FIG. 12.

Processing added to the thumbnail icon 201 in which RGB data has been set may include any other picture processing such as embossing or contour extraction.

In addition, a picture set in the thumbnail icon 201 can be generated on the basis of a spectrum for audio data. For example, colors for levels of frequency bands are set on pixels in horizontal arrays of the thumbnail icon 201. For instance, a level of −40 dB is associated with a color at 0 degrees in the hue circle and a level of 0 dB is associated with a color at 360 degrees in the hue circle. Then, the vertical arrays of the thumbnail icon 201 are associated with the lapse of time. In this way, it is possible to set a picture representing the lapse of time of the audio spectrum.

Figure 13:
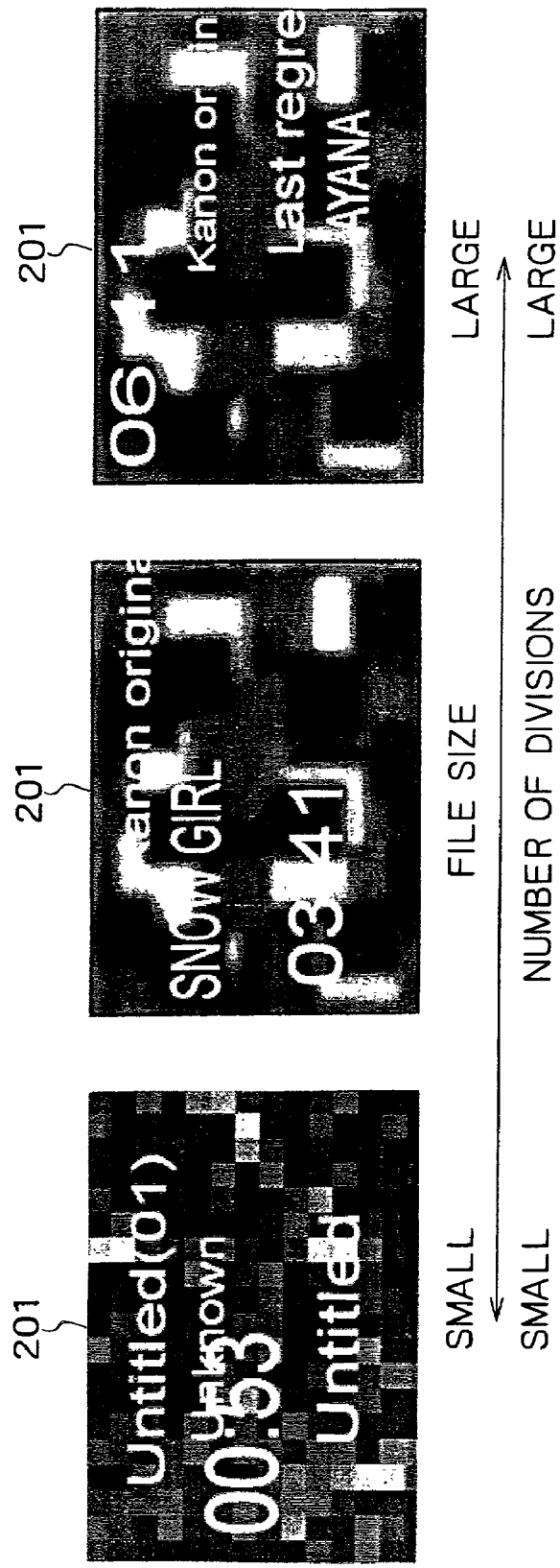
FIG. 13 is an explanatory diagram showing another thumbnail icon expressing a picture representing audio data.

As shown in FIG. 13, the content-processing routine 152 divides an area for displaying the thumbnail icon 201 into a small number of rectangular regions in the case of little audio data. In the case of much audio data, on the other hand, the content-processing routine 152 divides an area for displaying the thumbnail icon 201 into a large number of rectangular regions.

With such division, the user of the personal computer 1 is capable of estimating the amount of audio data by merely looking at the thumbnail icon 201 representing the audio data.

Figure 14:
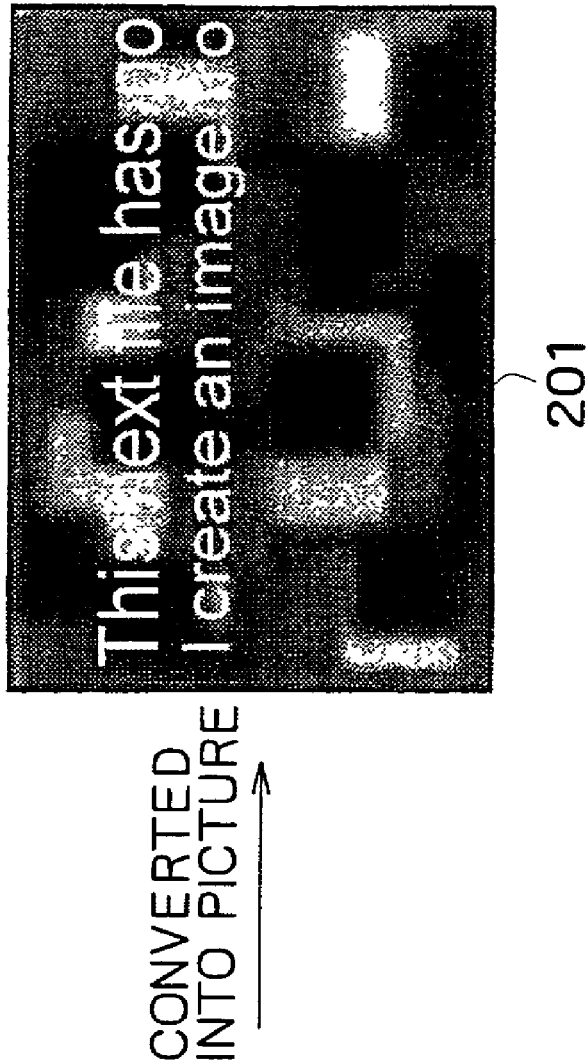
FIG. 14 is an explanatory diagram showing a thumbnail icon expressing a picture representing text data.

The content-processing routine 152 generates a thumbnail icon 201 based on text data in accordance with the same procedure as the generation of a thumbnail icon 201 for audio data. In this case, the content-processing routine 152 may also extract texts of predetermined essentials from the text data and displays the extracted text as a text on the thumbnail icon 201 as shown in FIG. 14.

As described above, the display program 54F is capable of generating audio data or text data for a thumbnail icon 201.

It should be noted that the display program 54F generates not only audio data and text data, but also a thumbnail icon 201 representing data not including a picture. Examples of data not including a picture are data stored in an HTML (Hypertext Markup Language) file, data for tabular computation and an executable program (a load module).

Next, a layout of thumbnail icons 201 displayed by the display program 54F is explained.

Traditionally, when thumbnail icons or information associated with thumbnail icons are displayed, in general, the thumbnail icons are laid out so that they are not superposed on each other and the information is displayed at locations adjacent to the thumbnail icons as shown in FIG. 15. On the other hand, as an implementation of this embodiment, thumbnail icons 201 are displayed by being superposed on each other.

In this embodiment, a virtual spiral is prescribed and thumbnail icons 201 are laid out on the virtual spiral. Such a layout is referred to hereafter as a spiral view.

Figure 16:
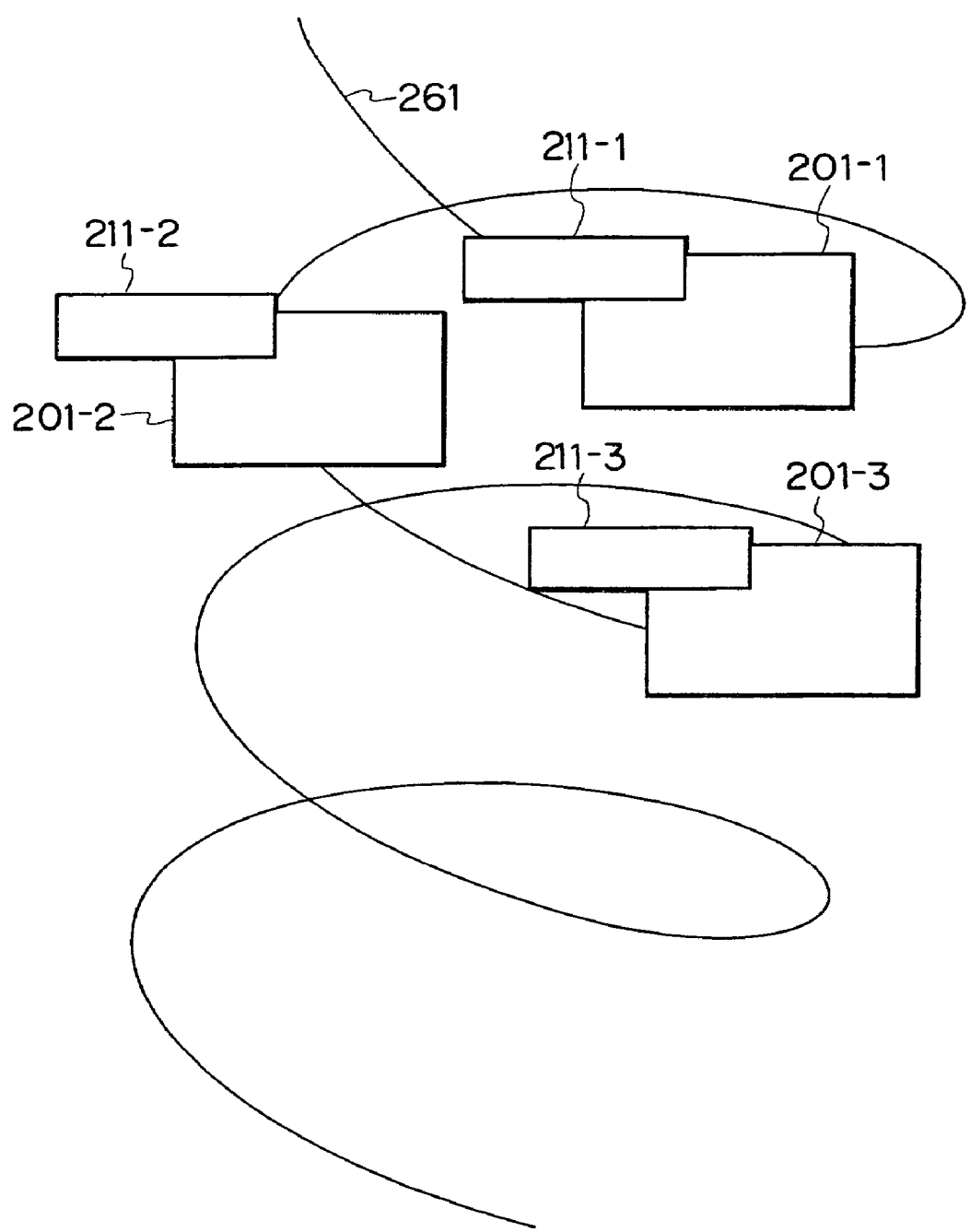
FIG. 16 is an explanatory diagram used for describing a spiral view.

As shown in FIG. 16, the display program 54F prescribes a spiraling axis 261 in the form of a spiral. The spiraling axis 261 is a line of the spiral itself and is not a line approximately passing through centers of the spiral. With the spiraling axis 261 used as a base, thumbnail icons 201-1 to 201-3 and texts 211-1 to 211-3 are laid out. The spiraling direction of the spiraling axis 261 is the depth direction of the screen. Thus, the size of a thumbnail icon 201 displayed on the LCD unit 7 varies in dependence of the position on the spiraling axis 261 even though the actual size of the thumbnail icon 201 is actually unchanged. As shown in FIG. 16, the displayed axis 261 is visible. As a format of a visible display, it is possible to properly select one of a variety of formats such as a solid line, a variety of dashed lines such as a single-dotted line, a double-dotted line and other kinds of line, a color, semitransparency and thickness.

Since a selected thumbnail icon 201 is placed at a location at a shortest distance from the screen, a selected thumbnail icon 201 appears as a thick figure. The display program 54F displays a selected thumbnail icon 201 as a thick display and displays an unselected thumbnail icon 201 as a small figure in comparison with a selected thumbnail icon 201.

As described above, while the display program 54F is displaying a large number of thumbnail icons 201, the display program 54F displays a thumbnail icon 201 of interest to the user or the watcher/listener as a large figure but a thumbnail icon 201 of no interest to the user or the watcher/listener as a small figure. Thus, the screen of the LCD unit 7 can be used with a higher degree of efficiency.

In addition, as shown in FIG. 17A, the display program 54F may also prescribe spiraling axes 261-1 and 261-2 which have center lines coinciding with each other wherein a thumbnail icon 201 is placed with the spiraling axis 261-1 taken as a base and a text 211 is placed with the spiraling axis 261-2 used as a base. As described above, a spiraling axis is the spiraling line of an axis. By having such a scheme, the text 211 can be displayed by being attached to the thumbnail icon 201 as shown in FIG. 17B.

The coordinates (x, y, z) of a point on a spiraling axis 261 with a radius r are expressed by Eqs. (8), (9) and (10) respectively as follows.

$$x = r \sin(t) + c0t \qquad (8)$$

$$y = c1t \qquad (9)$$

$$z = r \cos(t) \qquad (10)$$

where notation r is the radius of the spiral, notations c0 and c1 each denote a constant determining the gradient of the spiral whereas notation t denotes any value.

Figure 18:
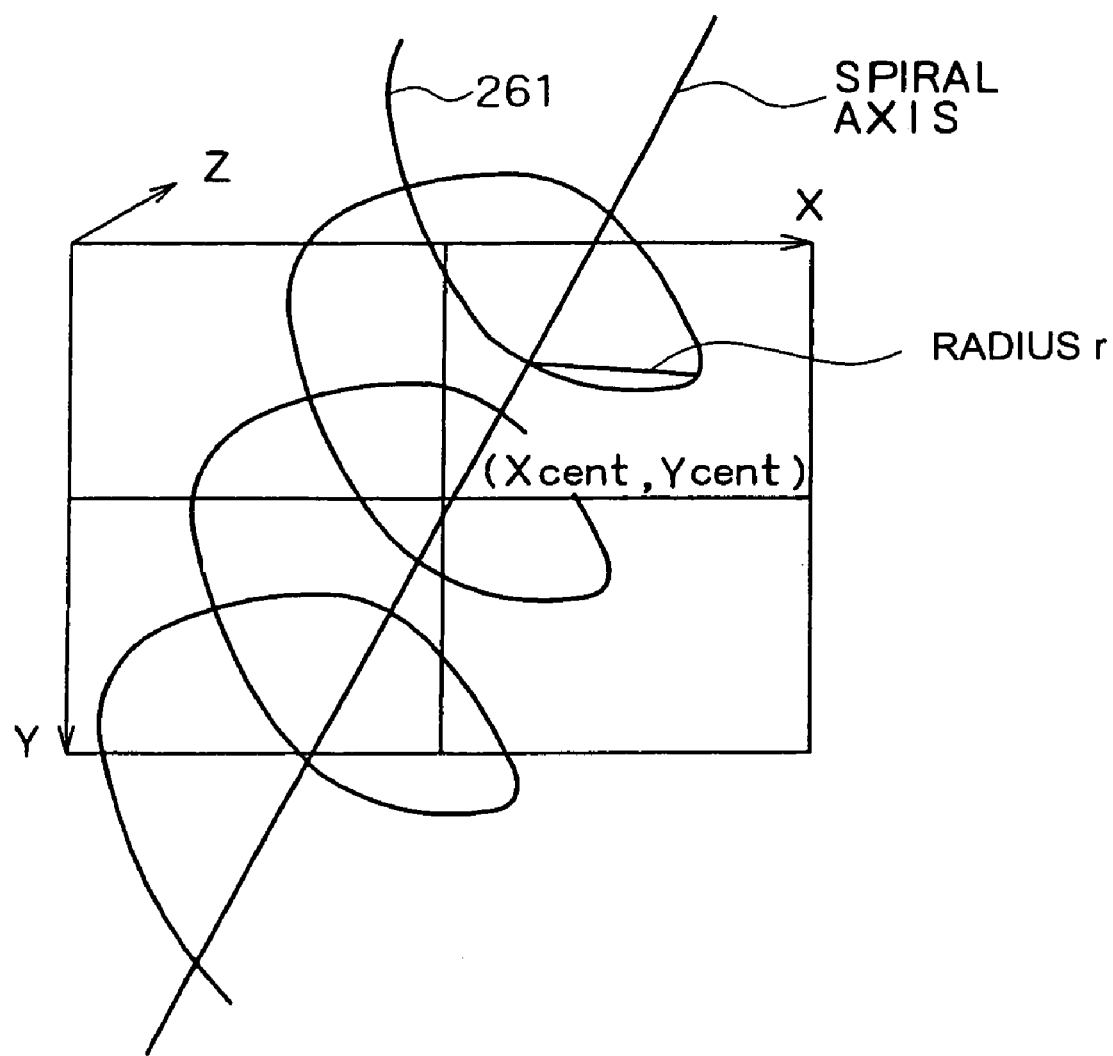
FIG. 18 is an explanatory diagram used for describing an axis.

As shown in FIG. 18, the coordinates $(x_i, y_i, z_i)$ of a thumbnail icon 201 located on a spiraling axis 261 with a radius r are expressed by Eqs. (11), (12) and (13) respectively as follows.

$$xi = X\text{cent} + r \sin(i*2\pi/9) + (i*r/20) \qquad (11)$$

$$yi = Y\text{cent} + (i*r/10) \qquad (12)$$

$$zi = r - r \cos(i*2\pi/9) \qquad (13)$$

where notations Xcent and Ycent denote the coordinates of the center of the screen. A z axis is a coordinate axis oriented in the depth direction of the screen perpendicularly to x and y axes. It should be noted that constants of 20 and 10 are used in Eqs. (11) and (12) respectively.

It should be noted that the display program 54F is capable of rearranging thumbnail icons 201 in a spiral view on the basis of information such as a creation date, a photographing time, a file name and the picture size.

Figure 19:
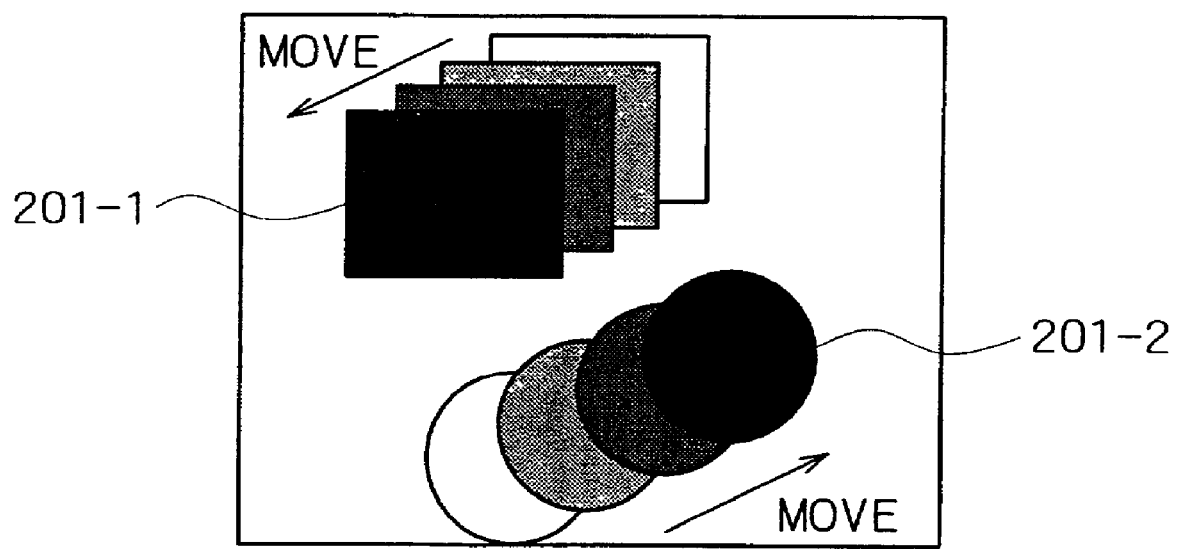
FIG. 19 is an explanatory diagram used for describing afterimage processing.

The following description explains a display of an afterimage accompanying a movement of a thumbnail icon 201. The content-processing routine 152 draws a thumbnail icon 201 at a typical rate of 30 times per second. As shown in FIG. 19, the content-processing routine 152 displays an afterimage of the previous drawing on the screen after a thumbnail icon 201 has been moved.

With a display of an afterimage not set, the content-processing routine 152 deletes the current screen and draws newly a thumbnail icon 202.

With a display of an afterimage set, on the other hand, the content-processing routine 152 sets the brightness of a picture previously displayed at typically 80% when drawing a thumbnail icon 201 as shown in FIG. 20. That is to say, the content-processing routine 152 draws the thumbnail icon 201 over the picture with the brightness thereof set at 80%.

Thus, when a thumbnail icon 201 is moved, the content-processing routine 152 lowers the brightness of a previously drawn picture in each drawing operation. As a result, an afterimage is displayed. By carrying out such processing, the display program 54F is capable of displaying an afterimage at a small amount of processing.

Figure 21:
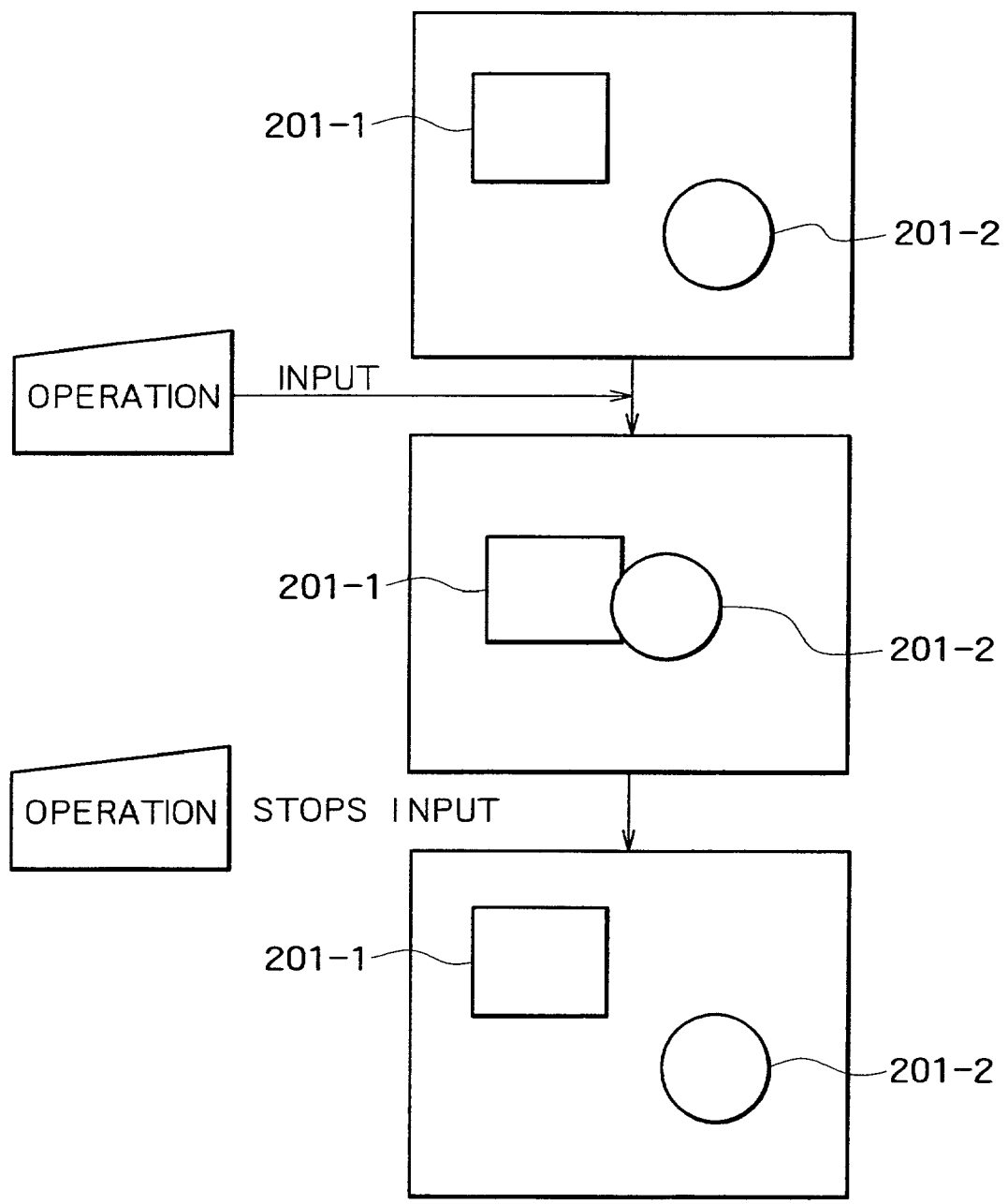
FIG. 21 is an explanatory diagram used for describing processing to change the display position of a thumbnail icon.

As shown in FIG. 21, the processing manager 151 changes the display position of a thumbnail icon 201 in a spiral view with the jog dial 4, the keyboard 5 and the touch pad 6 operated to a location different from a display position with the jog dial 4, the keyboard 5 and the touch pad 6 not operated.

In addition, the processing manager 151 also changes a display of a thumbnail icon 201 in a spiral view with typically a direction key of the keyboard 5 or the like pressed continuously to a location different from a display position obtained as a result of pressing the key only once and releasing the key immediately.

Figure 22:
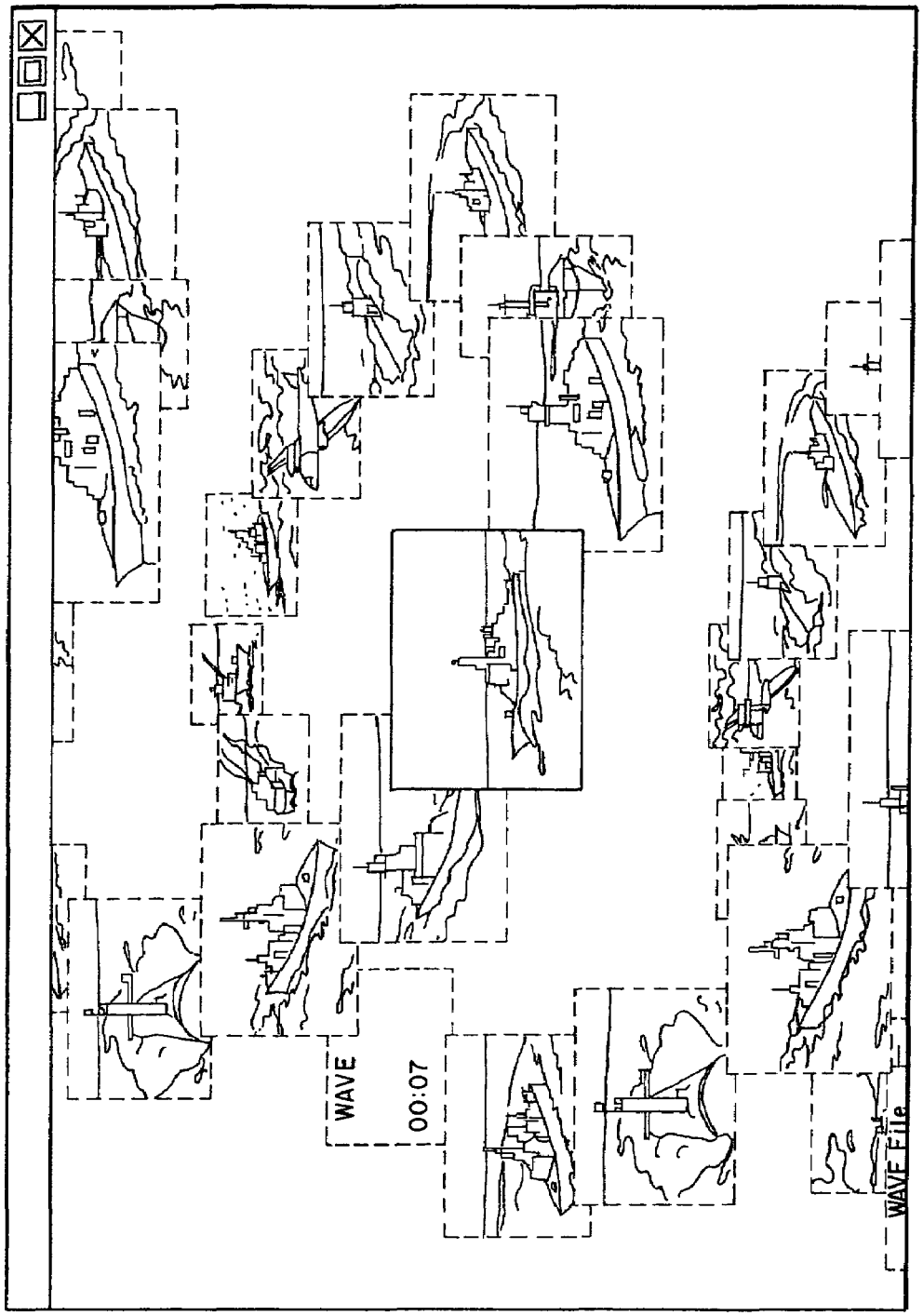
FIG. 22 is a diagram showing typical changes in thumbnail display position.

To put it concretely, with the jog dial 4 and the keyboard 5 not operated, the processing manager 151 typically requests the content-processing routine 152 to display a thumbnail icon 201 on a spiral with a larger radius r as shown in FIG. 22.

With the jog dial 4 or the keyboard 5 pressed continuously, on the other hand, the processing manager 151 typically requests the content-processing routine 152 (refer to FIG. 6) to display a thumbnail icon 201 on a spiral with a smaller radius r.

When the jog dial 4 is rotated in only a click or the keyboard 5 is pressed only once and then released immediately, the processing manager 151 requests the content-processing routine 152 to display a thumbnail icon 201 on a spiral with a medium radius r as shown in FIG. 22.

The user or the watcher/listener of the personal computer 1 is capable of immediately forming a judgment as to whether or not the jog dial 4 or the keyboard 5 has been operated on the basis of the display position of a thumbnail icon 201.

It should be noted that the display program 54F may also playback a predetermined sound or display a predetermined picture to accompany a change in spiral radius r.

In addition, when neither the jog dial 4 nor the keyboard 5 is operated, the processing manager 151 requests that thumbnail icons 201 be displayed on a spiral with a smaller radius r. If the jog dial 4 or the keyboard 5 is operated, on the other hand, the content-processing routine 152 requests that thumbnail icons 201 be displayed on a spiral with a larger radius r.

Figure 23:
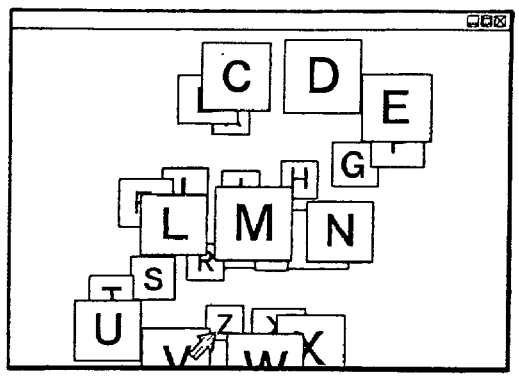
FIG. 23 is an explanatory diagram used for describing selection of a thumbnail icon.
Figure 24:
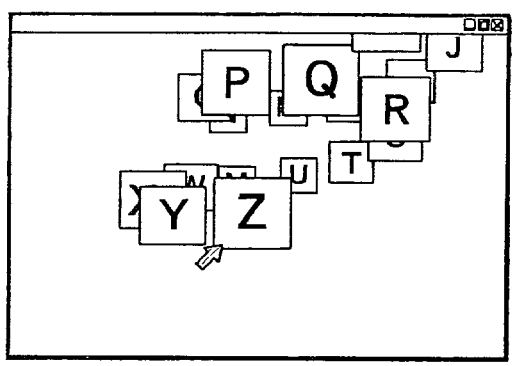
FIG. 24 is an explanatory diagram used for describing selection of a thumbnail icon.
Figure 25:
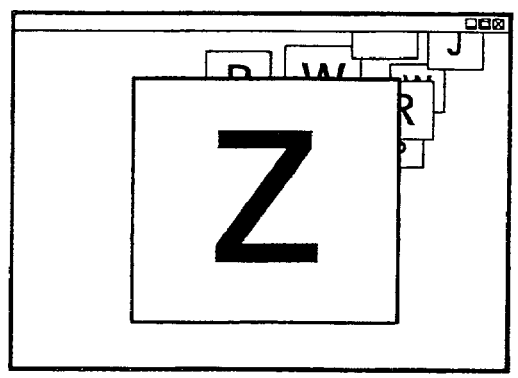
FIG. 25 is an explanatory diagram used for describing an enlarged display.

FIGS. 23 to 25 are each an explanatory diagram used for describing selection and an enlarged display of a thumbnail icon 201 in a spiral view. Assume that a "Z"-displaying thumbnail icon 201 is clicked with an "M"-displaying thumbnail icon 201 selected in a screen as shown in FIG. 23. In this case, the display program 54F moves all thumbnail icons 201 displayed on the screen in such a way that the "Z"-displaying thumbnail icon 201 is positioned at the center of the screen as shown in FIG. 24. That is to say, the display program 54F transits to a state in which the "Z"-displaying thumbnail icon 201 is selected.

Assume that the "Z"-displaying thumbnail icon 201 is clicked with the "Z"-displaying thumbnail icon 201 selected in a screen as shown in FIG. 24. In this case, the display program 54F displays a screen on which the character "Z" is displayed as shown in FIG. 25.

Assume that data represented by the "Z"-displaying thumbnail icon 201 is a still picture. In this case, the display program 54F displays the still picture at the real size. If the data represented by the "Z"-displaying thumbnail icon 201 is a moving picture, on the other hand, the display program 54F displays the moving picture at the real size and then plays back the moving picture. If the data represented by the "z"-displaying thumbnail icon 201 is a sound, the display program 54F enlarges the display of the thumbnail icon 201 to a predetermined size and then plays back the sound.

If the picture of the "Z"-displaying thumbnail icon 201 shown in FIG. 25 is clicked, the display program 54F restores the state of the display to a state in which the "Z"-displaying thumbnail icon 201 is selected as shown in FIG. 24.

Figure 26:
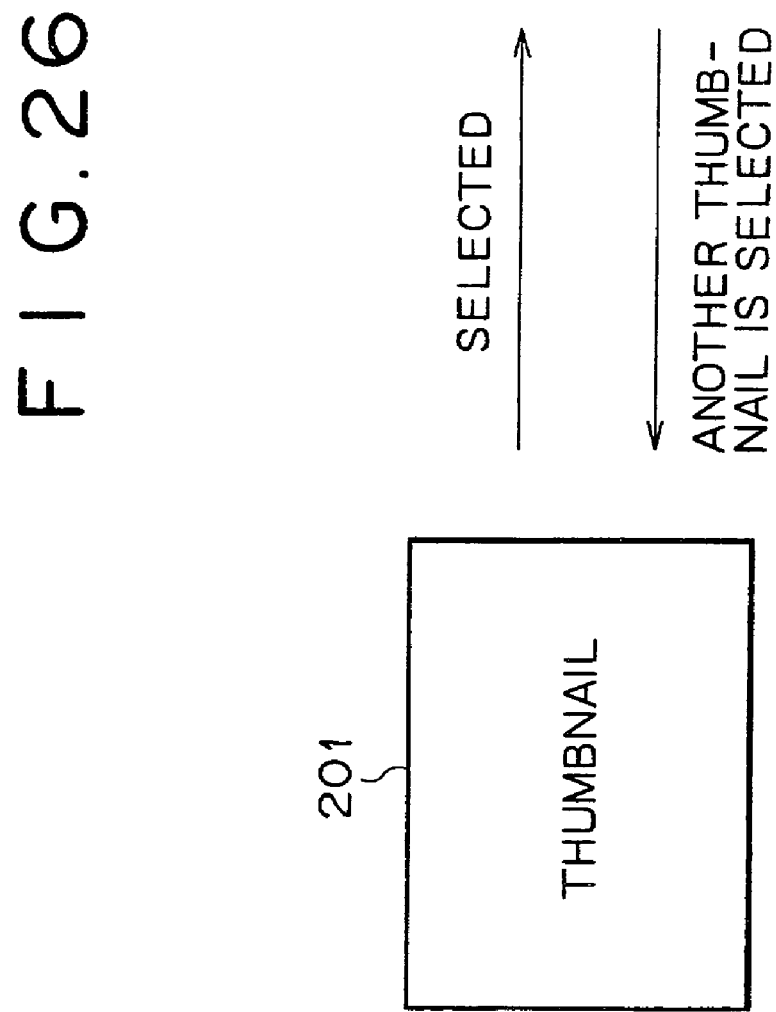
FIG. 26 is an explanatory diagram used for describing a frame display.

The following description explains a display of a selected thumbnail icon 201. As shown in FIG. 26, the display program 54F displays a frame 281 enclosing a thumbnail icon 201 when the thumbnail icon 201 is selected. When a thumbnail icon other than the thumbnail icon 201 is selected, however, the display program 54F deletes the frame 281.

Figure 27:
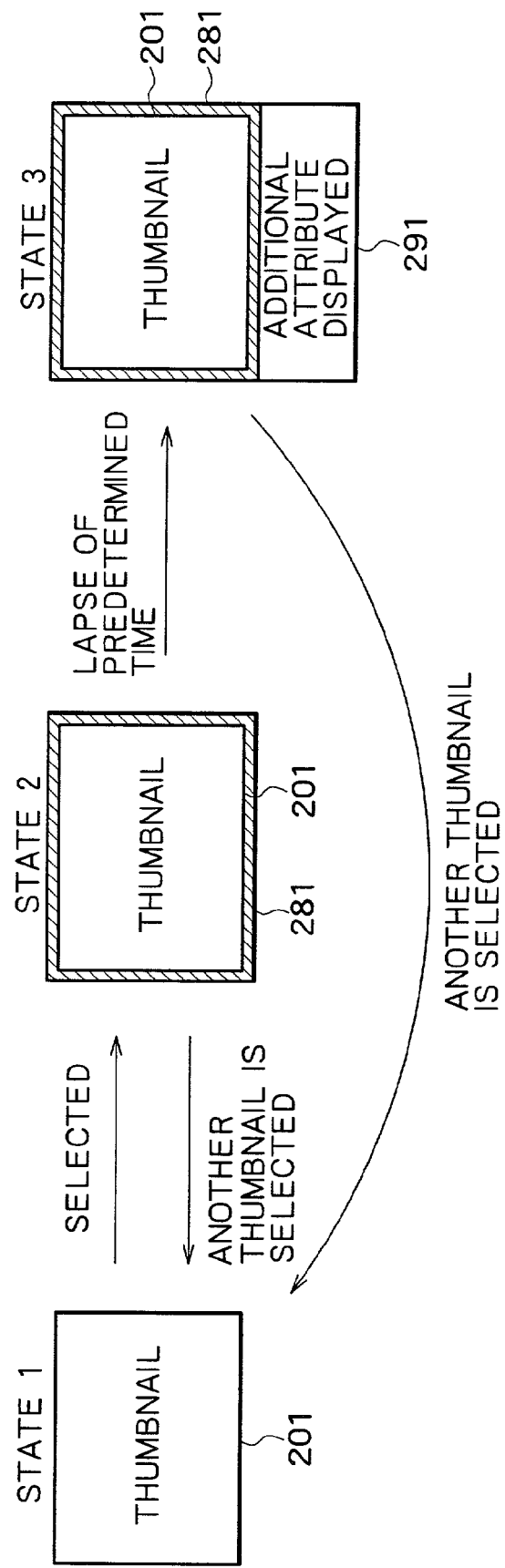
FIG. 27 is an explanatory diagram used for describing processing to display additional attributes.

FIG. 27 is an explanatory diagram used for describing displays of attributes of data represented by a selected thumbnail icon 201 and other information. As described above, the display program 54F displays a frame 281 enclosing a thumbnail icon 201 when the thumbnail icon 201 is selected. When a predetermined period of time lapses with no operation carried out on the touch pad 6 or the like, the display program 54F displays attributes in an additional-attribute-display window 291. The attributes include the name of a file containing data represented by the thumbnail icon 201, the title of the data, the amount of the data and a playback time.

If the thumbnail icon 201 is no longer selected, the display program 54F deletes the frame 281 and the additional-attribute-display window 291 which are displayed for the thumbnail icon 201.

For example, the display program 54F displays attributes in an additional-attribute-display window 291 after a period of 1 second lapses since the selection of the thumbnail icon 201 as shown in FIG. 28. The attributes include an icon showing a still or moving picture, the amount of data and a date. In the case of the example shown in FIG. 28, in the additional-attribute-display window 291, other unselected thumbnail icons 201 are also displayed so that the user or the viewer is capable of verifying their existence with their frames and backgrounds put in a semitransparent display state. It should be noted that the other thumbnail icons 201 can also be put in a semitransparent display state.

Figure 29:
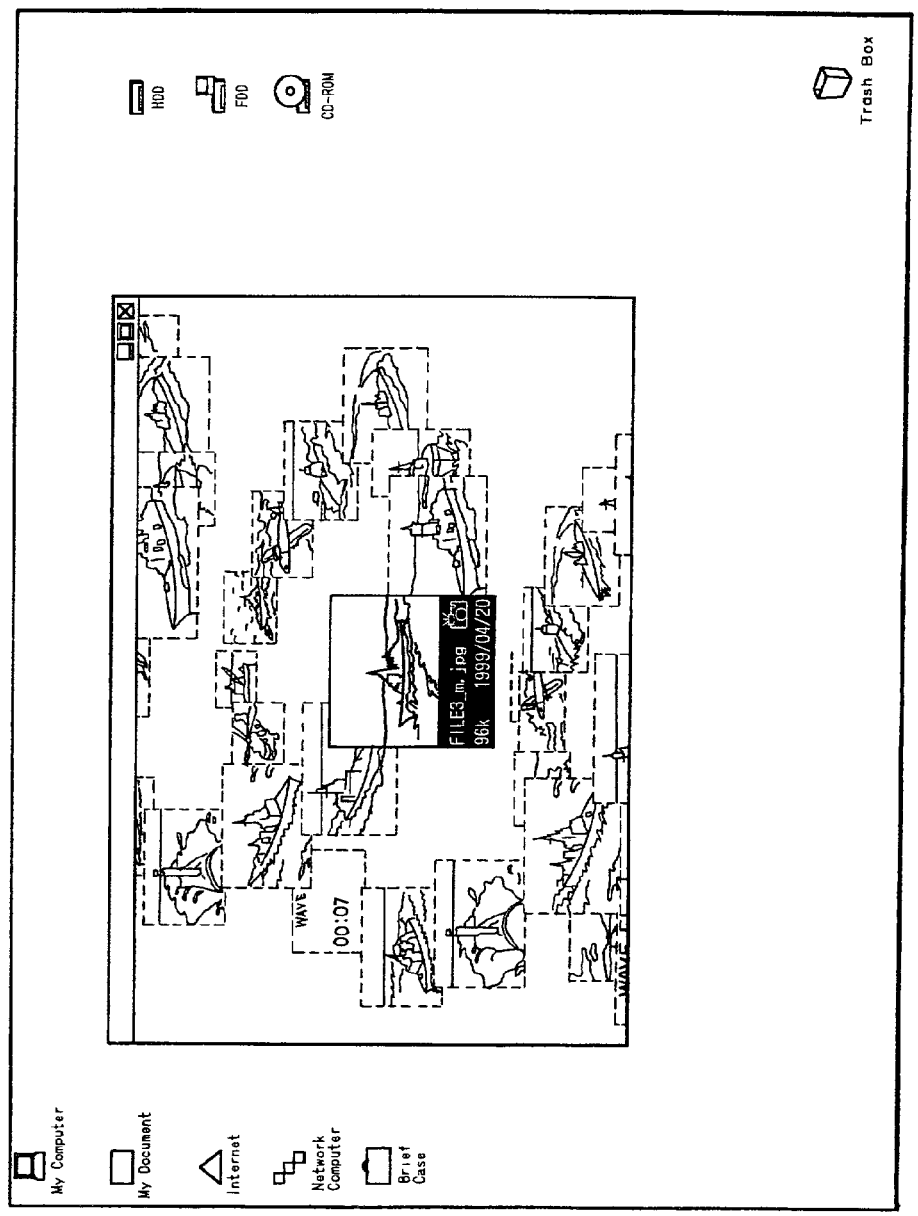
FIG. 29 is a diagram showing a typical display of information such as thumbnail icons on the entire screen or a part of the screen of the LCD unit.

Next, all screen modes of displays on the entire LCD 7 are explained. The display program 54F displays, among others, thumbnail icons 201 within a predetermined range in a display area of the screen of the LCD unit 7 as shown in FIG. 29 when the display program 54F is activated.

Figure 30:
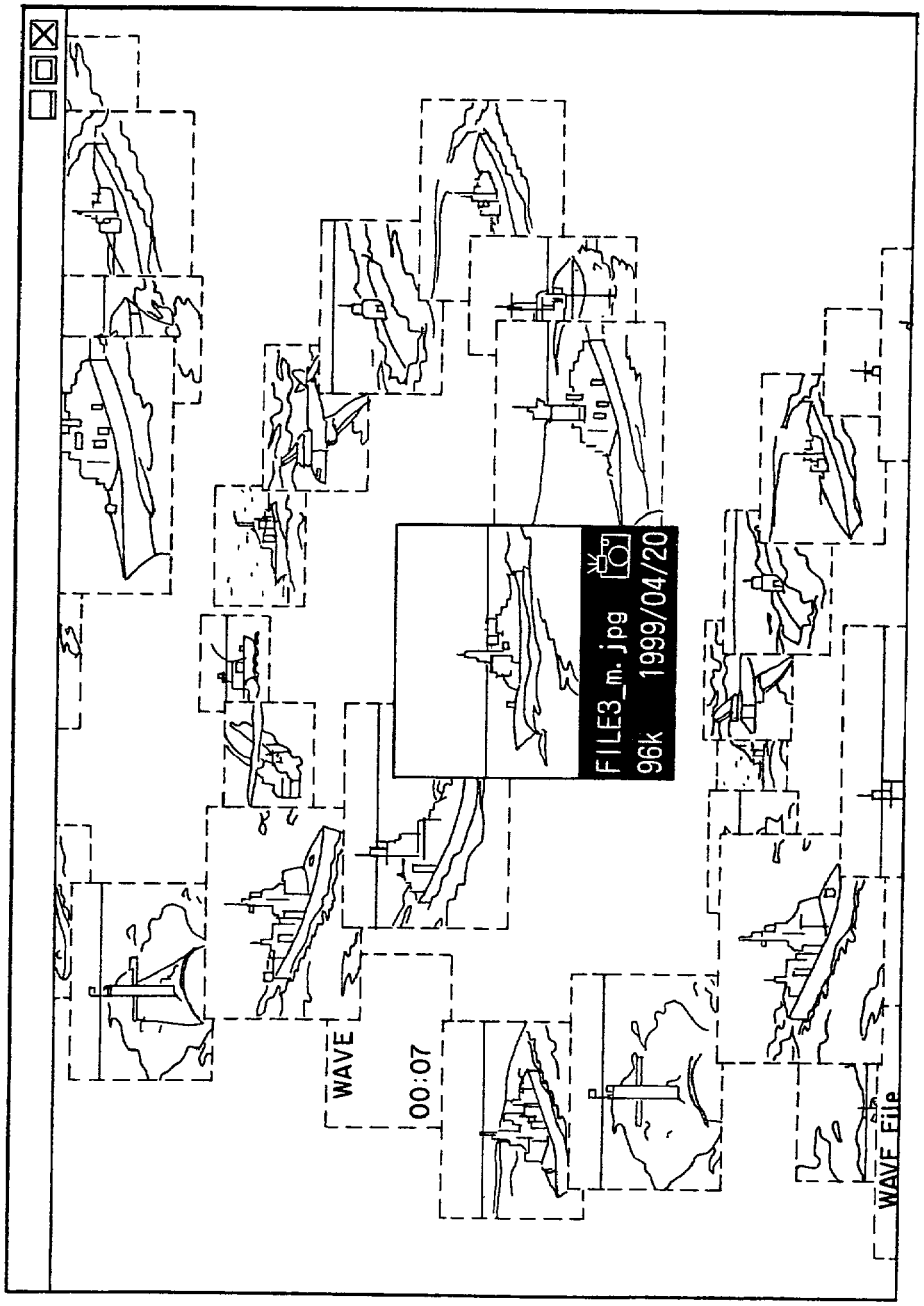
FIG. 30 is a diagram showing a typical display of information such as thumbnail icons on the entire screen of the LCD unit.

When a predetermined icon or a predetermined key of the keyboard 5 is operated, the display program 54F displays, among others, thumbnail icons 201 in the entire display area of the screen of the LCD unit 7 as shown in FIG. 30. When the display program 54F is displaying, among others, thumbnail icons 201 in the entire display area of the screen of the LCD unit 7, the personal computer 1 accepts an input to the display program 54F. The input represents an operation carried out on the jog dial 4, the touch pad 6, the keyboard 5 or the like except an operation carried out on a combination of specific keys of the keyboard 5.

Figure 31:
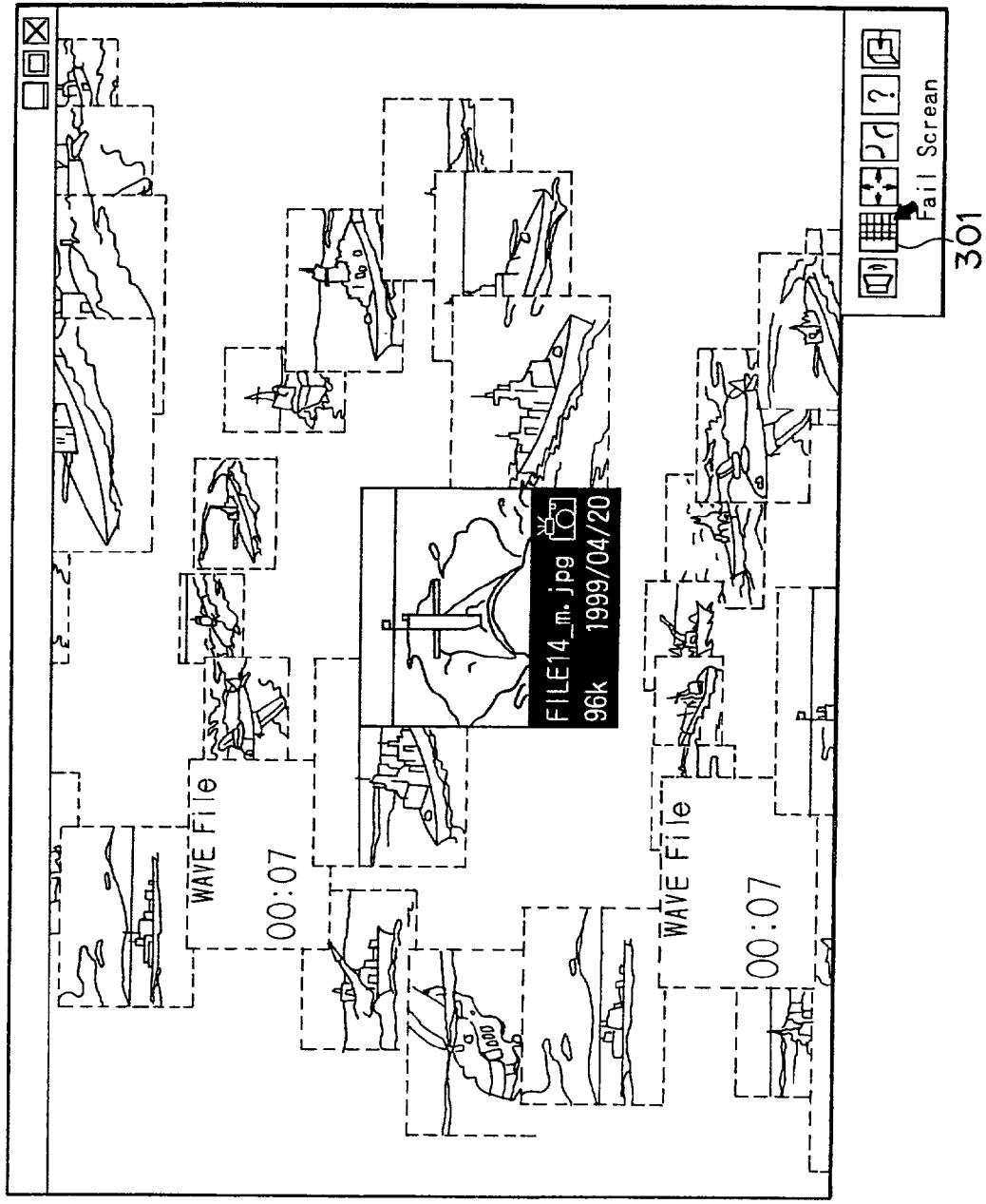
FIG. 31 is an explanatory diagram used for describing an icon.

When an icon 301 shown in FIG. 31 is operated with thumbnail icons 201 and other information displayed within a predetermined range in the display area of the screen of the LCD unit 7, the display program 54F displays, among others, thumbnail icons 201 in the entire display area of the screen of the LCD unit 7. When an icon 301 shown in FIG. 31 is operated with thumbnail icons 201 and other information displayed in the entire display area of the screen of the LCD unit 7, on the other hand, the display program 54F displays, among others, thumbnail icons 201 within a predetermined range in the display area of the screen of the LCD unit 7.

Figure 32:
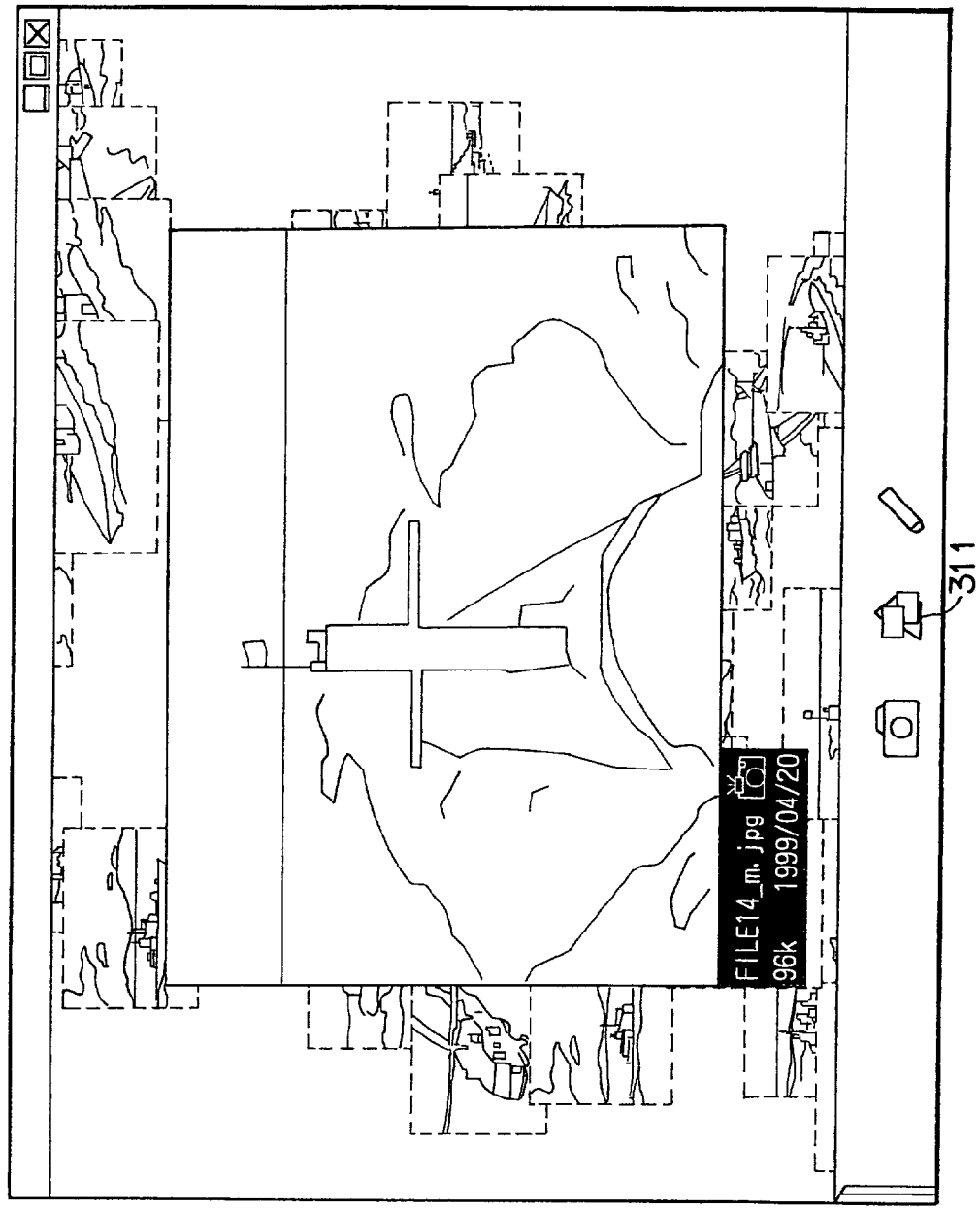
FIG. 32 is another explanatory diagram used for describing an icon.

When an icon 311 shown in FIG. 32 is operated with thumbnail icons 201 and other information displayed in the entire display area of the screen of the LCD unit 7, the display program 54F displays, among others, thumbnail icons 201 within a predetermined range in the display area of the screen of the LCD unit 7 and activates another application program represented by the icon 311.

As described above, when an icon 301 or a predetermined key of the keyboard 5 is operated, the display program 54F is capable of displaying thumbnail icons 201 and other information in the entire display area of the screen of the LCD unit 7. When an icon 311 is operated with thumbnail icons 201 and other information displayed in the entire display area of the screen of the LCD unit 7, the display program 54F is capable of directly activating another application program for the operation carried out on the icon 311. By displaying thumbnail icons 201 and other information in the entire display area of the screen of the LCD unit 7, it is possible to avoid the user's incorrect operation such as an inadvertent invocation of another application program.

When another application program represented by an icon 311 is activated, in many cases, the user desires collaboration between the display program 54F and the other application program. Thus, the display program 54F automatically displays, among others, thumbnail icons 201 within a predetermined range in the display area of the screen of the LCD unit 7. As a result, the user is capable of operating the display program 54F and another application program with a higher degree of efficiency.

The following description explains processing of the display program 54F and the read-in program 54G which are executed by the CPU 51.

Figure 33:
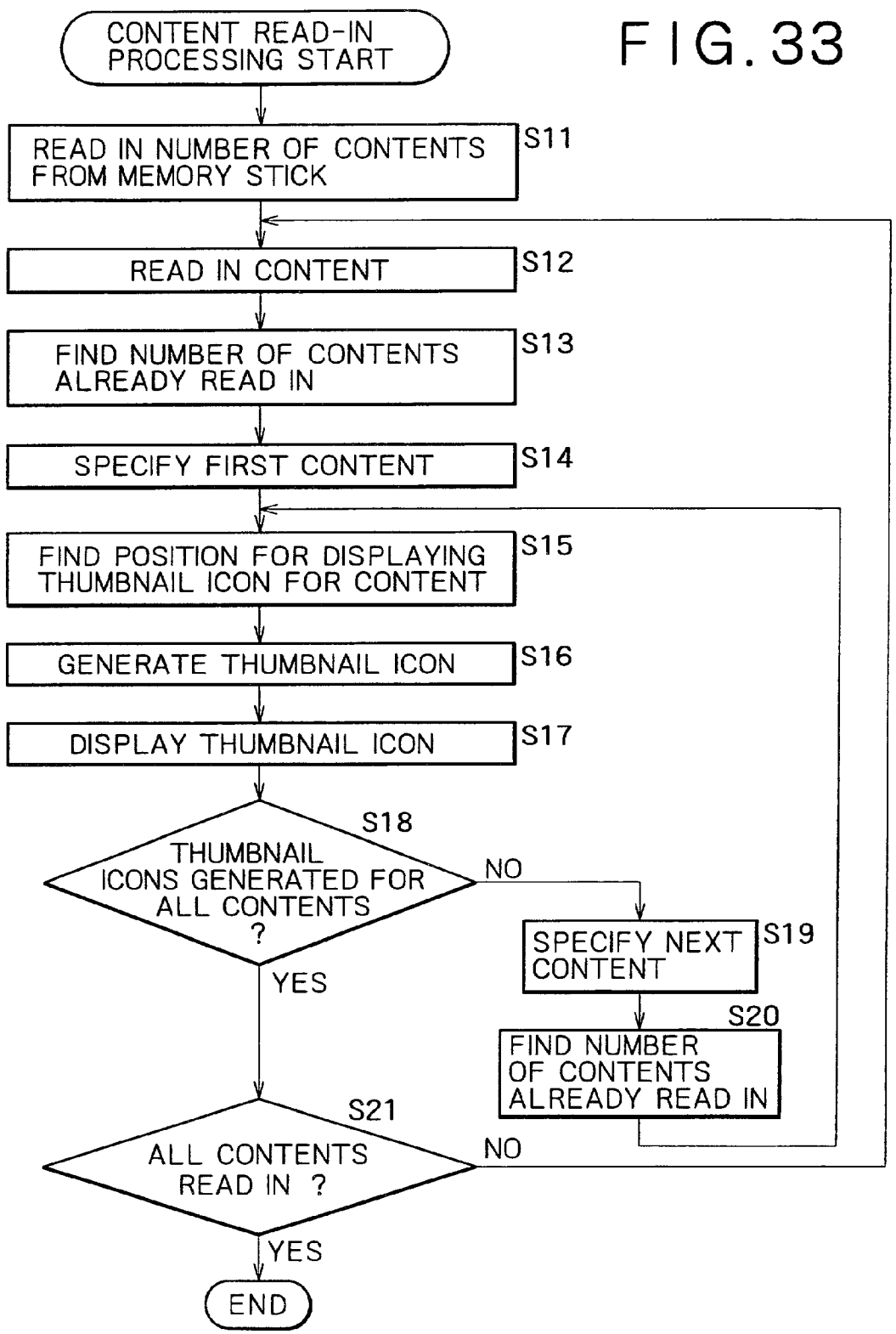
FIG. 33 is a flowchart representing processing to read in contents.

FIG. 33 is a flowchart used for explaining processing carried out by execution of the display program 54F and the read-in program 54G to read in contents. The processing carried out by execution of the display program 54F and the read-in program 54G to read in contents starts with a step S11 at which the read-in program 54G reads in the number of contents from the memory stick 116 through the memory-stick interface unit 114. The read-in program 54G then supplies the number of contents read out from the memory stick 116 through the memory-stick interface unit 114 to the display program 54F.

Then, at the next step S12, the read-in program 54G sequentially reads in contents from the memory stick 116 through the memory-stick interface unit 114 one content after another, and supplies the contents read in from the memory stick 116 to the display program 54F. The processing to read in contents from the memory stick 116 through the memory-stick interface unit 114 one content after another is carried out by the read-in program 54G concurrently with the processing described as follows.

Subsequently, at the next step S13, the processing manager 151 of the display program 54F finds the number of contents read in by the read-in program 54G from data received from the read-in program 54G. Then, at the next step S14, the processing manager 151 of the display program 54F specifies an initial one of the contents read in by the read-in program 54G.

Subsequently, at the next step S15, the processing manager 151 of the display program 54G computes a position at which a thumbnail icon 201 representing the content is to be displayed. Then, at the next step S16, the content-processing routine 152 of the display program 54F generates a thumbnail icon 201 for the content. Subsequently, at the next step S17, the content-processing routine 152 of the display program 54F displays the thumbnail icon 201 at the position computed by the processing manager 151. However, the content-processing routine 152 does not display the thumbnail icon 201 if the position for displaying the thumbnail icon 201 is outside the display area of the LCD unit 7.

Then, at the step S18, the display program 54F forms a judgment as to whether or not thumbnail icons 201 have been generated for all the contents read in from the memory stick 116. If the outcome of the judgment formed at the step S18 is NO indicating that thumbnail icons 201 have not been generated for all the contents, the flow of the processing goes on to a step S19 at which the processing manager 151 of the display program 54F specifies a next one among the contents read in by the read-in program 54G.

After a next content is specified in the processing carried out at the step S19, the flow of the processing goes on to a step S20 at which the processing manager 151 of the display program 54F finds the number of contents already read in by the read-in program 54G from data received from the read-in program 54G. Then, the flow of the processing goes back to the step S15 to repeat the pieces of processing to generate a thumbnail icon 201 at the steps S15 to S18.

If the outcome of the judgment formed at the step S18 is YES indicating that thumbnail icons 201 have been generated for all the contents, on the other hand, the flow of the processing goes on to a step S21 at which the display program 54F forms a judgment as to whether or not all contents stored in the memory stick 116 have already been read in. If the outcome of the judgment formed at the step S21 is NO indicating that not all contents stored in the memory stick 116 have already been read in, the flow of the processing goes back to the step S12 to repeat the pieces of processing at the steps S12 to S21 starting with the processing to read in thumbnail icons 201 from the memory stick 116 at the step S12.

If the outcome of the judgment formed at the step S21 is YES indicating that all contents stored in the memory stick 116 have already been read in, on the other hand, the processing is ended. This is because predetermined thumbnail icons 201 have been generated for all the contents stored in the memory stick 116.

In this way, the read-in program 54G is capable of sequentially reading out contents from the memory stick 116 one content after another and the display program 54F is capable of generating thumbnail icons 201 for the respective contents read out from the memory stick 116, and displaying the thumbnail icons 201 on the LCD unit 7.

Figure 34:
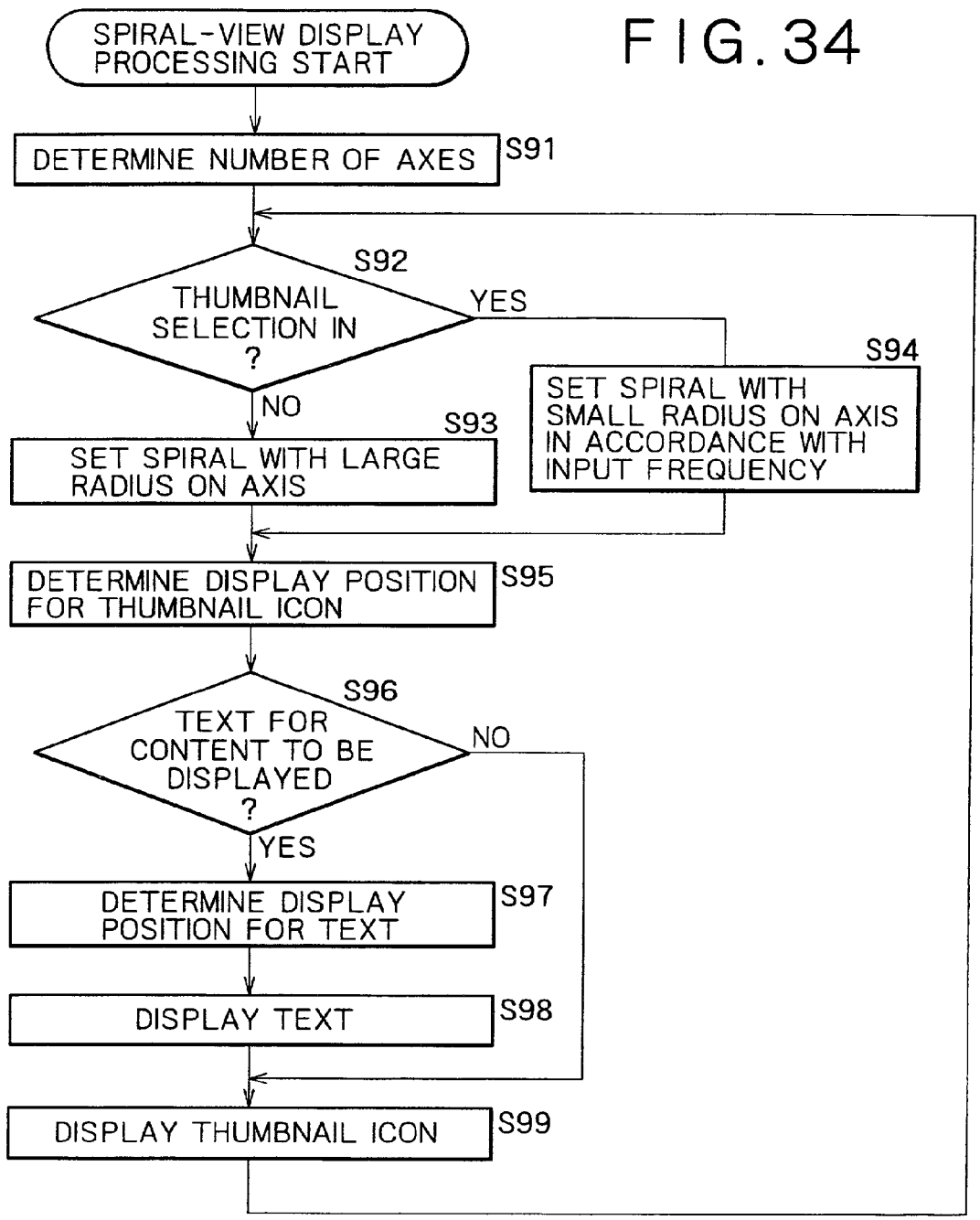
FIG. 34 is a flowchart representing processing to display a spiral view.

The following description explains processing carried out by execution of the display program 54F to display a spiral view by referring to a flowchart shown in FIG. 34. The processing carried out by execution of the display program 54F to display a spiral view as shown in FIG. 34 starts with a step S91 at which the number of axes 261 is determined. If the display program 54F displays only thumbnail icons 201, for example, the number of axes 261 is determined to be 1. If the display program 54F displays thumbnail icons 201 and texts 211, on the other hand, the number of axes 261 is determined to be 2.

At the next step S92, the display program 54F forms a judgment as to whether or not the jog dial 4, the keyboard 5 or the touch pad 6 has been operated to enter a selection of a thumbnail icon 201. If the outcome of the judgment formed at the step S92 is NO indicating that no selection of a thumbnail icon 201 has been entered, the flow of the processing goes on to a step S93 at which a spiral with a large radius r is set on the axis 261. Then, the flow of the processing goes on to a step S95.

If the outcome of the judgment formed at the step S92 is YES indicating that a selection of a thumbnail icon 201 has been entered, on the other hand, the flow of the processing goes on to a step S94 at which the display program 54F sets a spiral with a small radius r on the axis 261 in accordance with the number of selection inputs per unit time. Then, the flow of the processing goes on to a step S95.

At the step S95, the display program 54F determines a display position for the thumbnail icon 201 typically by using Eqs. (11), (12) and (13) with the axis 261 used as a base.

Then, at the next step S96, the display program 54F forms a judgment as to whether or not a text 211 for the content is to be displayed. If the outcome of the judgment formed at the step S96 is YES indicating that a text 211 for the content is to be displayed, the flow of the processing goes on to a step S97 at which a display position for the text 211 is determined with the axis 261 used as a base. Subsequently, at the next step S98, the display program 54F displays the text 211 at the location determined in the processing carried out at the step S97. The flow of the processing then goes on to a step S99.

If the outcome of the judgment formed at the step S96 is NO indicating that a text 211 for the content is not to be displayed, on the other hand, the flow of the processing goes on to the step S99, skipping the steps S97 and S98 since the processing to display the text 211 is not required.

At the step S99, the display program 54F displays the thumbnail icon 201 at a position determined in the processing carried out at the step S95. Then, the flow of the processing goes back to the step S92 to repeat the operations described above.

As described above, the display program 54F displays thumbnail icons 201 and texts 211 with the spiraling axis 261 of a spiral used as a base. When an outcome of a judgment indicates that a selection of a thumbnail icon 201 has been entered, the display program 54F displays thumbnail icons 201 and texts 211 by using the spiraling axis 261 of a spiral with a small radius r as a base.

Figure 35:
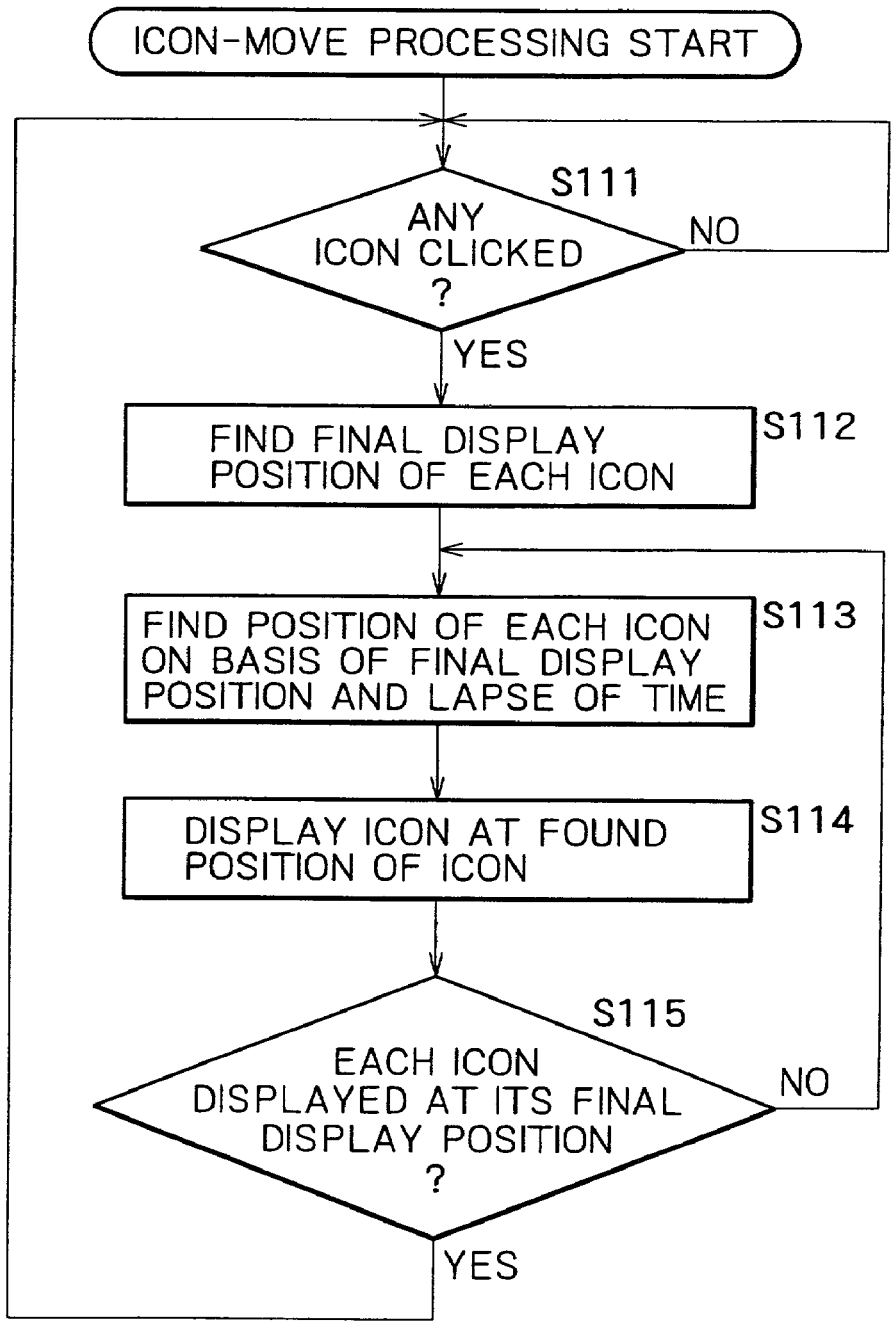
FIG. 35 is a flowchart representing processing to move an icon.

The following description explains processing carried out by execution of the display program 54F to move an icon 202 by referring to a flowchart shown in FIG. 35. The processing carried out by execution of the display program 54F to move an icon 202 as shown in FIG. 35 starts with a step S111 at which the processing manager 151 of the display program 54F forms a judgment as to whether or not any icon 202 has been clicked on the basis of an input received from the touch pad 6. If the outcome of the judgment formed at the step S11 is NO indicating that no icon 202 has been clicked, the flow of the processing goes back to the step S11 at which the formation of the judgment is repeated till an icon 202 is clicked.

If the outcome of the judgment formed at the step S11 is YES indicating that an icon 202 has been clicked, on the other hand, the flow of the processing goes on to a step S112 at which the processing manager 151 of the display program 54F finds a final display position of each icon 202.

Then, at the next step S113, the processing manager 151 of the display program 54F finds a position of each icon 202 on the basis of the final display position of the icon 202 and a lapse of time since the operation to click the icon 202. The final display position is a position found in the processing carried out at the step S112. Subsequently, at the next step S114, the content-processing routine 152 of the display program 54F displays an icon 202 at the position found in the processing carried out at the step S113.

The processing of the step S114 is carried out to display an icon 202 at periods set by the processing manager 151. By properly selecting the period of the processing to display an icon 202, the icon 202 is displayed in motion.

Then, at the next step S115, the processing manager 151 of the display program 54F forms a judgment as to whether or not each icon 202 is displayed at its final display position. If the outcome of the judgment formed at the step S115 is NO indicating that not every icon 202 is displayed at its final display position, the flow of the processing goes back to the step S113 to repeat the pieces of processing carried out at the steps S113 to S115 to display an icon 202.

If the outcome of the judgment formed at the step S115 is YES indicating that every icon 202 is displayed at its final display position, on the other hand, the flow of the processing goes back to the step S111 to repeat the pieces of processing carried out at the steps described above starting with the formation of the judgment as to whether or not an icon 202 has been clicked.

As described above, the display program 54F is capable of displaying an icon 202 in motion at a predetermined speed in response to an operation to click the icon 202.

Figure 36:
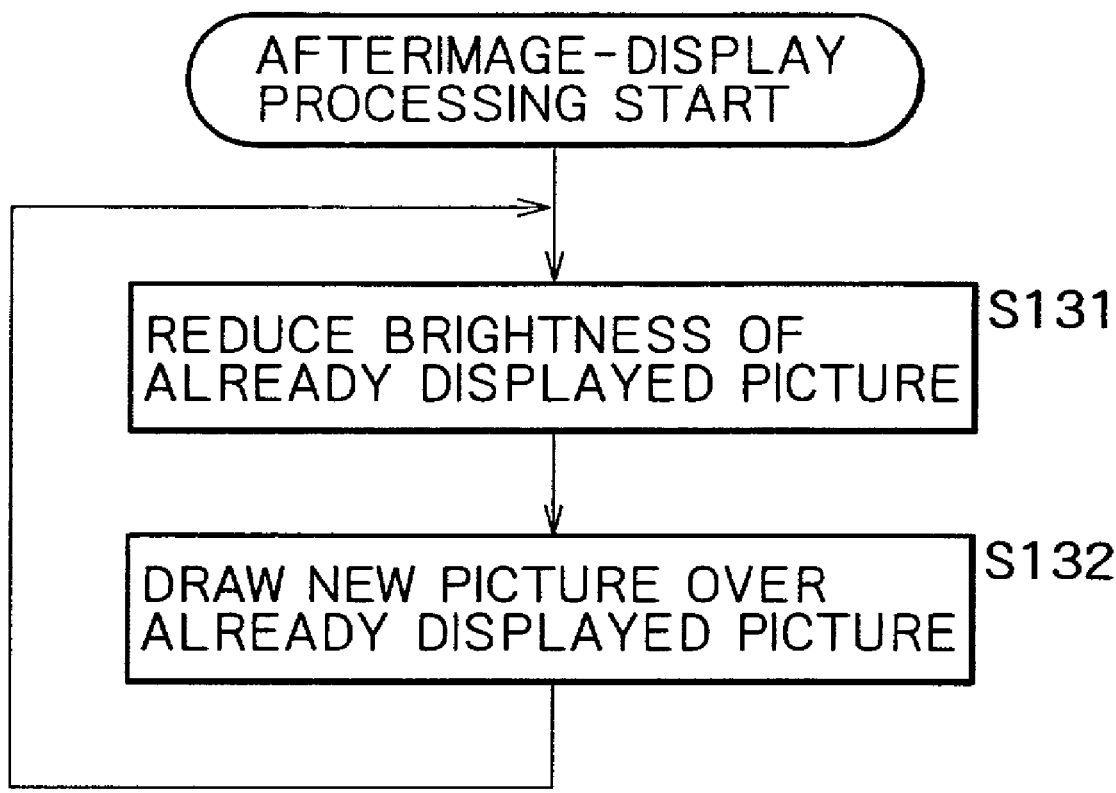
FIG. 36 is a flowchart representing processing to display an afterimage.

The following description explains processing carried out by execution of the display program 54F to display an afterimage by referring to a flowchart shown in FIG. 36. The processing carried out by execution of the display program 54F to display an afterimage as shown in FIG. 36 starts with a step S131 at which the display program 54F reduces the brightness of an already displayed picture to typically 80%.

Then, at the next step S132, the display program 54F draws a new picture over the already displayed picture with the brightness thereof reduced in the processing carried out at the step S131. The flow of the processing then goes back to the step S131 to repeat the drawing process.

As described above, the display program 54F gradually reduces the brightness of an already displayed picture and draws a new picture over the already displayed picture. Thus, an afterimage can be drawn with ease.

Figure 37:
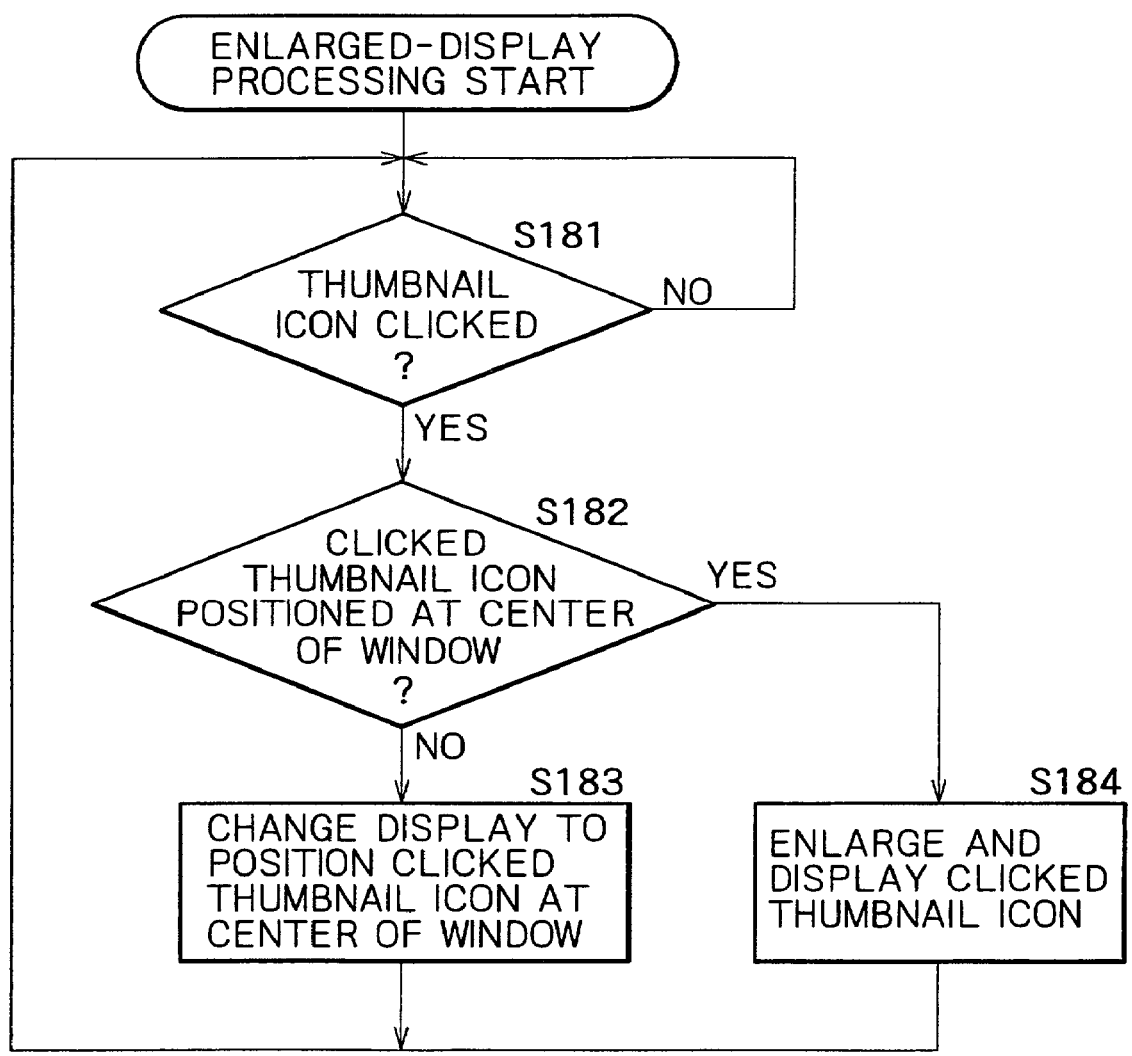
FIG. 37 is a flowchart representing processing to enlarge a display.

The following description explains processing carried out by execution of the display program 54F to enlarge a display by referring to a flowchart shown in FIG. 37. The processing carried out by execution of the display program 54F to enlarge a display as shown in FIG. 37 starts with a step S181 at which the display program 54F forms a judgment as to whether or not a thumbnail icon 201 has been clicked on the basis of a signal received from the touch pad 6. If the outcome of the judgment formed at the step S181 is NO indicating that no thumbnail icon 201 has been clicked, the flow of the processing goes back to the step S181 at which the formation of the judgment is repeated till the thumbnail icon 201 is clicked.

If the outcome of the judgment formed at the step S181 is YES indicating that a thumbnail icon 201 has been clicked, on the other hand, the flow of the processing goes on to a step S182 at which the display program 54F forms a judgment as to whether or not the clicked thumbnail icon 201 is positioned at the center of the window.

If the outcome of the judgment formed at the step S182 is NO indicating that the clicked thumbnail icon 201 is positioned not at the center of the window, the flow of the processing goes back to a step S183 at which the display program 54F changes the display to position the clicked thumbnail icon 201 at the center of the window. Then, the flow of the processing goes back to a step S181 to repeat the pieces of processing carried out at the steps S181 and S182.

If the outcome of the judgment formed at the step S182 is YES indicating that the clicked thumbnail icon 201 is positioned at the center of the window, on the other hand, the flow of the processing goes back to a step S184 at which the display program 54F enlarges the display of the clicked thumbnail icon 201. To put it in detail, if the thumbnail icon 201 represents data of a still picture, the thumbnail icon 201 is displayed at its real size. If the thumbnail icon 201 represents data of a moving picture, the moving picture is played back. If the thumbnail icon 201 represents data of a sound, the sound is played back. The flow of the processing then goes back to the step S181.

As described above, when a thumbnail icon 201 is clicked, the display program 54F displays the clicked thumbnail icon 201 at the center of the window and enlarges the display. Thus, the user is capable of quickly obtaining information on the thumbnail icon 201 and data represented by the thumbnail icon 201 by carrying out a simple operation.

Figure 38:
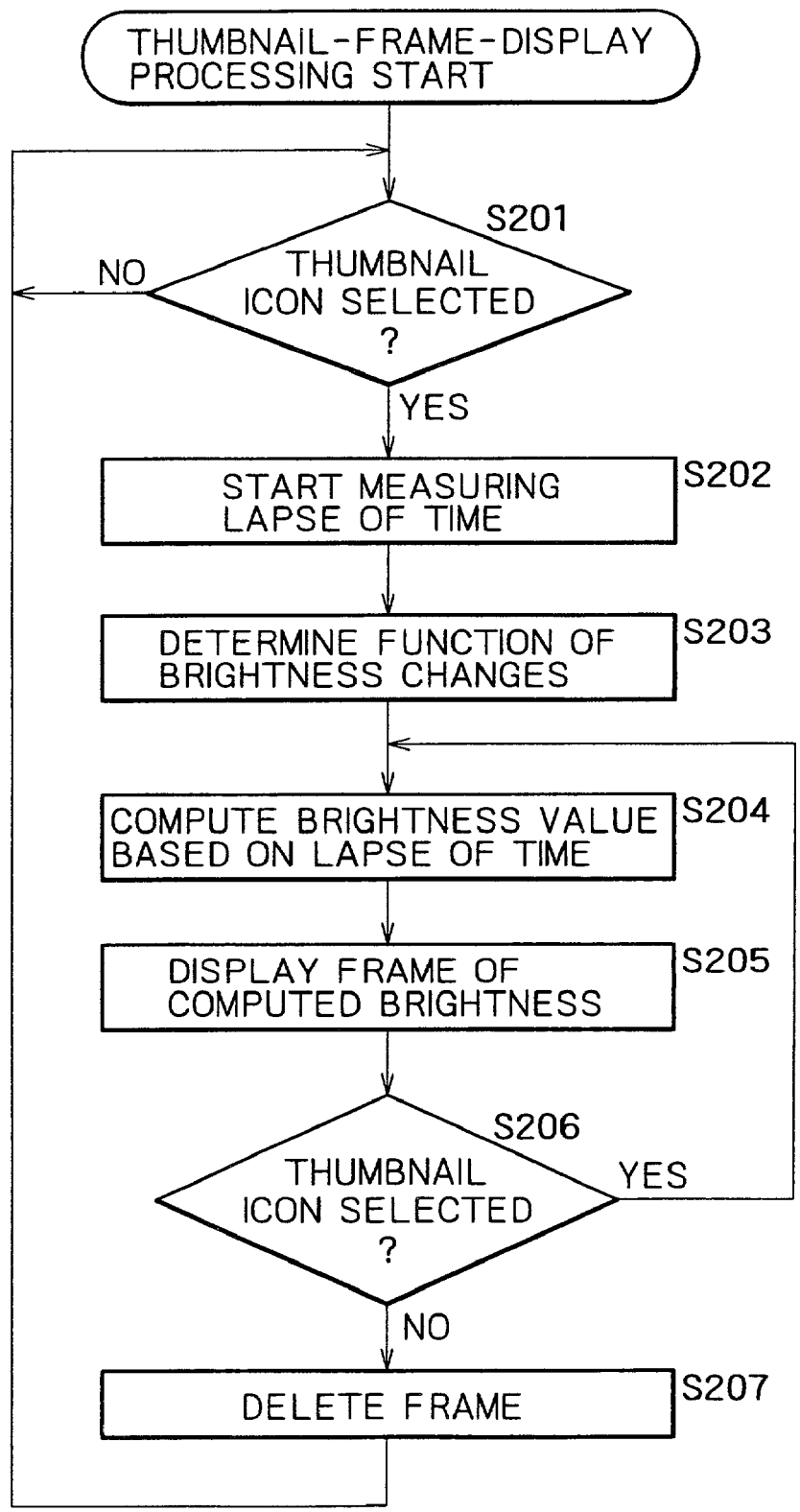
FIG. 38 is a flowchart representing processing to display a frame.

The following description explains processing carried out by execution of the content-processing routine 152 of the display program 54F to display a frame 281 by referring to a flowchart shown in FIG. 38. The processing carried out by execution of the content-processing routine 152 of the display program 54F to display a frame 281 as shown in FIG. 38 starts with a step S201 at which the content-processing routine 152 forms a judgment as to whether or not a thumbnail icon 201 displayed by the content-processing routine 152 has been selected. If the outcome of the judgment formed at the step S201 is NO indicating that a thumbnail icon 201 displayed by the content-processing routine 152 has not been selected, the flow of the processing goes back to the step S201 at which the formation of the judgment is repeated till a thumbnail icon 201 displayed by the content-processing routine 152 is selected.

If the outcome of the judgment formed at the step S201 is YES indicating that a thumbnail icon 201 displayed by the content-processing routine 152 has been selected, on the other hand, the flow of the processing goes on to the step S202 at which the content-processing routine 152 starts measuring the lapse of time. The operation to measure the lapse of time is continued while the processing described below is being carried out.

Then, at the next step S203, the content-processing routine 152 determines a function of brightness changes. Subsequently, at the next step S204, the content-processing routine 152 computes a brightness value of the frame 281 on the basis of the lapse of time. Next, at the step S205, the content-processing routine 152 displays the frame 281 at the brightness computed in the processing carried out at the step S204.

Subsequently, at the next step S206, the content-processing routine 152 forms a judgment as to whether or not a thumbnail icon 201 displayed by the content-processing routine 152 has been selected. If the outcome of the judgment formed at the step S206 is YES indicating that a thumbnail icon 201 displayed by the content-processing routine 152 has been selected, the flow of the processing goes back to the step S204 to repeat the pieces of processing carried out at the steps S204 to S206 in order to display the frame 281.

If the outcome of the judgment formed at the step S206 is NO indicating that a thumbnail icon 201 displayed by the content-processing routine 152 has not been selected, on the other hand, the flow of the processing goes on to a step S207 at which the content-processing routine 152 deletes the frame 281. Then, the flow of the processing goes back to the step S201 to repeat the pieces of processing carried out at the steps S201 to S207 in order to display the frame 281.

As described above, the display program 54F is capable of requesting that a frame 281 be displayed with the brightness thereof changed periodically for a selected thumbnail icon 201. By carrying out similar processing, the display program 54F is capable of requesting that a frame 281 be displayed with the chroma or the hue thereof changed periodically for a selected thumbnail icon 201.

Figure 39:
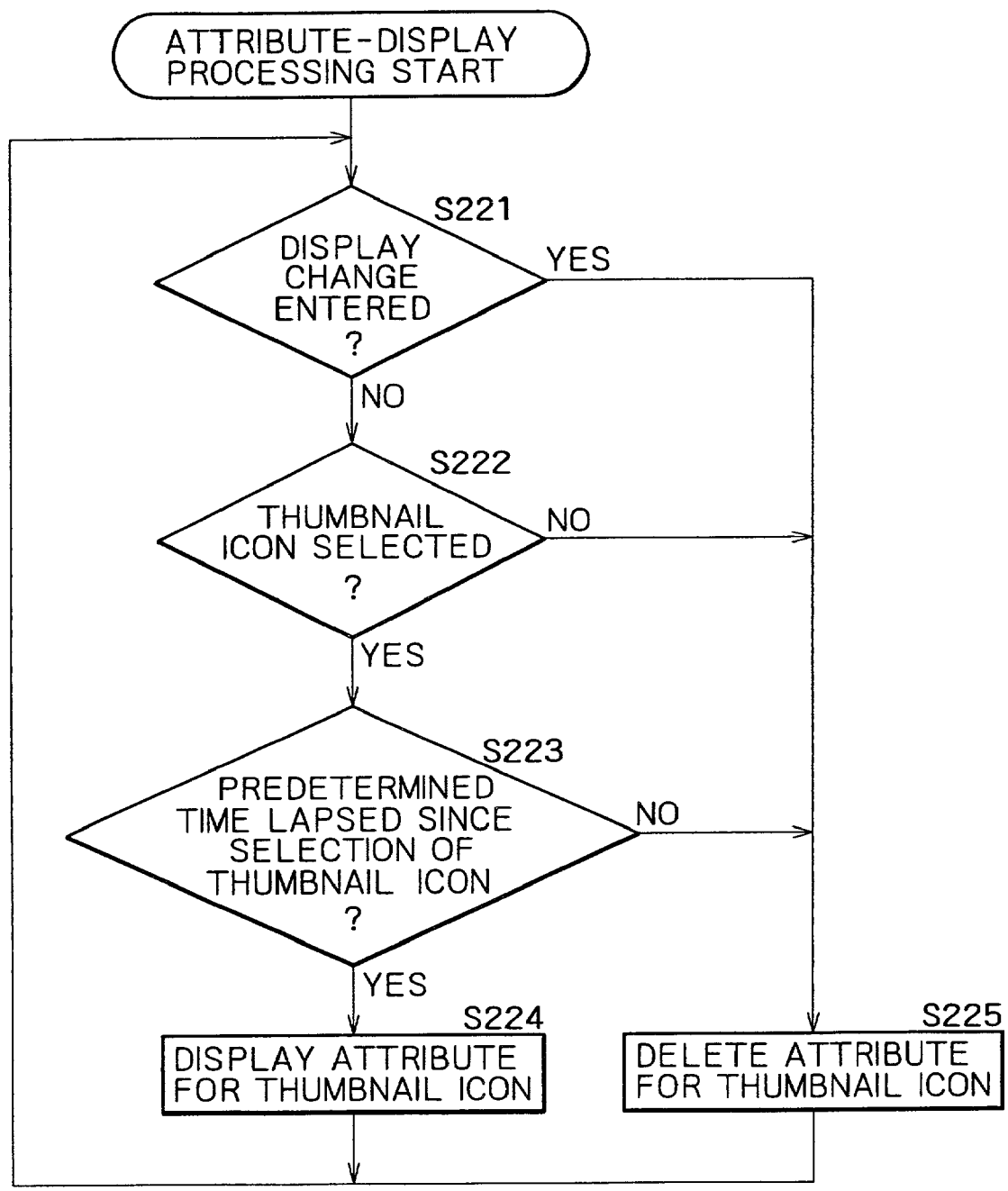
FIG. 39 is a flowchart representing processing to display attributes.

The following description explains processing carried out by execution of the content-processing routine 152 of the display program 54F to display an additional-attribute-display window 291 by referring to a flowchart shown in FIG. 39. The processing carried out by execution of the content-processing routine 152 of the display program 54F to display the additional-attribute-display window 291 as shown in FIG. 39 starts with a step S221 at which the display program 54F forms a judgment as to whether or not request for a change of the display has been received on the basis of a signal received from the jog dial 4, the touch pad 6 or the keyboard 5. If the outcome of the judgment formed at the step S221 is NO indicating that no request for a change of the display has been received, the flow of the processing goes on to a step S222 at which the content-processing routine 152 forms a judgment as to whether or not a thumbnail icon 201 displayed by the content-processing routine 152 has been selected.

If the outcome of the judgment formed at the step S222 is YES indicating that a thumbnail icon 201 displayed by the content-processing routine 152 has been selected, the flow of the processing goes on to a step S223 at which the content-processing routine 152 forms a judgment as to whether or not a predetermined time of typically 1 second has lapsed since the selection of the thumbnail icon 201.

If the outcome of the judgment formed at the step S223 is YES indicating that the predetermined period of time has lapsed, the flow of the processing goes on to a step S224 at which the content-processing routine 152 displays the additional-attribute-display window 291 having a semitransparent frame as well as a semitransparent background and including a text for the thumbnail icon 201. Then, the flow of the processing goes back to the step S221 to repeat the pieces of processing carried out at the steps S221 to S225.

If the outcome of the judgment formed at the step S221 is YES indicating that a request for a change of the display has been received, on the other hand, the flow of the processing goes on to a step S225 at which the content-processing routine 152 deletes the additional-attribute-display window 291 for the thumbnail icon 201. This is because processing such as a movement of the thumbnail icon 201 has been carried out. Then, the flow of the processing goes back to the step S221 to repeat the pieces of processing carried out at the steps S221 to S225.

If the outcome of the judgment formed at the step S222 is NO indicating that a thumbnail icon 201 has not been selected, on the other hand, the flow of the processing goes on to the step S225 at which the content-processing routine 152 deletes the additional-attribute-display window 291 for the thumbnail icon 201. This is because it is not necessary to display the additional-attribute-display window 291. Then, the flow of the processing goes back to the step S221 to repeat the pieces of processing carried out at the steps S221 to S225.

If the outcome of the judgment formed at the step S223 is NO indicating that the predetermined period of time has not lapsed, on the other hand, the flow of the processing goes on to the step S225 at which the content-processing routine 152 deletes the additional-attribute-display window 291 for the thumbnail icon 201. Then, the flow of the processing goes back to the step S221 to repeat the pieces of processing carried out at the steps S221 to S225.

As described above, since the display program 54F displays an additional-attribute-display window 291 for a selected thumbnail icon 201 after a predetermined period of time has lapsed since the selection of the thumbnail icon 201, the display can be changed at a high speed. In addition, an operation carried out by the user can be prevented from being disturbed.

Since the additional-attribute-display window 291 displayed by the display program 54F has a semitransparent frame as well as a semitransparent background, the user is capable of verifying, among other things, a thumbnail icon 201 placed beneath the additional-attribute-display window 291 or on the depth side of the screen with respect to the additional-attribute-display window 291. It should be noted that, in this case, a thumbnail icon 201 itself can also be made semitransparent as described earlier. The additional attributes may include a portion extracted from a text stored in an audio file described earlier or, in the case of a photograph thumbnail icon 201 or the like, the attributes may include information on a weather such as a photographing temperature and a photographing humidity.

Figure 40:
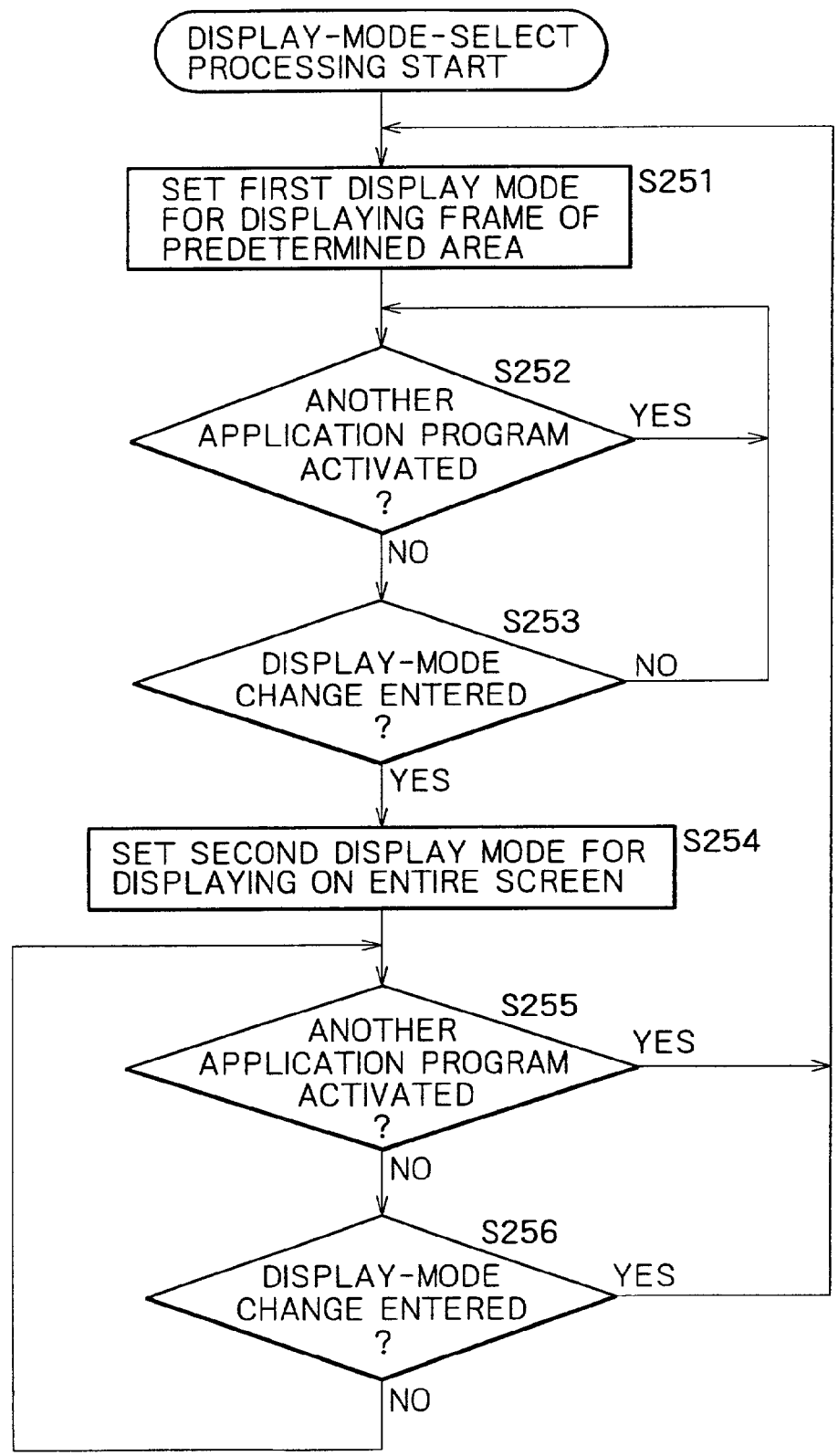
FIG. 40 is a flowchart representing processing to select a display mode.

The following description explains processing carried out by execution of the display program 54F to select a first display mode for displaying a thumbnail icon 201 and the like in a predetermined area on the display screen of the LCD unit 7 or a second display mode for displaying a thumbnail icon 201 and the like on the entire display screen of the LCD unit 7 by referring to a flowchart shown in FIG. 40. The processing carried out by execution of the display program 54F to select a display mode as shown in FIG. 40 starts with a step S251 at which the display program 54F sets the first display mode for displaying the frame of the predetermined area. As described above, the first display mode is a display mode for displaying a thumbnail icon 201 and the like in the predetermined area on the display screen of the LCD unit 7.

The processing to select a display mode itself begins with a step S252 at which the display program 54F forms a judgment as to whether or not another application program has been activated. If the outcome of the judgment formed at the step S252 is YES indicating that another application program has been activated, the flow of the processing goes back to the step S252 to repeat the formation of the judgment. This is because, with another application program activated, the first display mode should be selected and, since the first display mode has been selected at the step S251, there is no need to change the display mode.

If the outcome of the judgment formed at the step S252 is NO indicating that no other application program has been activated, on the other hand, the flow of the processing goes on to the step S253 at which the display program 54F forms a judgment as to whether or not a request for a change of the display mode has been received on the basis of a signal received from the jog dial 4, the touch pad 6 or the keyboard 5.

If the outcome of the judgment formed at the step S253 is NO indicating that no request for a change of the display mode has been received, the flow of the processing goes back to the step S252 to repeat the judgments formed at the steps S252 and S253.

If the outcome of the judgment formed at the step S253 is YES indicating that a request for a change of the display mode has been received, on the other hand, the flow of the processing goes on to the step S254 at which the display program 54F sets a second display mode for displaying a thumbnail icon 201 and the like on the entire screen of the LCD unit 7.

Then, at the next step S255, the display program 54F forms a judgment as to whether or not another application program has been activated. If the outcome of the judgment formed at the step S255 is NO indicating that no other application program has been activated, the flow of the processing goes on to the step S256 at which the display program 54F forms a judgment as to whether or not a request for a change of the display mode has been received on the basis of a signal received from the jog dial 4, the touch pad 6 or the keyboard 5.

If the outcome of the judgment formed at the step S256 is NO indicating that no request for a change of the display mode has been received, the flow of the processing goes back to the step S255 to repeat the judgments formed at the steps S255 and S256.

If the outcome of the judgment formed at the step S256 is YES indicating that a request for a change of the display mode has been received, on the other hand, the flow of the processing goes back to the step S251 at which the display program 54F sets the first display mode and repeats the pieces of processing carried out at the steps S251 and S256.

If the outcome of the judgment formed at the step S255 is YES indicating that another application program has been activated, on the other hand, the flow of the processing goes back to the step S251 at which the display program 54F sets the first display mode. This is because the display mode needs to be changed to the first display mode. The display program 54F then repeats the pieces of processing carried out at the steps S251 and S256.

As described above, the display program 54F is capable of changing the display mode from the first display mode to the second display mode or vice versa in accordance with a received input and changing the display mode to the first display mode upon activation of another application program.

The following description explains an embodiment based on the method of displaying some thumbnail icons on a virtual spiral as described above by referring to FIGS. 41 to 49 wherein, by adding time-axis elements in the circumferential direction of the spiral, a cyclical time axis display can be implemented. By typically providing a unit-time property such as a month or a day to 1 cycle of the spiral which is a virtual line along the locus of the spiral, a year unit can be provided in the direction of a spiral axis which is a line approximately passing through centers of the spiral. In this way, the time-axis property is divided into 2 elements to give a 2-dimensional expression.

In general, creatures and nature surrounding the creatures repeat cyclical times such as a sequence of transitions among the four seasons, namely, the spring, the summer, the autumn and the winter, and the lapse of time on a day from a morning through a day time to a night. That is to say, the present invention adopts the concept of expressing the lapse of time as a spiral having a circular flow rather than a straight flow. Thus, in the case of picture data representing a person, by displaying only a specific season such as spring, summer, autumn or winter only, the growth process of the person during this season can be followed, and the growth process as well fashions or the like prevailing from time to time can be reviewed as good memories.

In addition, the method of displaying some thumbnail icons on a virtual spiral as described above can also be invoked as a piece of software executed on a computer. Furthermore, picture management software or the like is activated in advance and, as a function of the software, some thumbnail icons may also be displayed on a virtual spiral provided by the present invention.

Figure 41:
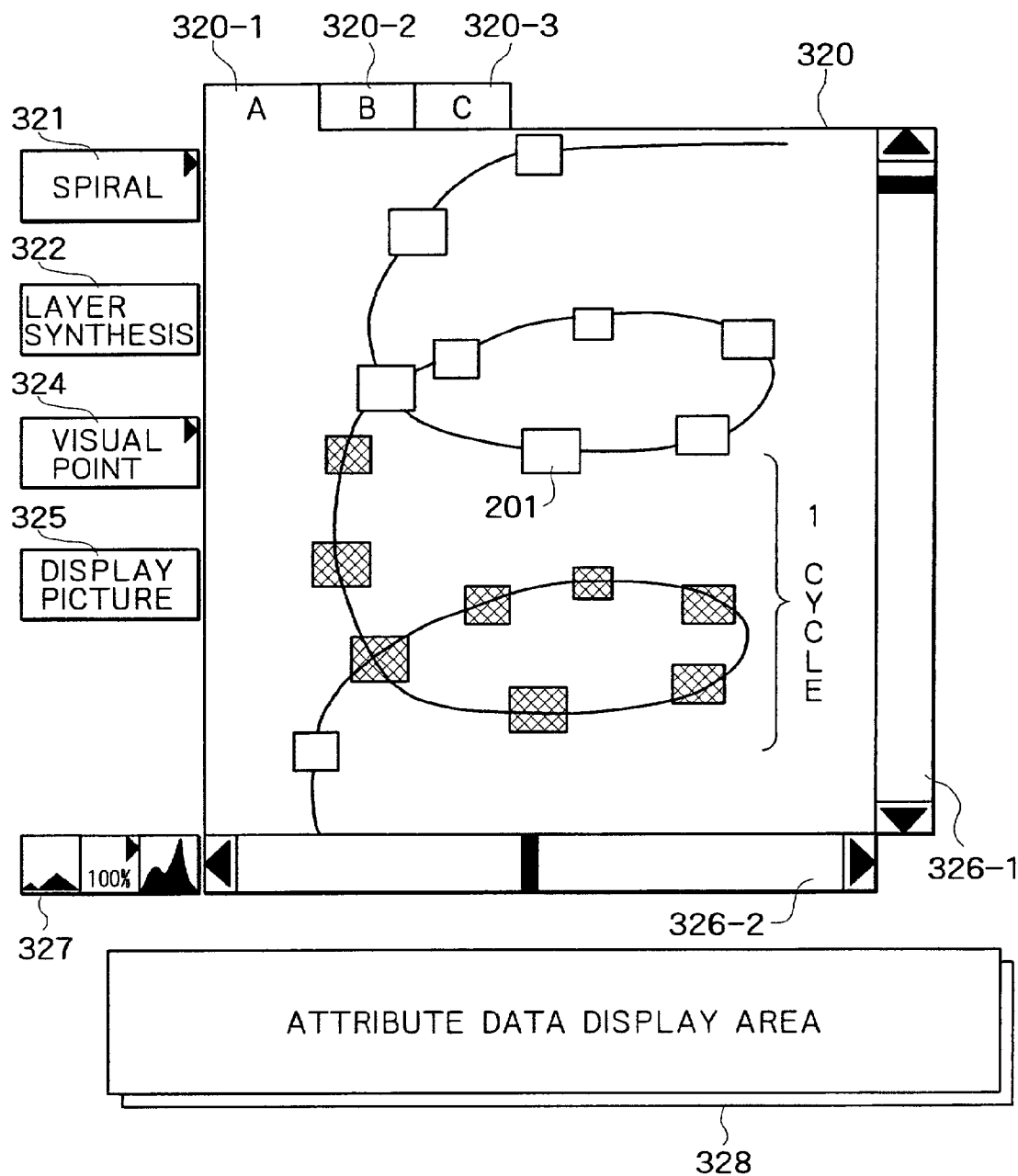
FIG. 41 is a diagram showing a typical display of a spiral axis and thumbnail icons on the LCD unit.

FIG. 41 is a diagram showing a screen displaying a virtual spiral and thumbnail icons in accordance with the present invention. In the display screen shown in FIG. 41, by operating an icon 301 shown in FIG. 31, thumbnail icons 201 can be displayed in the entire display area of the LCD unit 7. Of course, by operating an icon 301 shown in FIG. 31, thumbnail icons 201 can also be displayed in a predetermined range of the display area of the LCD unit 7.

The display screen shown in FIG. 41 comprises one to a plurality of layers 320. In the case of the typical example shown in FIG. 41, the display screen comprises an A layer 320-1, a B layer 320-2 and a C layer 320-3. A virtual spiral and thumbnail icons 201 displayed on each of the layers are set by operating a spiral button 321 in a tool box on the left side of the screen.

Figure 42:
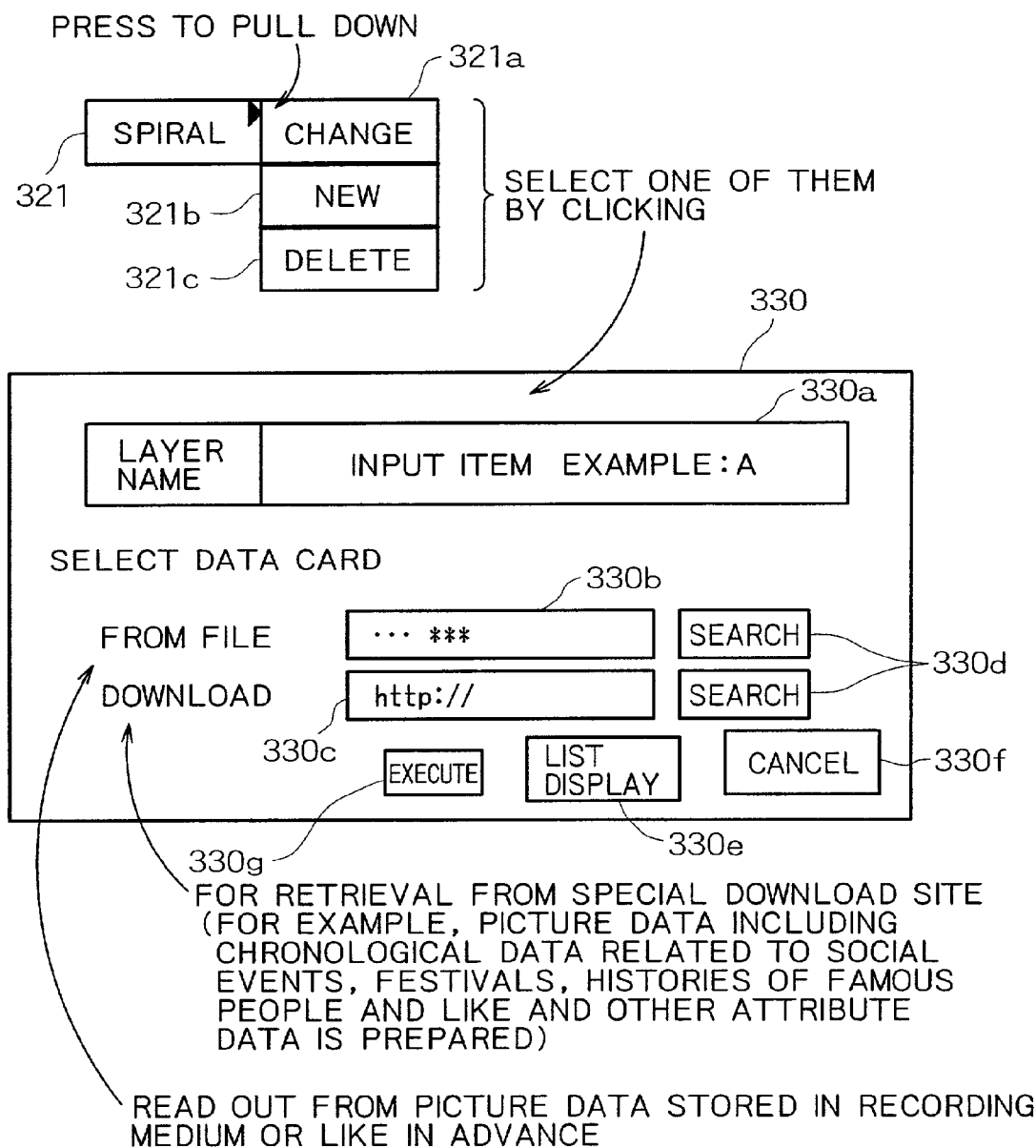
FIG. 42 is an explanatory diagram used for explaining operations to set a spiral in the display shown in FIG. 41.

Next, a spiral-setting dialog window shown in FIG. 42 is explained. When the spiral button 321 shown in FIG. 41 is selected and operated, a pull-down menu is displayed. The pull-down menu includes a change menu-button 321*a,* a new menu-button 321*b* and a delete menu-button 321*c.* If any one of the change menu-button 321*a,* the new menu-button 321*b* and the delete menu-button 321*c* is selected, a dialog box 330 is displayed.

The dialog box 330 includes a layer-name input box 330*a,* an existing-file select box 330*b,* a download select box 330*c,* a search button 330*d,* a list display button 330*e,* a cancel button 330*f* and an execute button 330*g.* In the layer-name input box 330*a* of the dialog box 330, the name of a layer for displaying a spiral is entered arbitrarily via input means such as the keyboard 5. Then, a thumbnail icon displayed on the spiral is set. A thumbnail icon is set by selecting data serving as an origin of the thumbnail icon. In the case of this embodiment, such data is selected by specifying a predetermined file in either the existing-file select box 330*b* or the download select box 330*c.*

If a phrase "From a file" is selected for the existing-file select box 330*b* of the dialog box 330 and it is desired not to specify the name of a file directly, click the search button 330*d* to display names of files each containing a content. After specifying the name of a displayed file, click the execute button 330*g.* By doing so, the pieces of processing at the steps of the flowchart shown in FIGS. 33 and 34 are carried out. In this case, picture data stored in advance in a recording medium such as a memory stick 116 is read in, a thumbnail icon is created and a desired spiral layer is formed.

In addition, besides the operation to read in data such as picture data from a recording medium such as a memory stick 116, with the data management software for managing data activated in advance activated, as a function of the data management software, spiral display software may also be invoked. In this case, the following configuration can be implemented. First of all, the data management software is used for reading in data, editing a data-card group and creating a file. Then, the information-processing apparatus provided by the present invention is activated as a function of the data management software. Then, select "From a file" for the existing-file select box in the dialog box 330 and click the search button 330*d* to display data-card-group files. Then, one of the displayed files is read in.

As an example, assume that the data management software manages a data-card-group file named "A travel". The file contains data about a travel. To be more specific, the file contains a data-card group of a 5-day travel to accompany time-axis data. The information-processing apparatus provided by the present invention reads in the A-travel file in a way described earlier. The file was created in advance for an editing purpose desired by the user. By generating thumbnail icons for the respective data cards, a picture display desired by the user can be obtained with ease. In this example, the desired display is a display of the A travel.

In addition, if the "Download" item for the download select box 330*c* is selected, an access is made to typically a dedicated download site provided on the Internet to download data. In this case, information such as attributes and a data-card group of typically pictures related to social events, sacred rites, social happenings such as festivals, histories of famous people and the like may be downloaded and read in for creating a spiral layer.

Furthermore, during the read-in processing, a temperature and a humidity may be input or acquired from additional attributes of recorded audio data to accompany a time and a date or without regard to a time, and output to a display screen or used as a condition for extracting data. Assume a case based on a temperature as an example. In such a case, when data for a temperature exceeding typically 30° C. is displayed, the user is capable of viewing people-related data for a pool, the sea or light dress. In the case of data of low temperatures such as temperatures below 0° C., on the other hand, data that is difficult to express by using only time units can be displayed. An example of such data is data for a cold region such as a snow area. By displaying such data, the user is capable of understanding a data display on a screen also showing a sequence of transitions of time such as seasonal changes as well as the temperature and the humidity varying from time to time.

The following description explains typical setting of a unit time assigned to a spiral cycle after processing to read in a data card. When the list display button 330*e* described earlier is clicked, a data-card list like one shown in FIG. 43 is displayed. The data-card list includes a data-card setting window 350 as well as a data-card-ID list 360, a confirm button 361 and a cancel button 362.

The 350 includes a 1-cycle-unit-time-setting display window 350*a* and a thumbnail-count-per-¼-cycle-inputting window 350*b.* In the example shown in FIG. 43, a unit time is set by using a unit-time-setting menu 351. The unit-time-setting menu 351 includes a year unit, a month unit, a week unit, a day unit and an hour unit, one of which is to be selected as a unit time of 1 cycle. The color of a selected unit changes to clarify the selection. It should be noted that a specification box 352*a* includes other conditions which are information based on attributes such as a temperature and a humidity. The other conditions can be displayed by clicking a pull-down button 352*b.* However, this feature is not shown in the figure.

In this case, the user is allowed to change a unit time. The user is also allowed to specify the number of displayable thumbnail icons. In this embodiment, a displayable-thumbnail count of up to 6 can be specified. A displayable-thumbnail count of up to 6 is based on consideration of easy viewing and easy understanding of a screen display. That is to say, a displayable-thumbnail count greater than 6 may adversely result in display inconvenience in some cases. That is why an upper limit is set in advance on the number of displayable thumbnail icons. As many thumbnail icons as the specified displayable-thumbnail count are displayed equally for each ¼ of a cycle.

From the date of a cycle unit time specified as described above, a unit time assigned to 1 cycle is computed automatically to display a data-card-ID list 360 like the one shown in FIG. 43. The following description explains a case in which the number of displayable thumbnail icons is specified. Assume that 6 thumbnail icons are displayed for ¼ of a cycle constituting a spiral. In this case, 24 thumbnail icons are displayed in 1 cycle. The number of thumbnail icons displayed in ¼ of a cycle is compared with the number of data cards fetched in ¼ of a cycle to form a judgment as to whether both the numbers are equal to each other.

The following description explains a case in which the number of thumbnail icons displayed in ¼ of a cycle is not equal to the number of data cards fetched in ¼ of a cycle.

If the number of displayable thumbnail icons is larger than the number of fetched data cards, thumbnail icons for all the data cards are generated and displayed. Assume that the limit of the number of displayable thumbnail icons is set at 6 and only 5 data cards are fetched in ¼ of a cycle. In this case, since a data card for 1 thumbnail icon is missing, such a thumbnail icon is displayed as typically a star-shaped icon. The display of a thumbnail icon with a missing data card is not specially limited to a star-shaped icon though. Such a special thumbnail icon can be expressed by a differentiating display that allows the special thumbnail icon to be distinguished from other thumbnail icons each having a data card with ease at a glance. In addition, a current social circumstance, music, a sound and the like can also be displayed along with a color at positions preceding and/or succeeding a thumbnail icon 201 appearing as a differentiating display as described above. In this case, however, such a current social circumstance, music, a sound and the like, which are displayed along with a color, is not directly related to the thumbnail icon appearing as a differentiating display such as a displayed thumbnail icon 201 like the one described earlier.

If the number of fetched data cards is relatively large, on the other hand, a priority level is assigned to each of the data cards in advance. With "From a file" for the existing-file select box 330b in the spiral dialog box 330 described earlier, an operation to click the search button 330d will cause a list of files to be displayed. If a predetermined one of the files on the displayed list is specified, data cards are read in. After the operation to read in data cards, a list of such data cards is displayed. By assigning a priority level to each of the data cards, the data cards can be associated with thumbnail icons to be displayed on a priority basis.

The following description explains the display of a data-card list 360 and an operation to set priority levels in more detail by referring to FIG. 43. As shown in the figure, each entry of the data-card list 360 includes a thumbnail ID 360a, a thumbnail icon 360b and a date 360c. The data cards are displayed as a list so that the contents of each of the data cards can be understood roughly. Each entry also includes items to be entered, namely, a data-card title 360d, a data-card comment 360e and a thumbnail display priority level 360f. The contents of each of these items entered for a data card can be displayed as a text at a position adjacent to a thumbnail icon associated with the data card when the thumbnail icon is selected and displayed as a highlight as will be described later.

For example, assume that 1 year is taken as a cycle of the spiral. In this case, a cycle consists of four ¼ cycles, namely, spring or March, April and May, summer or June, July and August, autumn or September, October and November and winter or December, January and February. Also assume that the number of displayable thumbnail icons in ¼ of a cycle is set at 6.

In this case, data cards composing a group read in as data are classified by data-card-fetching date into four subgroups, namely, spring or March, April and May, summer or June, July and August, autumn or September, October and November and winter or December, January and February. The number of data cards in a sub-group is compared with the number of displayable thumbnail icons in ¼ of a cycle. If the number of data cards in a sub-group is found smaller than the number of displayable thumbnail icons in ¼ of a cycle, all the data cards are automatically displayed as thumbnail icons. In this case, a thumbnail icon with a missing data card is displayed as a star-shaped icon to indicate that a data card is missing or, as an alternative, a current social circumstance, music or a sound is selected.

If the number of data cards in a sub-group is found greater than the number of displayable thumbnail icons in ¼ of a cycle, on the other hand, first of all, a priority level is assigned to each data card pertaining to every sub-group corresponding to ¼ of a cycle of the spiral. The number of 1, 2, 3, 4, 5 or 6 representing a priority level a data card is entered to a priority-level input column for the data card. A priority level of 1 assigned to a data card specifies that the data card be represented by a representative thumbnail icon for the unit time of the spiral axis. A comment on a data card can also be entered to a comment-input column for the data card. If no priority levels are assigned to data cards in particular, displays of thumbnail icons for the data cards can be based on dates with a most recent data regarded as a highest level of priority. As many thumbnail icons as displayable thumbnail icons are then displayed.

As described above, a priority level is assigned to each data card pertaining to every sub-group corresponding to ¼ of a cycle of the spiral, and displayed thumbnail icons are set on the entire spiral. In this way, a spiral and thumbnail icons are displayed as shown in FIG. 41. In order to make explanation easy, in the example shown in FIG. 41, 8 thumbnail icons are displayed for each cycle.

A comment or the like cataloged in a data card is displayed typically at a location on the right lower side of a thumbnail icon displayed for the data card as a text adjacent to the thumbnail icon so as to prevent the comment from being superposed on the thumbnail icon. In addition, assume that the date of the spiral and thumbnail icons is 2001 spring which is supposed to be displayed on the front side of the screen. In this case, the date 2001 spring can be displayed as a text at a position in an area not occupied by the spiral and the thumbnail icons.

If a layer-synthesis button 322 of a tool-box group displayed on the left side of the screen shown in FIG. 41 is selected and operated, spiral layers are synthesized. By selecting and operating the layer-synthesis button 322, for example, the A layer is synthesized with the B layer, on which happenings such as social events and festivals are shown so that the 2 layers, namely, the A and B layers superposed on each other, can be displayed.

Figure 44:
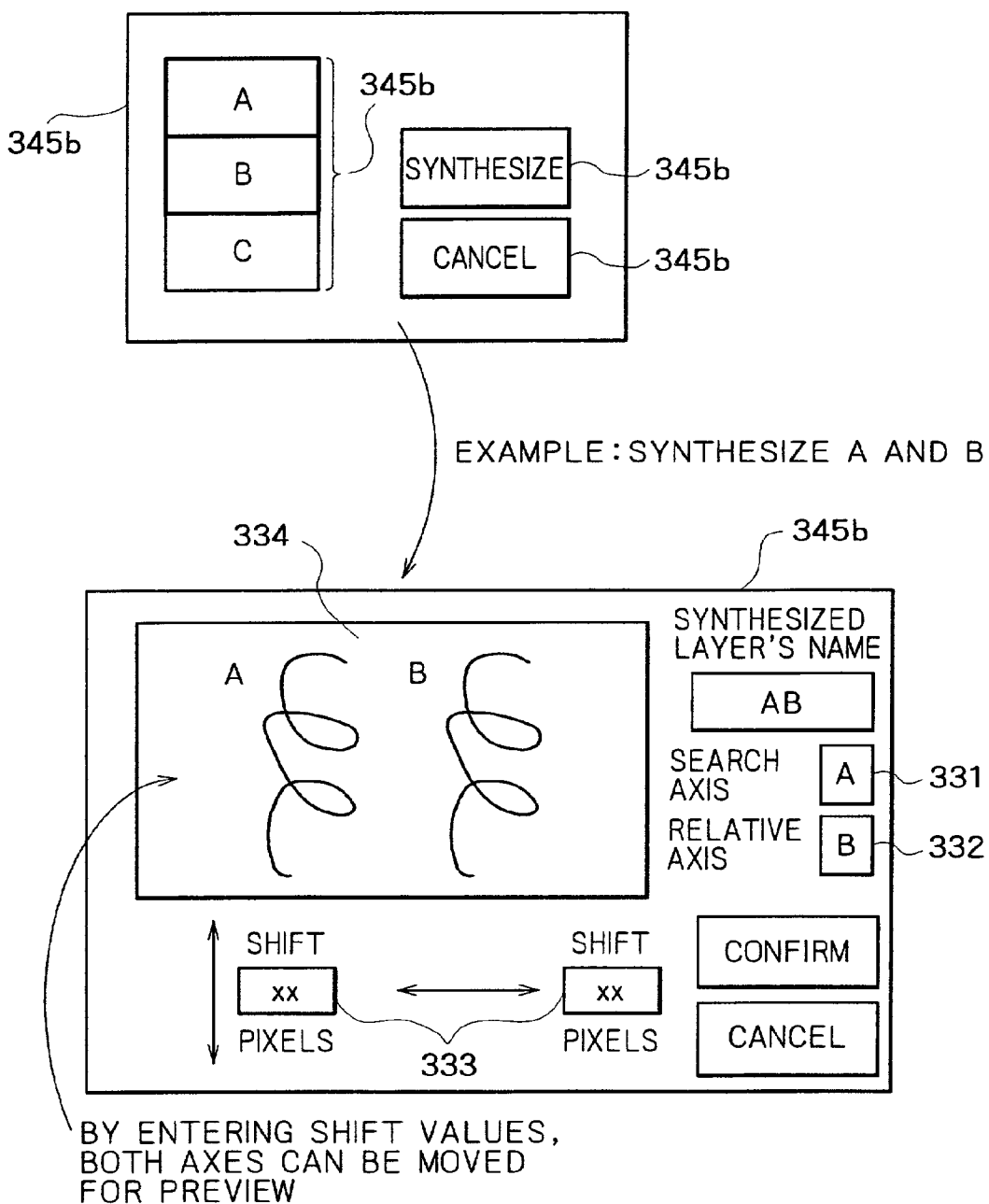
FIG. 44 is an explanatory diagram used for describing synthesis of layers in the display shown in FIG. 41.

Synthesis of spiral layers is explained by referring to FIG. 44. As an example, assume A and B spiral layers shown in FIG. 41 are synthesized. In this case, a layer-synthesizing tool shown in FIG. 41 is typically selected and used. First of all, the layer-synthesis button 322 shown in FIG. 41 is clicked to display a layer synthesis dialog window 370 shown in FIG. 44. The layer synthesis dialog window 370 includes a layer select button 370a, a synthesis button 370b and a cancel button 370c. The layer select button 370a is operated to select layers to be synthesized. Then, the synthesis button 370b is clicked. The cancel button 370c is clicked in case no layer synthesis is to be carried out.

When the synthesis button 370b is clicked, a synthesis setting screen 380 is displayed. The synthesis setting screen 380 includes a synthesized-layer-name input box 380a, a reference-axis-setting box 331, a relative-axis box 332, shift-numerical-value boxes 333 and a preview screen 334. In the example shown in FIG. 44, the entered name of a synthesized layer is for example AB to indicate that the synthesized layer is obtained as a result of synthesizing the A and B layers. Next, a shift between spiral axes is adjusted and set. In order to set a shift between spiral axes, first of all, operate the reference-axis-setting box 331 and the relative-axis box 332 to set a reference axis A and a relative axis B respectively. In this case, A is assumed to serve as a reference. Then, enter proper numerical values to the shift-numerical-value boxes 333 to adjust the shifts. The numerical values are the B relative axis' shifts relative to the reference axis A in the X and Y directions. In the meantime, the shifts between the reference axis A and the relative axis B based on the entered numerical values are previewed on the preview screen 334. In this way, the user is capable of adjusting the entered numerical values while checking the shift-numerical-value boxes 334.

As an example of displaying a plurality of spirals superposed on each other, there is a screen displaying mutually superposing spirals of a bridegroom and a bride in a wedding party. The newly-married couple's loci up to the wedding party are created on spiral layers separated from each other. The axes of the spirals are displayed at predetermined angles different from each other. By the axis of a spiral, the center axis of the spiral is meant. Identical thumbnail icons used on the spiral layers at a final position corresponding to the wedding party are displayed coincidently as a thumbnail icon common to both the spirals so as to clarify a relation between the two.

In addition, a spiral created on the basis of information such as events happening in society, geographical data and festivals as well as a spiral created on the basis of historical data of famous people can be superposed on a spiral created on the basis of growth records of an individual. In this way, the past locus of the individual can be superposed on information such as social circumstances to provide an expression of much interest. In addition, a spiral created on the basis of information such as events happening in society, geographical data and festivals as well as a spiral created on the basis of historical data of famous people can be sold or distributed to individual users through a public line such as the Internet, a telecommunication cable or a dedicated channel so that these spirals can be displayed by being superposed on a spiral created on the basis of growth records of an individual so that the individual is capable of viewing them.

Figure 47:
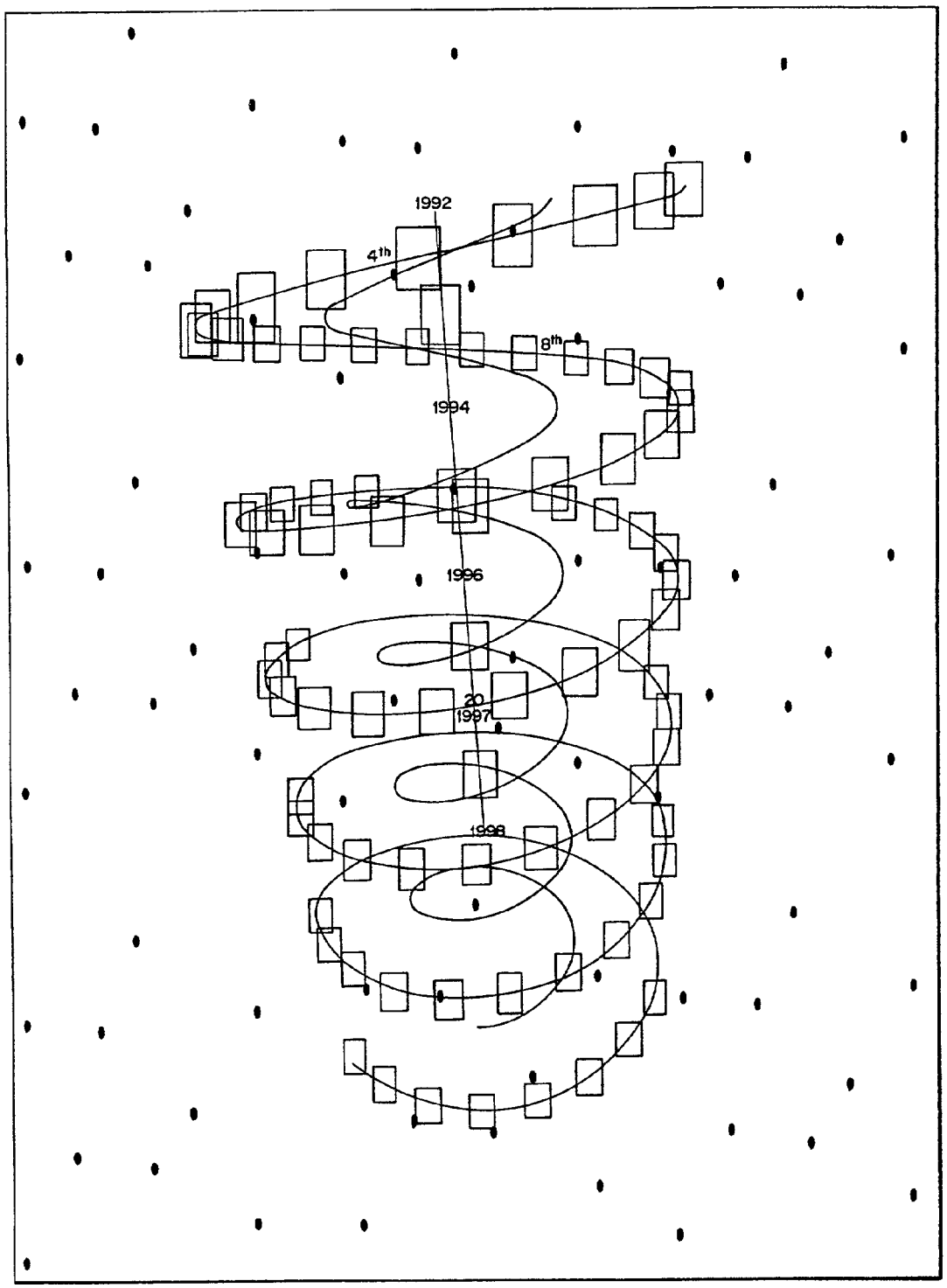
FIG. 47 is a schematic diagram showing a screen design obtained as a result of the operations to set a visual point, which are shown in FIG. 45.
Figure 48:
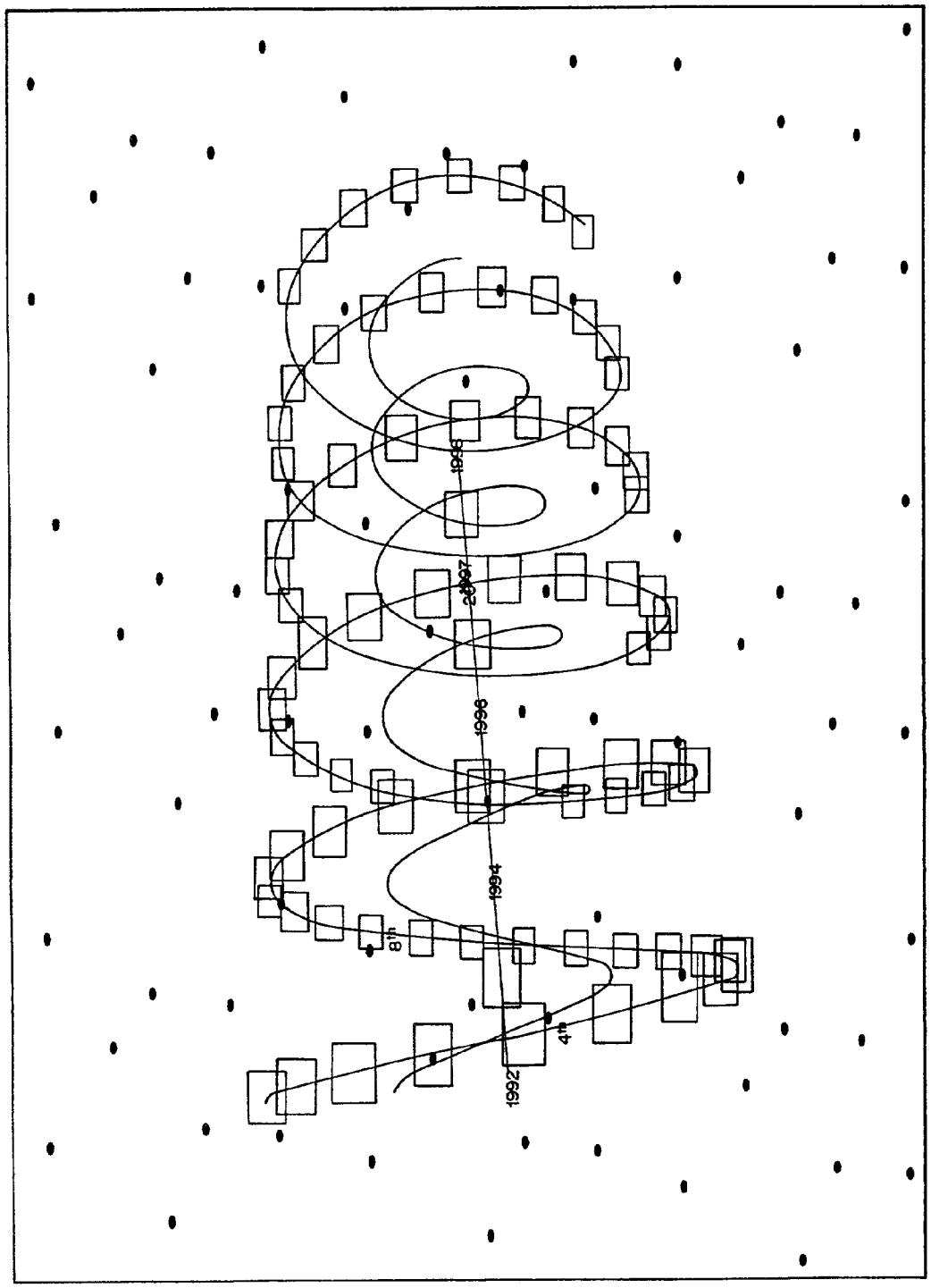
FIG. 48 is a schematic diagram showing another screen design obtained as a result of the operations to set a visual point, which are shown in FIG. 45.
Figure 49:
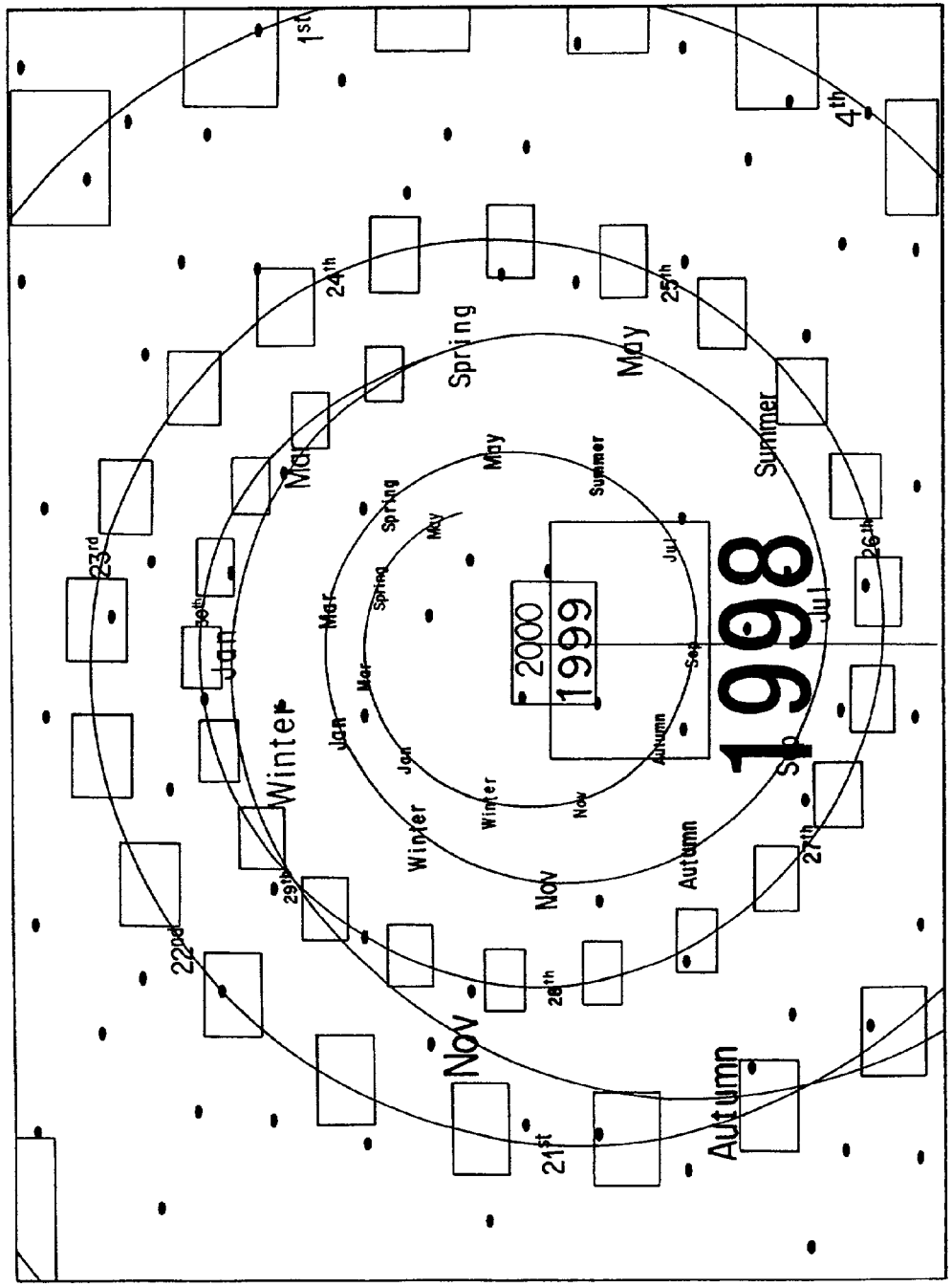
FIG. 49 is a schematic diagram showing a further screen design obtained as a result of the operations to set a visual point, which are shown in FIG. 45.

The following description explains a typical operation to set a visual point of a spiral display by operating a visual-point button 324 in the tool-box group displayed on the left side of the screen shown in FIG. 41. The spiral including thumbnail icons as shown in FIG. 41 is displayed with its axis appearing as an erected straight line oriented in the vertical direction as shown in FIG. 47. On the other hand, FIG. 48 shows a spiral with its axis displayed as a straight line oriented in the horizontal direction. FIG. 49 is a diagram showing a spiral with its axis oriented in a direction perpendicular to the surface of the screen. In this way, a visual point can be automatically set.

Figure 45:
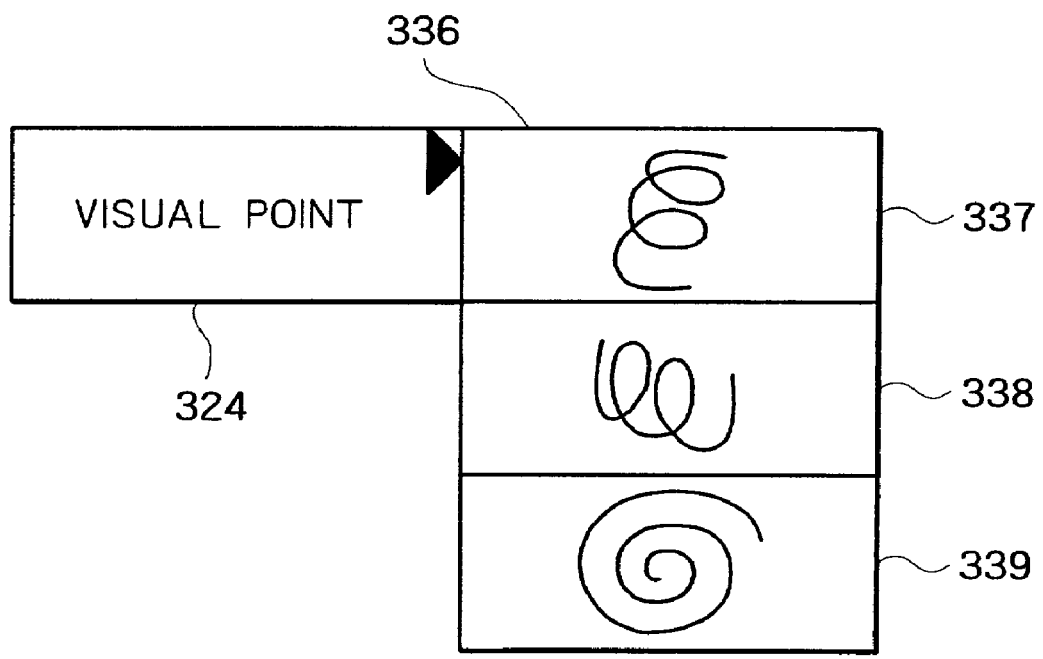
FIG. 45 is an explanatory diagram used for describing operations to set a visual point in the display shown in FIG. 41.

The automatic setting of a visual point is explained by referring to FIG. 45. When the visual-point button 324 shown in FIG. 41 is selected, a pull-down menu 336 for setting a visual point is displayed as shown in FIG. 45. The typical pull-down menu 336 shown in FIG. 45 includes 3 buttons for specifying a visual point of the spiral axis, namely, a vertical-orientation-display button 337, a horizontal-orientation-display button 338 and a top-view display button 339. By operating one of the vertical-orientation-display button 337, the horizontal-orientation-display button 338 and the top-view display button 339, it is possible to select an angle at which the spiral axis is to be looked at. The pull-down menu 336 may also include a button for selecting a tilting-orientation display of the spiral axis even though such a button is not shown in the figure. As for movement of the visual point, it is also possible to provide an automatic visual-point random movement for moving the space at random and an automatic visual-point linear movement for moving the space along information on the time axis. The automatic visual-point random movement and the automatic visual-point linear movement may also allow the movement direction of a commanding body moving at random to be specified as the direction of the space movement and a display to appear in accordance with this specification. An example of the commanding body is a figure serving as a model of a space ship. That is to say, the movement direction of the commanding body is taken as the direction of the lapse of time and the orientation of the spiral so that the screen displays the spiral with its axis oriented in the horizontal direction, the vertical direction or a direction perpendicular to the screen or the time axis oriented in the left/right, upward/downward, slanting or forward/backward direction.

In addition, in the so-called auto-navigation wherein an operation is carried out to automatically move a visual point, the visual point can be moved effectively, seamlessly and freely. With the auto-navigation, the visual point for a virtual space displayed on the LCD unit 7 can be changed as a resultant of 6 movement components consisting of 3 first movement components and 3 second movement components. The 3 first movement components are parallel movements of the visual point in the directions of the 3 axes, namely, the X, Y and Z axes, in the virtual space. For these movement components, the so-called camera angle or the direction of the visual line does not change. The 3 second movement components are changed by selecting the camera angles (visual-point directions) of 3 axes, namely a yaw(or horizontal vibration) axis, a pitch (or vertical vibration) axis and a roll (or a rotation with the direction of the visual line taken as the rotational axis) axis. For these movement components, the so-called camera position (the visual point) does not change.

While carrying out adjustment based on a combination of the 6 movement elements so that the axis of the spiral is always included in the field of vision, the visual point is moved. An example of the axis of the spiral is a time axis representing years, months and days. That is to say, if only a parallel movement is made, the axis of the spiral will inevitably protrude out from the field of vision. Thus, while the camera angle is being adjusted by always finding a new camera angle and the center of the route, the center of gravity of the spiral axis appears at the center of the screen all the time.

In addition, with regard to the position of the camera, a judgment on a collision is always formed so as to confine the movement within a predetermined range all the time. The speed of the movement of the camera position is random but can only change within a predetermined range all the time. A smooth rotation is made so that an unnatural jump does not occur in the change in the movement direction caused by a collision.

In some cases, the visual point is operated in manual navigation by using the keyboard 5 and the mouse. Since there are 6 movement components as described above, 12 operation keys are required.

As typical operation keys, for example, functions are assigned to keys on the keyboard 5 as follows. Depth-direction-setting keys (zoom keys) are the W key serving as a zoom-in key and the S key serving as a zoom-out key. Left-right-movement-setting keys (slide keys) are the left-arrow key serving as a left-movement key and the right-arrow key serving as a right-movement key. Up-down-movement-setting keys (slide keys) are the up-arrow key serving as an upward-movement key and the down-arrow key serving as a down-movement key. Rotation-setting keys (roll keys) are the 9-numerical key serving as a clockwise key and the 7-numerical key serving as a counterclockwise key. Pitch keys are the 8-numerical key serving as an upward-pitch key and the 2-numerical key serving as a downward-pitch key. Yaw keys are the 4-numerical key serving as a left-yaw key and the 6-numerical key serving as a right-yaw key.

In addition, a vertical scroll bar 326-1 and a horizontal scroll bar 326-2 are provided to scroll the entire screen. The vertical scroll bar 326-1 and the horizontal scroll bar 326-2 are operated to scroll the entire screen. Moreover, if one of thumbnail icons 201 is selected, the spiral and the thumbnail icons 201 can be displaced automatically with the selected thumbnail icon 201 coinciding with the center of the screen.

In order to make the display screen zoom in or out, a zoom tool (zoom button) 327 on the screen shown in FIG. 41 is operated. If a numerical display button of the zoom tool 327 is pressed, a number bar not shown in the figure is displayed to allow the user to select a desired enlargement or shrinkage percentage. As an alternative, each time either of shrinkage and enlargement icons displayed on both sides of the numerical display button is clicked, the screen is shrunk or enlarged at one of typical shrinkage or typical enlargement factors of 25%, 50%, 100%, 200% and 400%, which are set in advance for the shrinkage and enlargement icons.

In this manual-navigation mode, the user is capable of looking at a desired location at a desired angle from a desired position without adjusting the field of vision. In some cases, however, the field of vision is put at a loss. Thus, with the camera angle oriented outwardly at a position immediately preceding a collision with a movement-limiting contour, for example, only a background space appears on the display screen.

A special command is provided to restore a certain specific camera position and set the camera at a camera angle facing the center gravity of the spiral when an origin set in advance on the screen is hit. In addition, when a predetermined period lapses, the camera angle is gradually changed with the camera position sustained as it is so that the center of gravity of the spiral is drawn at the center of the screen. Furthermore, when another predetermined period lapses, the navigation mode is automatically switched to the auto navigation described above. Moreover, the user is allowed to determine whether or not a help window is to be displayed on the screen.

The user is allowed to operate a display-picture button 325 of a group of select buttons displayed on the left side of the screen shown in FIG. 41 to specify a picture to be displayed. FIG. 32 is a diagram showing the display of a picture represented by a selected thumbnail icon.

With only one thumbnail icon selected, in order to display a picture represented by the selected thumbnail icon, the picture can be displayed by clicking an icon 311 like one shown in FIG. 32.

By operating the display-picture button 325, on the other hand, a plurality of pictures represented by the same plurality of thumbnail icons can be specified. In order to display the pictures represented by the thumbnail icons, click an icon 311 like the one shown in FIG. 32. By clicking an icon 311 like the one shown in FIG. 32, the pictures are automatically loaded one picture after another and sequentially displayed like a slide show.

Figure 46:
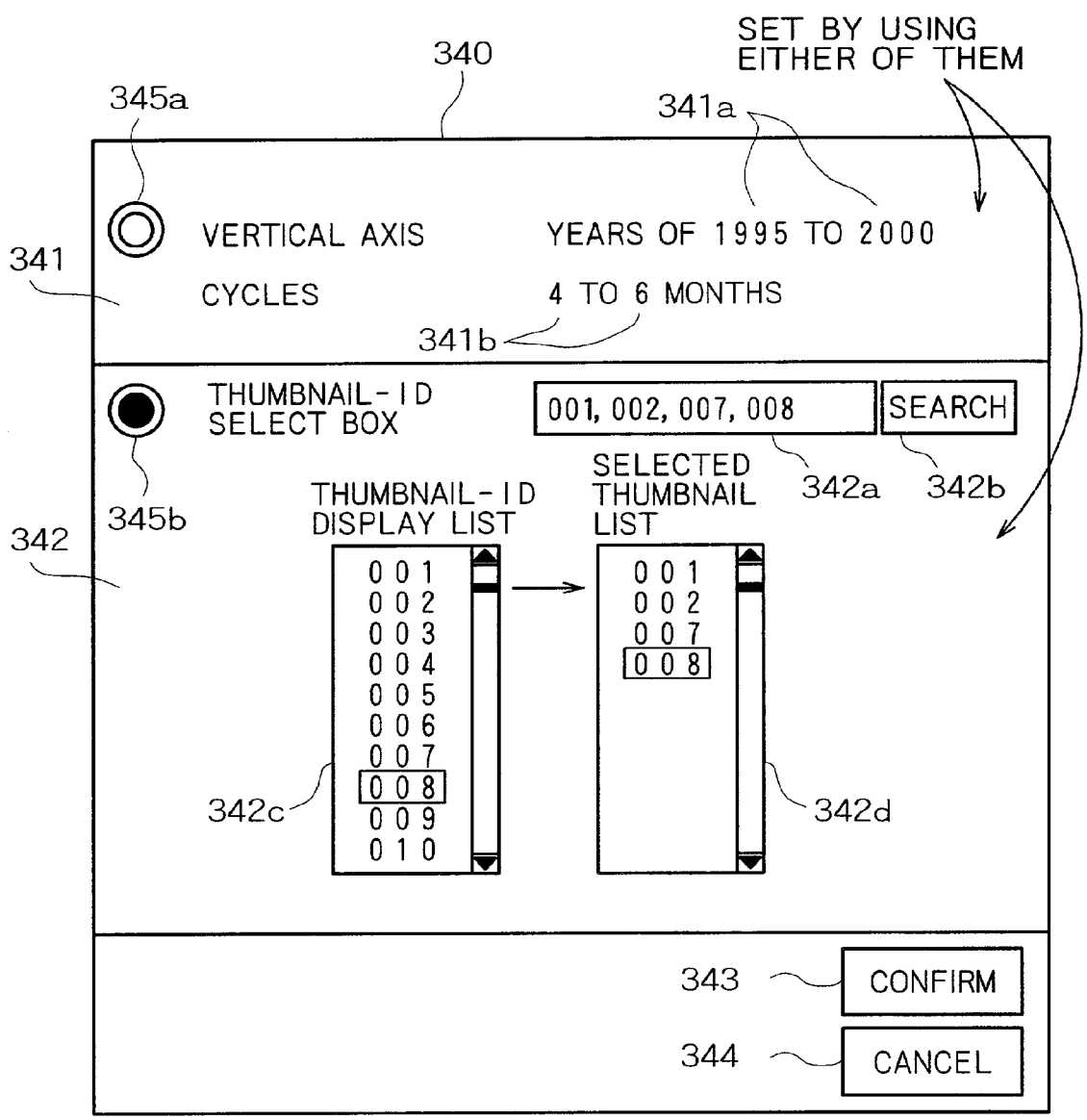
FIG. 46 is an explanatory diagram showing operations to set a displayed picture in the display shown in FIG. 41.

FIG. 46 is a diagram showing a display-picture-setting dialog window 340. The display-picture-setting dialog window 340 is displayed when the display-picture button 325 shown in FIG. 41 is clicked. As shown in FIG. 46, the display-picture-setting dialog window 340 includes a range-specification select portion 341, a thumbnail-ID select portion 342, a confirmation button 343 and a cancel button 344. The range-specification select portion 341 is used to specify a range of the spiral axis. In the case of this embodiment, the range-specification select portion 341 comprises a vertical-axis input box 341a and a cycle input box 341b. On the other hand, the thumbnail-ID select portion 342 comprises a thumbnail-ID select box 342a for specifying thumbnail IDs identifying individual pictures, a search button 342b for searching thumbnail IDs, a thumbnail-ID display list 342c and a selected-thumbnail list 342d. Select-button icons 345a and 345b are provided for selecting the range-specification select portion 341 and the thumbnail-ID select portion 342 respectively. By clicking either the select-button icon 345a or the select-button icon 345b, a method for specifying pictures can be selected.

As an example, assume that it is desired to display pictures for a period of 1995 to 2000 in cycles of April to June. In this case, enter the years of 1995 to 2000 to the vertical-axis input box 341a in the range-specification select portion 341 and a cycle of April to June to the cycle input box 341b of the range-specification select portion 341. If it is desired to add thumbnail IDs to this specified range, select the desired thumbnail IDs from those on the list shown in the thumbnail-ID select box 342a. The selected thumbnail IDs are shown on the selected-thumbnail list 342d.

The display-picture button 325 is clicked to select a plurality of thumbnail icons as described above. In addition to this method of clicking the display-picture button 325, carry out a one-click operation on any one of desired thumbnail icons appearing on the display screen shown in FIG. 41. Then, while pressing a shift key, carry out a one-click operation on a next desired thumbnail icon.

By clicking the icon 311 after selection of a plurality of thumbnail icons which has been described above, pictures represented by the selected thumbnail icons can be automatically loaded and sequentially displayed one picture after another like a slide show.

In addition, a selected thumbnail icon is displayed in a highlighted state. A highlighted display of a thumbnail icon may include the title of the thumbnail icon or the title of a data card represented by the thumbnail icon, the date of the thumbnail icon and a comment on the thumbnail icon, which are displayed along with the thumbnail icon at the same time.

Data represented by a displayed thumbnail icon 201 can be picture data stored in advance by using a digital camera or the like or include invisible data such as a sound or a smell. If the display of such a thumbnail icon 201 is selected and highlighted, the sound or the smell can be generated when a mouse cursor or a pointer is brought to point to a hot point which is the thumbnail icon 201 based on the sound or the smell. If a selected thumbnail icon is a hot point, attribute data for the thumbnail icon is displayed in the attribute-data display area 328 shown in FIG. 41. The attribute data typically includes texts serving as a title and a comment. Of course, the sound can also be played back automatically.

Figure 50:
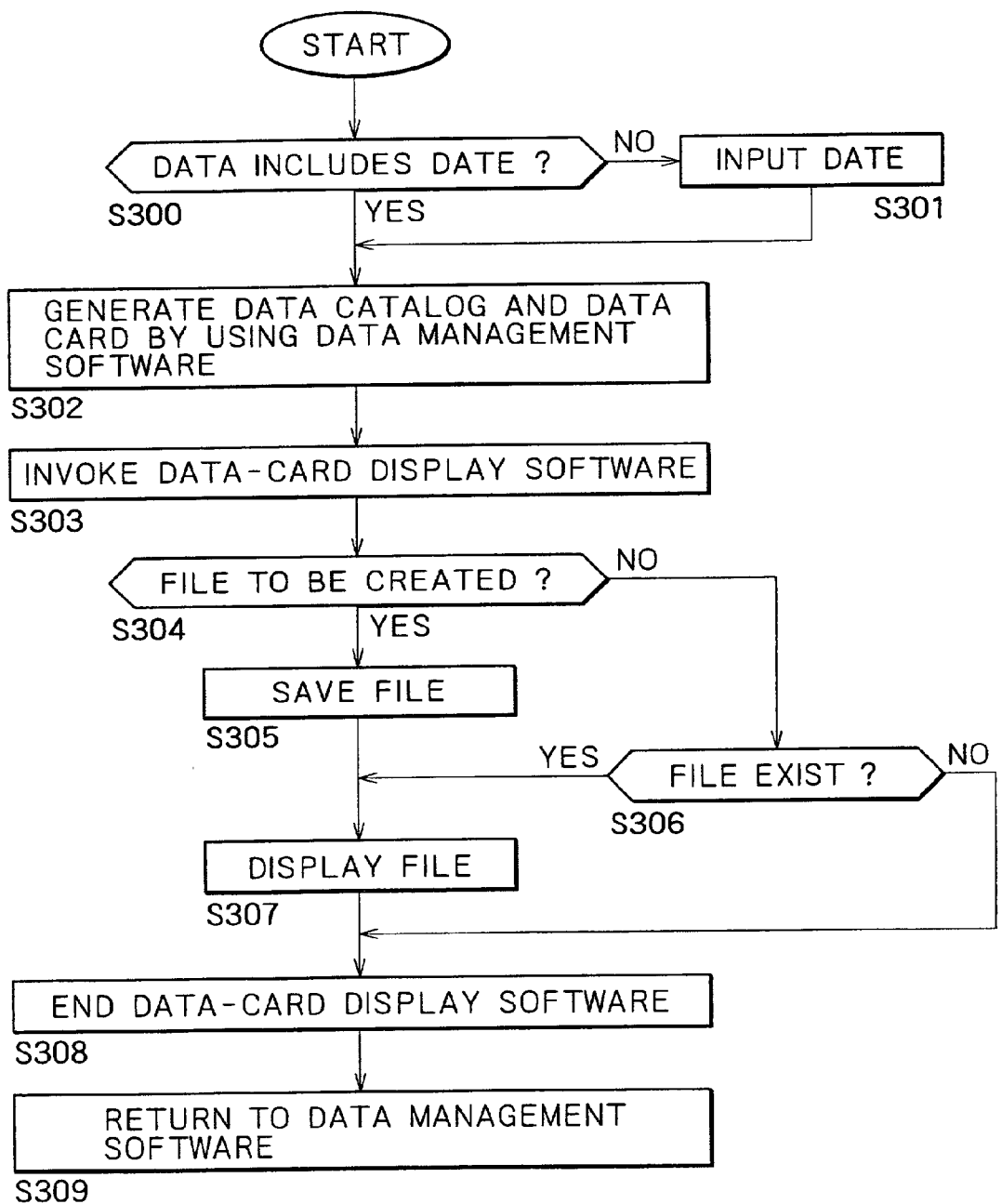
FIG. 50 is a flowchart representing processing carried out in accordance with the present invention.

FIG. 50 is a flowchart representing processing to display a spiral and thumbnail icons in accordance with the present invention. The processing to display a spiral and thumbnail icons in accordance with the present invention is explained as a function of the data management software. The spiral-displaying process has already been explained as a standalone function by referring to the flowcharts shown in FIGS. 33 to 40.

In the case of the flowchart representing processing to display a spiral and thumbnail icons as shown in FIG. 50, the data management software is first activated. As the processing to display a spiral and thumbnail icons is started, at the first step S300 of the flowchart, the data management software forms a judgment as to whether or not a date is included in data read in from typically a memory card when the data is read in from the memory card.

If the outcome of the judgment formed at the step S300 is NO indicating that no date is included in the data, the flow of the processing goes on to a step S301 at which processing is carried out to input a date.

If the outcome of the judgment formed at the step S300 is YES indicating that a date is already included in the data, on the other hand, the flow of the processing goes on to a step S302 at which the data management software catalogs the data and generates a data card. As a result, a file containing a plurality of data cards is created.

Then, at the next step S303, data-card display software is invoked. The data-card display software is a program to be executed for carrying out processing to display a spiral and thumbnail icons as already explained earlier.

Subsequently, at the next step S304, the data-card display software invoked at the step S303 forms a judgment as to whether a file is to be created.

If the outcome of the judgment formed at the step S304 is YES indicating that a file is to be created, the flow of the processing goes on to a step S305 at which a new file is created and the created file is saved at a predetermined storage location such as a hard disk of an HDD 67. This file contains data set by using the spiral-setting dialog window shown in FIG. 42. For this one file, a plurality of spiral layers may exist.

If the outcome of the judgment formed at the step S304 is NO indicating that a file is not to be created, on the other hand, the flow of the processing goes on to a step S306 to form a judgment as to whether or not a file already exists. A judgment as to whether or not to call hs is formed. If the outcome of the judgment formed at the step S306 is NO indicating that the file does not exist, the flow of the processing goes on to a step S308 at which the execution of the data-card display software is ended. If the outcome of the judgment formed at the step S306 is YES indicating that the file exists, on the other hand, the flow of the processing goes on to a step S307 at which the file is displayed.

To be more specific, the processing carried out at the step S307 displays the file created and saved at the step S305 or the file with the existence thereof confirmed at the step S306. With the file displayed, the display processing of the functions explained by referring to FIGS. 41 to 49 is carried out.

After desired processing of the functions explained by referring to FIGS. 41 to 49 is carried out at the step S307, the flow of the processing goes on to the step S308 at which the execution of the data-card display software is ended. That is to say, the processing to display a spiral is terminated.

After the execution of the data-card display software is ended at the step S308, the flow of the processing goes on to a step S309 at which the control of software execution is returned to the data management software.

Figure 51:
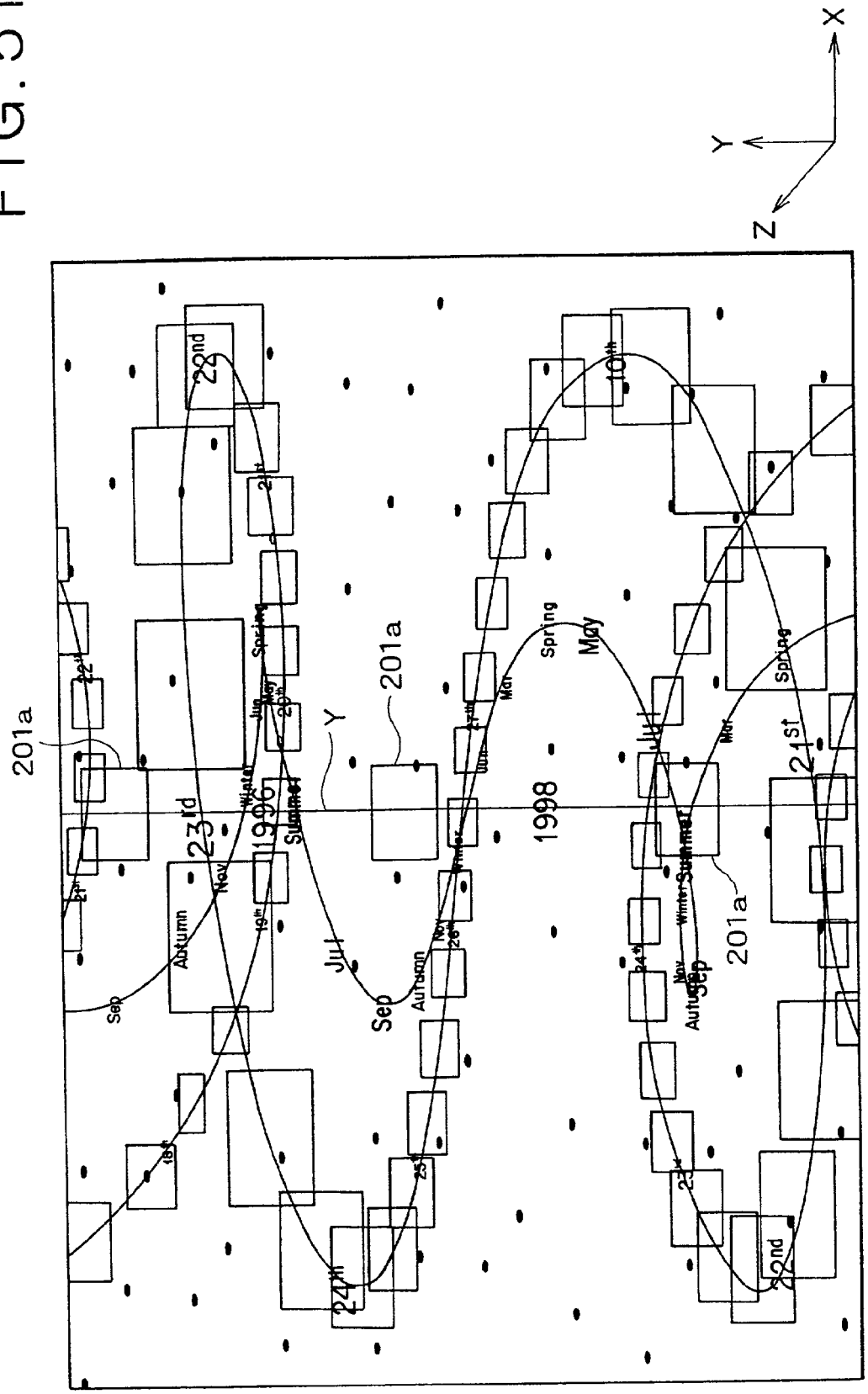
FIG. 51 is a schematic diagram showing a typical display screen provided by the present invention.

FIG. 51 is a diagram showing a typical screen displaying a virtual spiral and thumbnail icons in accordance with the present invention. The thumbnail icons have large and small sizes which indicate a variety of thumbnail display positions in the depth direction. A thumbnail icon closer to the viewer is displayed at a larger size while a thumbnail icon farther from the viewer is displayed at a smaller size.

In this example, the Y axis serving as the center of the screen shows unit times such as the year used in this straight-line time concept. In addition, a representative thumbnail icon 201a is displayed on the Y axis for each of the unit times. On the other hand, the lapse of time such as the seasonal changes from spring to winter through summer and fall, that is, a time flow adopted in the cyclical time concept, is displayed as spiral cycles on a plane defined by the X and Z axes. Thus, a 1-cycle lapse of time such as a 1-year lapse of time is displayed as a spiral around the Y axis, and thumbnail icons are displayed on the spiral. In this embodiment, a thumbnail icon is displayed in a semitransparent form. A star-spangled sky is displayed as the background.

To put it concretely, the years of 1996 and 1998 as well as representative thumbnail icons 201a are displayed on the Y axis serving as the time axis. On the other hand, thumbnail icons are displayed along the spirals along with the names of the season, namely, spring, summer, autumn and winter. A representative thumbnail icon 201a may be identified by typically a special mark which is appended when information such as data-card ID is set as shown in FIG. 43.

Figure 52:
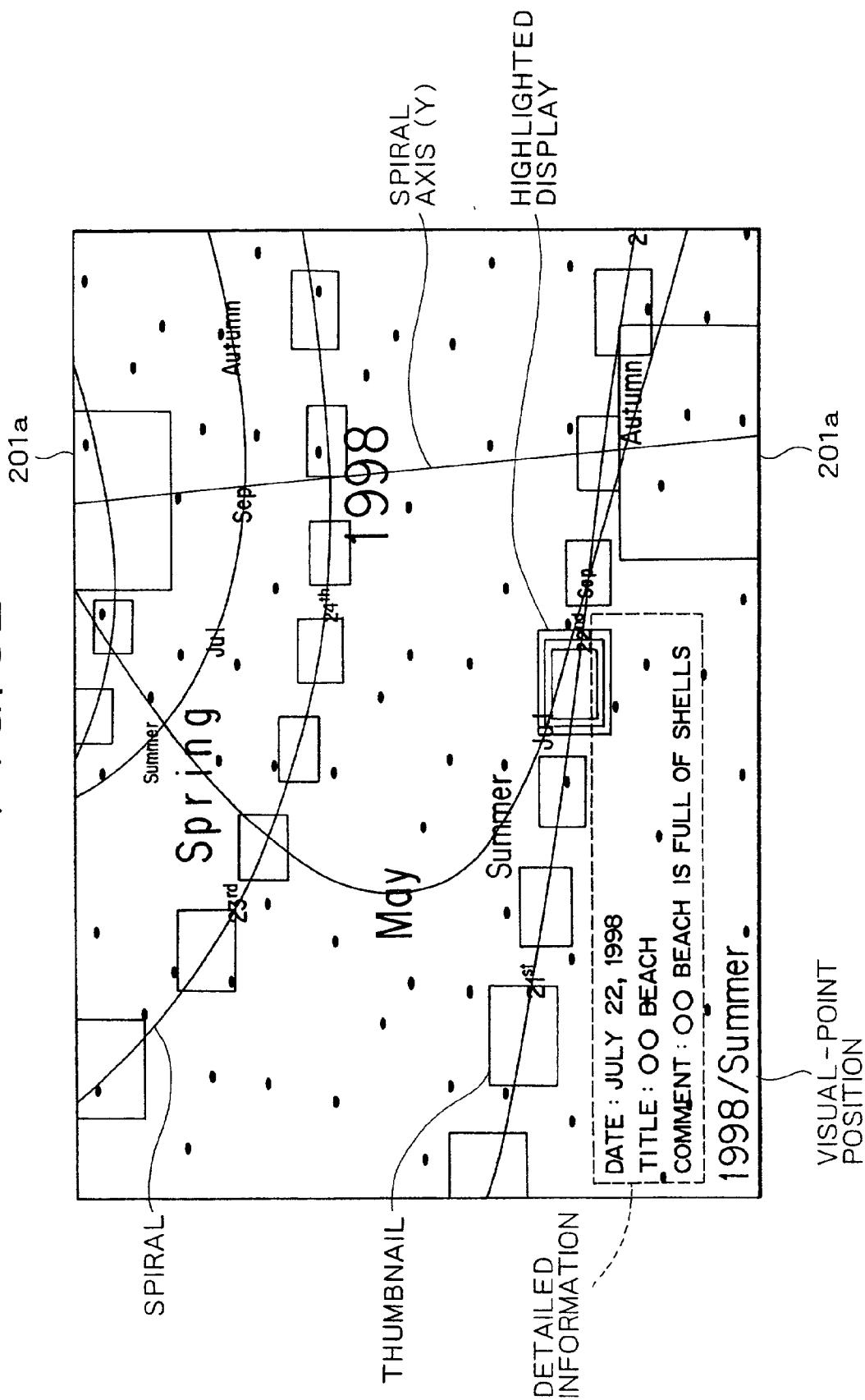
FIG. 52 is a schematic diagram showing a typical display screen provided by the present invention.

FIG. 52 is a diagram showing an enlarged portion of the display appearing on the screen shown in FIG. 51. Let a particular thumbnail icon be selected from a plurality of thumbnail icons. In this case, a highlighted frame is displayed, enclosing the selected thumbnail icon as shown in FIG. 52. Detailed information on the selected thumbnail icon with a highlighted frame is shown on the left-low corner of the screen. The detailed information includes a title, a comment and a date for a data card used as a base for generating the thumbnail icon as described earlier by referring to FIG. 43. In addition, the visual point is also positioned at the left-low corner of the screen. In this case, the visual point position takes the center of gravity as the origin of Y-axis data.

In addition to the typical implementations of operations to set items or the like and the display screen in accordance with the embodiment as described above by referring to FIGS. 41 to 52, there is of course a variety of conceivable versions. That is to say, the scope of the present invention is not limited to the typical implementations of the embodiment.

As another implementation of the embodiment, the operations to set a screen as described above by referring to FIGS. 41 to 52 are not carried out by the user or the viewer using a local computer. Instead, such operations are carried out typically in a shared area on the Internet wherein a plurality of users is allowed to add information with a high degree of freedom to spiral layers provided in advance in the shared area. An example of a spiral layer is histories of famous people or the like.

In addition, by typically pasting additional information of a predetermined format on HTML-format data of a screen obtained as a result of processing in the typical implementation of the embodiment, the data can be revealed through the Internet and sold as shareware data. Moreover, the communication means is not limited to the Internet. Other communications means include a dedicated channel and a cable. These pieces of data are used typically as a screen saver or the like.

The series of pieces of processing described above can be carried out by hardware or through execution of software. When execution of software is selected for carrying out the series of pieces of processing, a variety of programs composing the software are executed by a computer incorporated in special hardware. As an alternative, the programs are installed in a recording medium employed in typically a general-purpose personal computer capable of executing the programs to carry out the pieces of processing.

As shown in FIG. 6, a recording medium for presenting a program to the user is distributed separately from the main unit of the apparatus. In order to present a program to the user, however, the use of package media is not mandatory. As mentioned before, examples of the package media are the magnetic disc 121 including a floppy disc, the optical disc 122 including a CD-ROM (Compact-Disc Read-Only Memory) and a DVD (Digital Versatile Disc), the magneto-optical disc 123 including an MD (Mini Disc) and the semiconductor memory 124. As an alternative, a program can also be presented to the user by incorporating the program in the main unit of the apparatus in advance. That is to say, the program is stored in a ROM or a hard disk of the HDD 67 permanently or temporarily. A program can be stored through an interface such as the modem 75 by using wire or wireless communication media such as a local area network, the Internet or digital satellite broadcasting if necessary.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or individually.

In addition, the technical term "system" used in this specification means the whole equipment comprising a plurality of apparatuses.

As described above, in accordance with the present invention, it is possible to provide predetermined unit times to 2 elements of the time-axis property, namely, the period of a spiral and the axis of the spiral, possible to lay out a plurality of thumbnail icons based on time-axis data along the spiral and possible to express a time-axis display of the spiral and the thumbnail icons 2-dimensionally. In this way, in accordance with the present invention, it is possible to display a cyclical time concept by expressing a sequence of seasonal transitions of spring, summer, autumn and winter as a cycle, displaying a morning, a day time and a night as a cycle of the lapse of time on a day and displaying a cycle based on changes in temperature or humidity and by including integrated data of pictures and comments as well as nature and creatures. In addition, a plurality of thumbnail icons displayed along a time axis on the spiral can be specified on the basis of a predetermined regularity and displayed collectively as an image for each season such as spring or autumn. For example, data only for a predetermined season such as spring can be collected. The data can then be displayed by superposing data of the spring of a year on pieces of data of the spring of other years. As an alternative, only data representing high-temperature conditions can be displayed so that the user is capable of enjoying only displays of much interest to the user.

In addition, in accordance with the present invention, by specifying representative thumbnail icons and displaying the representative thumbnail icons as an array on the axis of the spiral, locations of the selected representative thumbnail icons on the spiral can be clarified, and a positional relation between the period of the spiral and the axis of the spiral can be verified at the same time so as to provide simple operatability which can be understood intuitively.

Furthermore, in accordance with the present invention, by synthesizing a plurality of spiral layers each showing a spiral and thumbnail icons and displaying a synthesized layer obtained as a result of the synthesis, the layers can be displayed by being superposed on each other as the synthesized layer obtained as a result of the synthesis. As an example of displaying a plurality of layers superposed on each other, assume that layers of a bridegroom and a bride are superposed on each other in a wedding party. The newly-married couple's loci from the day they started going out up to the day of the wedding party are created on spiral layers separated from each other along spirals with axes different from each other. The synthesized layer obtained as a result of the synthesis can be displayed in such a way that the time axis of the bridegroom's spiral coincides with the time axis of the bride's spiral. The user is thus capable of enjoying a data display that is abundant in performance effects and of much interest to the user. of course, if a spiral axis of data representing important events occurring in the era and information on famous persons is superposed on the data display, it is possible to present a display of various kinds of interest to the user.

Moreover, a predetermined regularity can be designed to comprise at least a regularity based on a time axis including at least a time, a day, a month or a year, a regularity based on temperatures or a regularity based on humidity. Assume a regularity based on a temperature as an example. With such a regularity, when data for a temperature exceeding typically 30° C. is displayed, the user is capable of viewing people-related data for a pool, the sea or light dress. In the case of data of low temperatures such as temperatures below 0° C., on the other hand, data that is difficult to express by using only time units can be displayed. An example of such data is data for a cold region such as a snow area. In addition, the regularity based on a time axis including at least a time, a day, a month or a year, the regularity based on temperatures or the regularity based on humidity can be applied by itself as the predetermined regularity or, as an alternative, those regularities can be superposed on each other to form the predetermined regularity. Thus, it is possible to widen the range of data-display selections and to express data of much interest to the user.

Furthermore, by displaying thumbnail icons and representative thumbnail icons semitransparently, data behind the thumbnail icons and the representative thumbnail icons is not concealed completely but visible instead. Thus, the data can be displayed by showing the period and the axis of the spiral as they are. As a result, it is possible to provide simple operatability which can be understood intuitively.

Moreover, the visual point of a spiral layer displaying a virtual spiral, the axis of the spiral and representative thumbnail icons can be moved automatically or manually. In addition, the visual point can be moved in a parallel motion in the X, Y or Z direction, vibrated in the horizontal or vertical direction or rotated in the clockwise direction. By moving the visual point in this way in conjunction with the application of the regularities described above individually or as a regularity of superposition, performance based on a visual point in complex motion can be displayed in a variety of ways and it is also possible to widen the range of data-display selections and to express data of much interest to the user.

While the preferred embodiment of the present invention has been described using the specific terms, such description is for illustrative purposes only, and it is to be understood that changes and variations may be made without departing from the spirit or scope of the following claims.

What is claimed is:

1. An information processing apparatus comprising:
   a storage unit for storing raw data and time axis data related to said raw data and stored in said storage unit by association with said raw data;
   a thumbnail icon generating unit for generating a thumbnail icon representing said raw data read from said storage means;

a spiral period setting unit for setting a spiral period of a virtual spiral based upon a unit of time selected from a plurality of units of time, each of said plurality being repeated in accordance with a predetermined pattern;

a spiral axis setting unit for setting a spiral axis of said virtual spiral that represents a change of said unit of time; and a thumbnail icon array displaying unit for displaying said thumbnail icon in an array on said virtual spiral based upon said time axis data associated with said raw data represented by said thumbnail icon, wherein said spiral axis setting unit sets a direction in XYZ space and a slope of said spiral aixs.

2. The information processing apparatus according to claim 1, said information processing apparatus further comprising:

a representative thumbnail selecting unit for selecting one of a plurality of thumbnail icons displayed in said array on said virtual spiral as a representative thumbnail icon; and a representative thumbnail icon array displaying unit for displaying said representative thumbnail icon selected by said representative thumbnail selecting unit in an array on said virtual spiral.

3. The information processing apparatus according to claim 1, said information processing apparatus further comprising:

a spiral layer synthesizing unit for synthesizing a plurality of spiral layers each comprising said virtual spiral, said spiral axis, and said thumbnail icons; and a synthesized layer displaying unit for displaying a synthesized layer produced by said spiral layer synthesizing unit.

4. The information processing apparatus according to claim 1, further comprising:

a thumbnail icon extracting unit for extracting a specific thumbnail icon from a plurality of thumbnail icons displayed as said array based on said time axis data based upon attribute data of said raw data; and a data outputting unit for outputting said raw data represented by said specific thumbnail icon extracted by said thumbnail icon extracting.

5. The information processing apparatus according to claim 1, wherein said unit time corresponding to said spiral period set by said spiral period setting unit is one of a month unit and a one year unit including a spring, a summer, an autumn and a winter.

6. The information processing apparatus according to claim 2, wherein said representative thumbnail icon array displaying unit displays said thumbnail icon as a semitransparent display.

7. The information processing apparatus according to claim 3, further comprising a visual point moving unit for moving a visual point of said spiral layer displaying said virtual spiral, said spiral axis, and said thumbnail icons.

8. The information processing apparatus according to claim 7, wherein said visual point moving unit automatically moves said visual point of said spiral layer along a time axis.

9. A computer graphic display program storage method comprising the steps of:

storing raw data and time axis data related to said raw data in said storage unit by associated with said raw data and reading said raw data;

generating a thumbnail icon representing said raw data read in said storage step;

setting a spiral period of a virtual spiral based upon a unit of time selected from a plurality of unit of time, each of said plurality being repeated in accordance with a predetermined pattern;

setting a spiral axis of said virtual spiral that represent a change of said unit of time; and displaying said thumbnail icon in an array on said virtual spiral based upon said time axis data associated with said raw data represented by said thumbnail icon, wherein said spiral axis setting step sets a direction in XYZ space and a slope of said spiral axis.

10. The computer graphic display program storage method according to claim 9, further comprising the steps of:

selecting a specific thumbnail icon of a plurality of thumbnail icons displayed in said array on said virtual spiral as a representative thumbnail icon; and displaying said representative thumbnail icon selected in said representative thumbnail icon selecting step in said array on said virtual spiral.

11. The computer graphic display program storage method according to claim 9, further comprising the steps of:

synthesizing a plurality of spiral layers each including said virtual spiral, said spiral axis, and said thumbnail icon; and displaying one of said plurality of synthesized layers produced in said spiral layer synthesizing step.

12. The computer graphic display program storage method according to claim 9, further comprising the steps of:

extracting a specific thumbnail icon from a plurality of thumbnail icons displayed in said array based on said time axis data basedupon attribute data of said raw data; and outputting said raw data represented by said specific thumbnail icon selected in said thumbnail icon extracting step.

13. The computer graphic display program storage method according to claim 9, wherein said unit time corresponding to said spiral period set by said spiral period-setting step is one of a month unit and a one year unit including a spring, a summer, an autumn, and a winter.

14. The computer graphic display program storage method according to claim 10, wherein in said representative thumbnail icon array displaying step said representative thumbnail icon is displayed as a semitransparent display.

15. The computer graphic display program storage method according to claim 11, further comprising a step of moving a visual point of said spiral layer displaying said virtual spiral, said spiral axis, and said thumbnail icon.

16. The computer graphic display program storage method according to claim 15, wherein said visual point moving step automatically moves said visual point of said spiral layer along a time axis.

* * * * *